United States Patent
Billman

(10) Patent No.: US 10,928,604 B2
(45) Date of Patent: Feb. 23, 2021

(54) OPTICAL FIBER CONNECTIVITY SYSTEM INCLUDING MODULES AND INTERCONNECTION CABLES

(71) Applicant: COMMSCOPE TECHNOLOGIES LLC, Hickory, NC (US)

(72) Inventor: Bradley Scott Billman, Sachse, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/329,912

(22) PCT Filed: Aug. 31, 2017

(86) PCT No.: PCT/US2017/049736
§ 371 (c)(1),
(2) Date: Mar. 1, 2019

(87) PCT Pub. No.: WO2018/045234
PCT Pub. Date: Mar. 8, 2018

(65) Prior Publication Data
US 2019/0243084 A1 Aug. 8, 2019

Related U.S. Application Data

(60) Provisional application No. 62/383,227, filed on Sep. 2, 2016, provisional application No. 62/506,598, filed on May 15, 2017.

(51) Int. Cl.
*G02B 6/44* (2006.01)
*G02B 6/38* (2006.01)

(52) U.S. Cl.
CPC ......... *G02B 6/4472* (2013.01); *G02B 6/3825* (2013.01); *G02B 6/3885* (2013.01);
(Continued)

(58) Field of Classification Search
None
See application file for complete search history.

(56) References Cited

U.S. PATENT DOCUMENTS 5,915,055 A 6/1999 Bennett et al.
6,604,866 B1 8/2003 Kang et al.
(Continued)

FOREIGN PATENT DOCUMENTS

EP 1 546 780 B1 11/2011
JP H11-160542 6/1999

OTHER PUBLICATIONS

International Search Report and Written Opinion of the Internatonal Searching Authority for International Patent Application No. PCT/US2017/049736 dated Dec. 28, 2017, 15 pages.
(Continued)

*Primary Examiner* — Michelle R Connelly
(74) *Attorney, Agent, or Firm* — Merchant & Gould P.C.

(57) ABSTRACT

Various fiber optic distribution modules are disclosed, as well as cable useable to interconnect such modules. One possible module includes a first MPO connector and a second MPO connector exposed, and a plurality of LC connectors, the plurality of LC connectors arranged into a first row and a second row. A plurality of fibers is routed between one of the first and second MPO connectors and a different one of the plurality of LC connectors. The plurality of LC connectors in the first row and the second row are grouped into N groups with M connectors in each group corresponding to M/2 channels included in each group and including a fiber pair. The M connectors of each group are disposed across the first and second rows. Indicia disposed on the second side of the housing visually distinguish each group of the N groups from an adjacent neighboring group.

20 Claims, 53 Drawing Sheets

(52) U.S. Cl.
CPC ......... *G02B 6/3897* (2013.01); *G02B 6/4441* (2013.01); *G02B 6/4452* (2013.01); *G02B 6/4471* (2013.01)

(56) References Cited

U.S. PATENT DOCUMENTS

| | | | |
|---|---|---|---|
| 6,758,600 | B2 | 7/2004 | Del Grosso et al. |
| 6,869,227 | B2 | 3/2005 | Del Grosso et al. |
| 7,021,837 | B2 | 4/2006 | Eichenberger et al. |
| 7,756,371 | B1 | 7/2010 | Burnham et al. |
| 9,678,294 | B2 * | 6/2017 | Yin ............... G02B 6/4452 |
| 2006/0133736 | A1 | 6/2006 | Sullivan |
| 2009/0196563 | A1 | 8/2009 | Mullsteff et al. |
| 2010/0322554 | A1 * | 12/2010 | Barnes ............ G02B 6/0365 385/24 |
| 2010/0322576 | A1 * | 12/2010 | Rhoney ............ G02B 6/4452 385/134 |
| 2012/0163757 | A1 | 6/2012 | Shigehara |
| 2012/0189259 | A1 | 7/2012 | Manes |
| 2013/0308916 | A1 * | 11/2013 | Buff ............... G02B 6/4452 385/135 |
| 2014/0010510 | A1 * | 1/2014 | Blackard ........... G02B 6/4453 385/135 |
| 2013/0308915 | A1 | 11/2015 | Buff et al. |
| 2015/0331192 | A1 | 11/2015 | Hall |

OTHER PUBLICATIONS

Commscope, Inc., "Systimax 360 IU, 2U and 4U Ultra High Density (UHD) Fiber Optic Shelf Instructions", p. 1-10 (2014), retrieved from the Internet: http://www.commscope/com/catalog/doc/pdf/8914/860_513_324_-_SYSTIMAX_3_60_1U_2U_and_4U_Ultra_High-Density_UHD_Fiber_Optic_Shelf_Instructions.pdf.

Commscope, Iinc., "Instapatch 360DM Angled Singlemode Modules", p. 1-2 (2015), retrieved from theInternet: https://www.anixter.com/content/dam/Suppliers/CommScope/InstaPATCH%20360%20Modules.pdf.

TIA Technical Subcommitte TR-42.8 Proposal titled "Proposal for TSB—Guidelines for Maintaining Optical Fiber Polarity with Systems Utilizing MPO Connectors and 12-Fiber Ribbon Cables" ("TIA Technical"), Corning Cable Systems, 14 pages. (Jan. 2002).

Extended European Search Report for corresponding European Patent Application No. 17847589.3 dated Mar. 12, 2020, 8 pages.

* cited by examiner

*FIG. 8*

| | TABLE I. TYPE C MODULE FIBER ROUTING | | 2.2 |
|---|---|---|---|
| | INTERNAL FO FIBER# | LC PORT# | |
| MPO 1 14a | 1 | 1 | BOTTOM ROW |
| | 2 | 3 | |
| | 3 | 5 | |
| | 4 | 7 | |
| | 5 | 9 | |
| | 6 | 11 | |
| | 7 | 12 | |
| | 8 | 10 | |
| | 9 | 8 | |
| | 10 | 6 | |
| | 11 | 4 | |
| | 12 | 2 | |
| MPO 2 14b | 1 | 14 | TOP ROW |
| | 2 | 16 | |
| | 3 | 18 | |
| | 4 | 20 | |
| | 5 | 22 | |
| | 6 | 24 | |
| | 7 | 23 | |
| | 8 | 21 | |
| | 9 | 19 | |
| | 10 | 17 | |
| | 11 | 15 | |
| | 12 | 13 | |

FIG. 10

| ALPHA 13-24 | TX7 | TX8 | TX9 | TX10 | TX11 | TX12 | | 01-12 |
|---|---|---|---|---|---|---|---|---|
| | RX1 | RX2 | RX3 | RX4 | RX5 | RX6 | | |
| 01-12 | RX7 | RX8 | RX9 | RX10 | RX11 | RX12 | | BETA 13-24 |
| | TX1 | TX2 | TX3 | TX4 | TX5 | TX6 | | |

| TABLE 2. TYPE P MODULE FIBER ROUTING | | | 2.2 |
|---|---|---|---|
| | INTERNAL FO FIBER# | LC PORT# | |
| MPO 1 | 1 | 8 | BOTTOM ROW |
| | 2 | 6 | |
| | 3 | 19 | |
| | 4 | 17 | |
| | 5 | 14 | |
| | 6 | 16 | |
| | 7 | 1 | |
| | 8 | 3 | |
| | 9 | 4 | |
| | 10 | 2 | |
| | 11 | 15 | |
| | 12 | 13 | |
| MPO 2 | 1 | 22 | TOP ROW |
| | 2 | 24 | |
| | 3 | 9 | |
| | 4 | 11 | |
| | 5 | 12 | |
| | 6 | 10 | |
| | 7 | 23 | |
| | 8 | 21 | |
| | 9 | 18 | |
| | 10 | 20 | |
| | 11 | 5 | |
| | 12 | 7 | |

*FIG. 18*

| TABLE 3. TYPE Q MODULE FIBER ROUTING | | | 2.2 |
|---|---|---|---|
| | INTERNAL FO FIBER# | LC PORT# | |
| MPO 1 | 1 | 14 | |
| | 2 | 16 | |
| | 3 | 1 | |
| | 4 | 3 | |
| | 9 | 4 | |
| | 10 | 2 | |
| | 11 | 15 | |
| | 12 | 13 | |
| MPO 2 | 1 | 18 | |
| | 2 | 20 | |
| | 3 | 5 | |
| | 4 | 7 | |
| | 9 | 8 | |
| | 10 | 6 | |
| | 11 | 19 | |
| | 12 | 17 | |
| MPO 3 | 1 | 22 | |
| | 2 | 24 | |
| | 3 | 9 | |
| | 4 | 11 | |
| | 9 | 12 | |
| | 10 | 10 | |
| | 11 | 23 | |
| | 12 | 21 | |

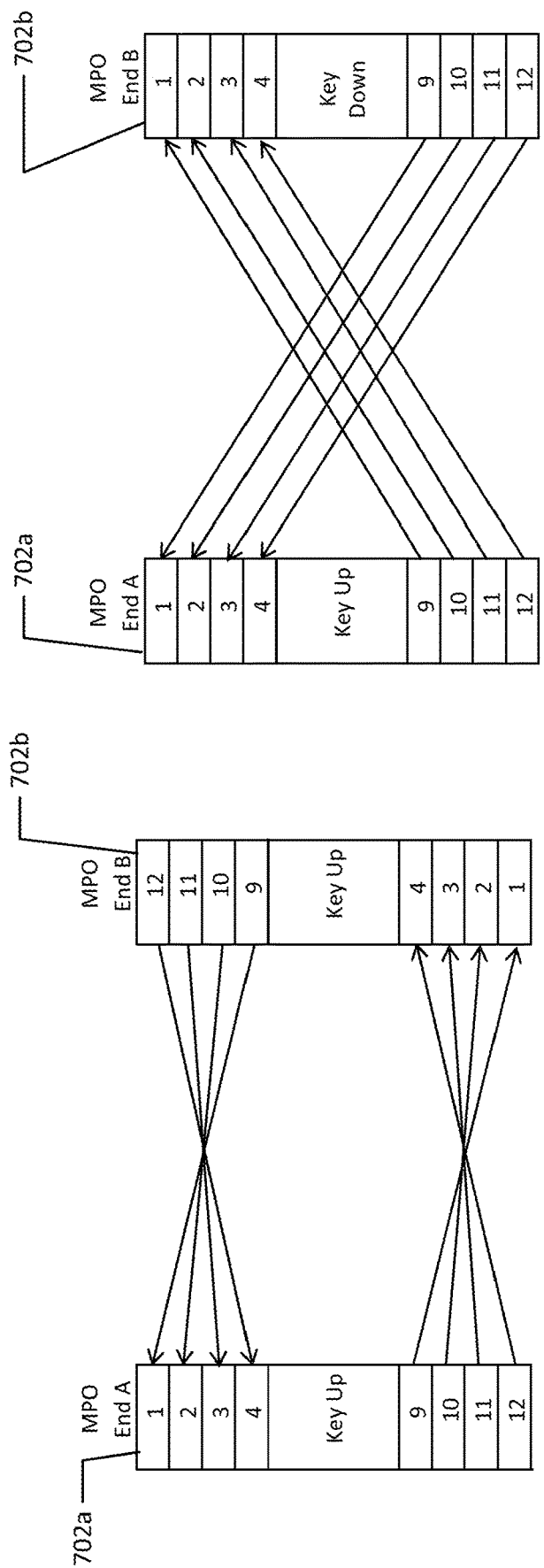

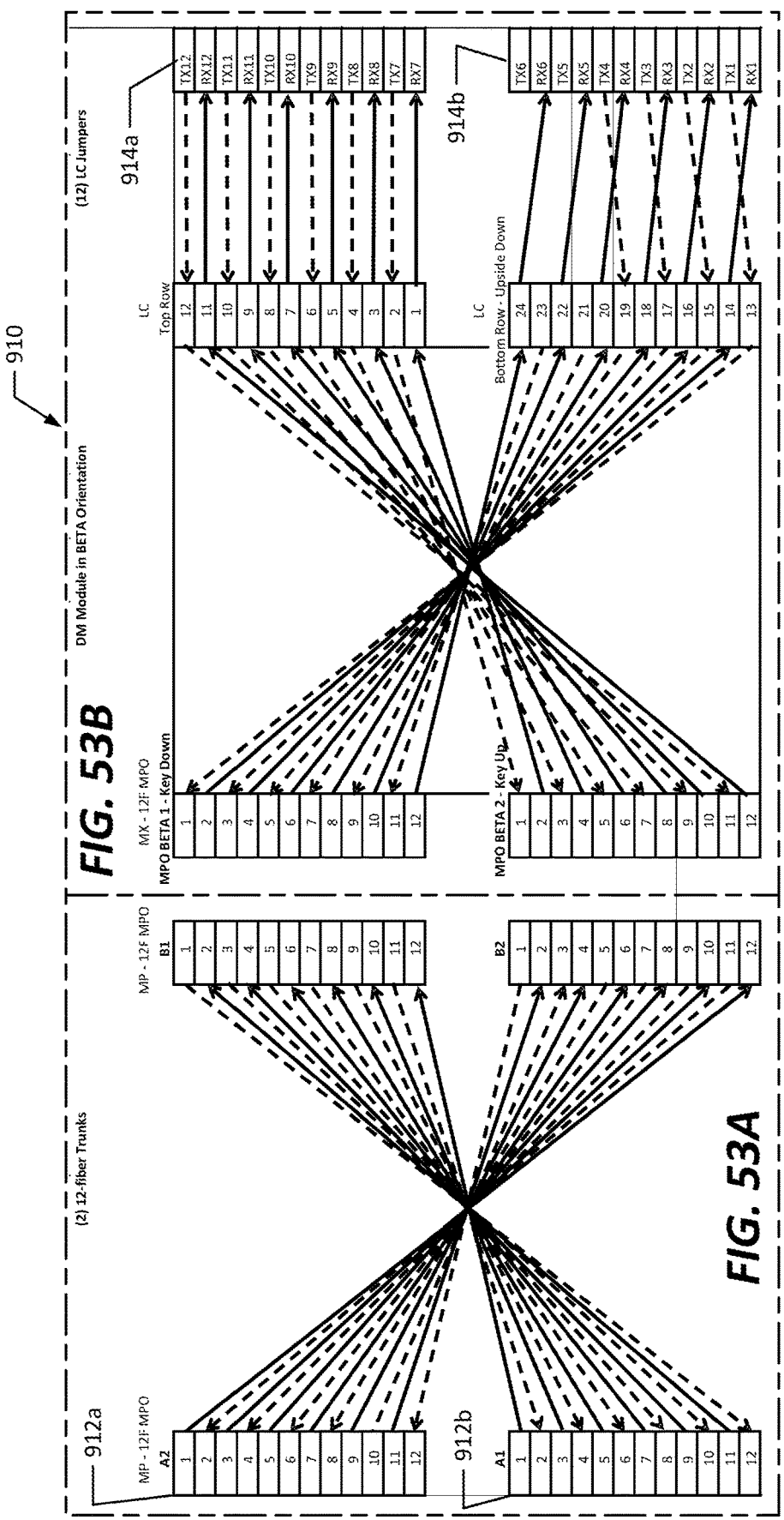

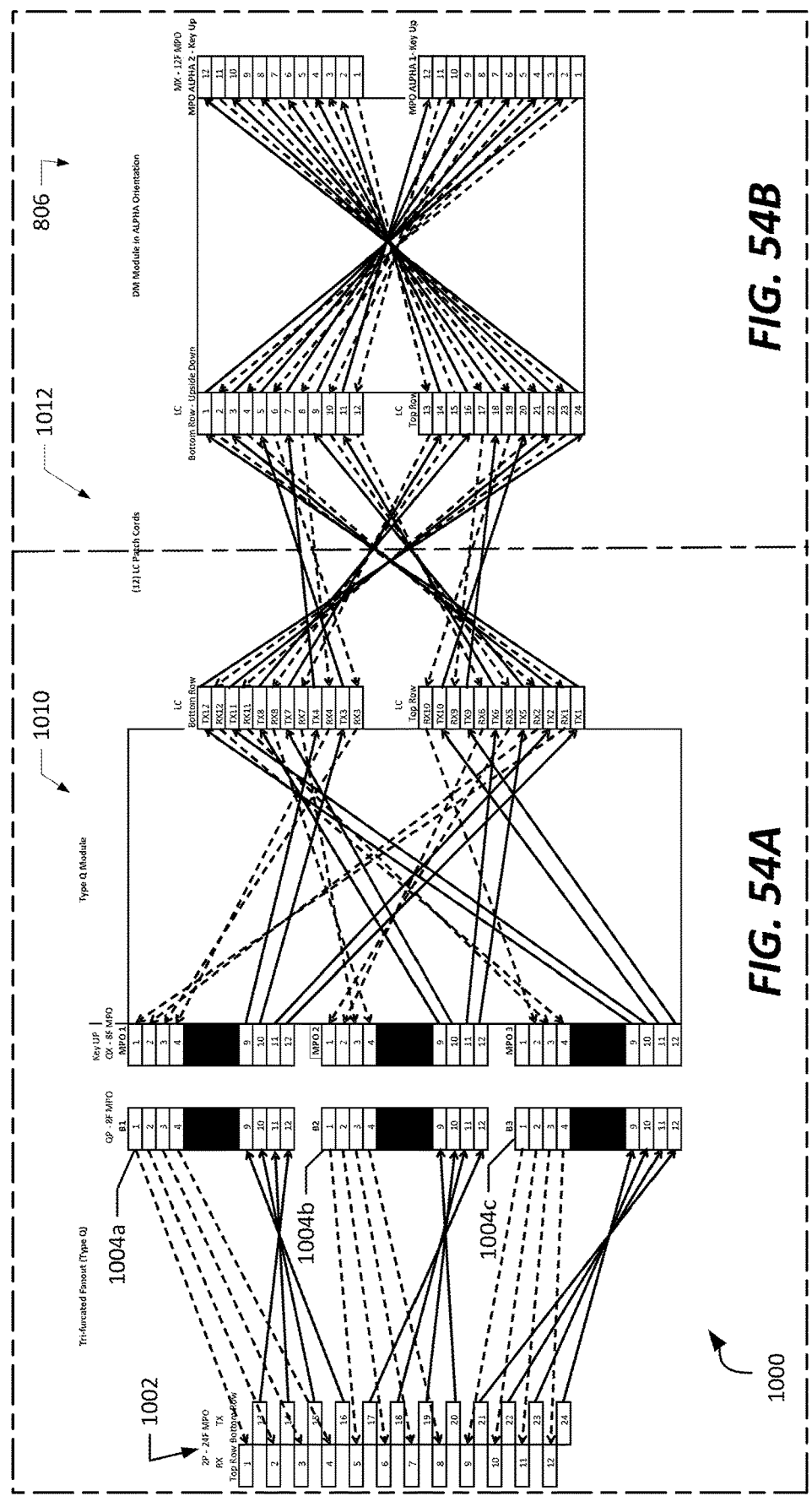

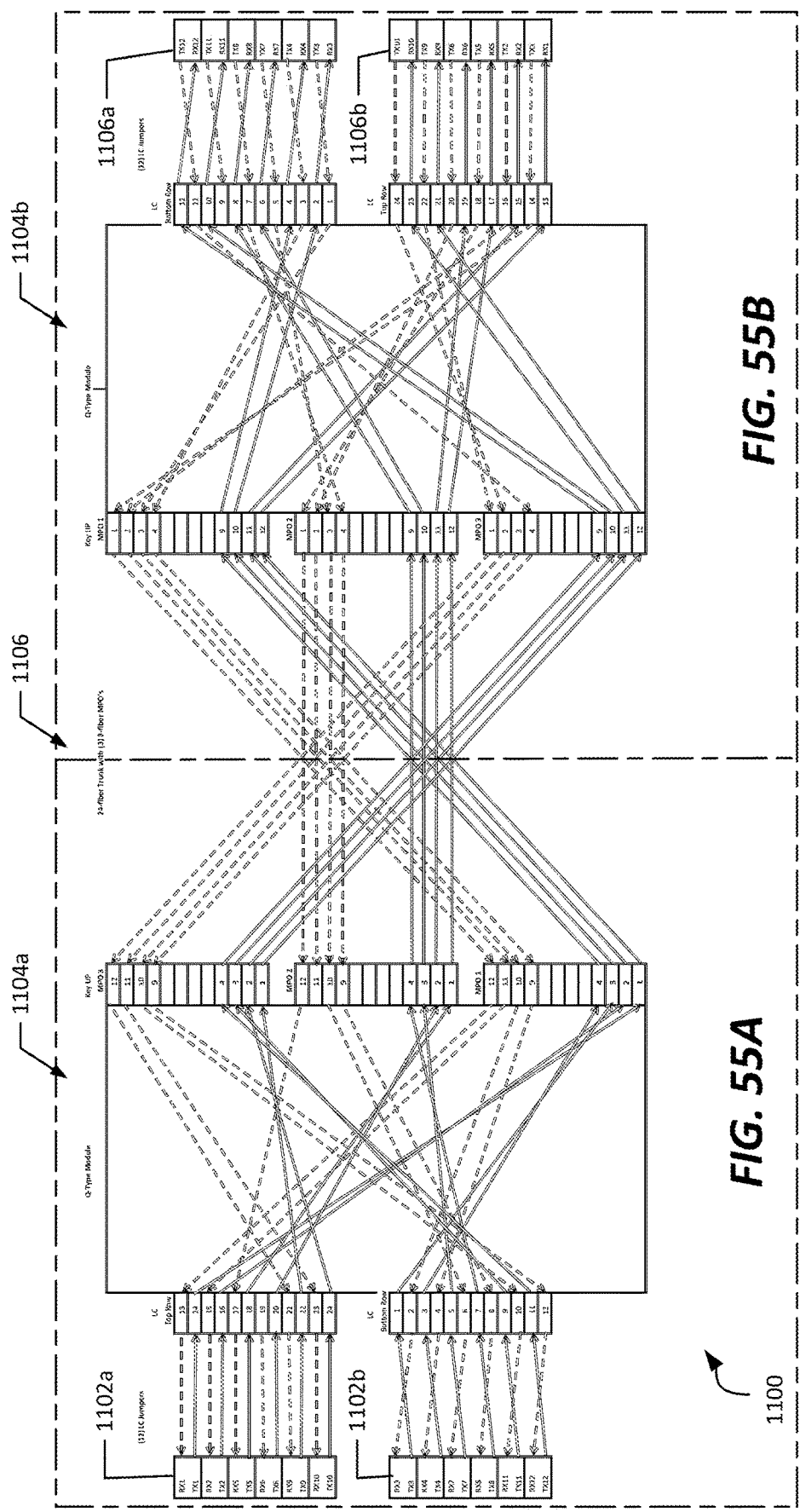

OPTICAL FIBER CONNECTIVITY SYSTEM INCLUDING MODULES AND INTERCONNECTION CABLES

CROSS-REFERENCE TO RELATED APPLICATIONS

This application claims the benefit of U.S. Patent Application Ser. No. 62/383,227, filed on Sep. 2, 2016, and claims the benefit of U.S. Patent Application Ser. No. 62/506,598, filed on May 15, 2017, the disclosures of which are incorporated herein by reference in their entireties. To the extent appropriate, a claim of priority is made to each of the above disclosed applications.

BACKGROUND

Optical fibers, both multi-mode and single mode, are commonly used for the transmission of signals of all sorts, including communication and data signals. Communications systems often transmit signals between transceivers (i.e., devices that can both transmit and receive optical signals) via different fibers in each direction. More specifically, one or more fibers will transmit signals from the first transceiver to the second, and one or more of the other fibers will transmit signals from the second transceiver to the first. In this manner, optical signals are not traveling along the same fiber in different directions.

This arrangement would be fairly simple to organize for two transceiver devices that are permanently optically connected, but in practice transceivers are typically connected through a much larger network of optical fibers, connectors and patch panels. For example, a common optical system includes multiple transceivers at one end, 2-fiber patch cords that are connected to the transceivers and to duplex adapters mounted on a patch panel, a fan-out transition device connected to the duplex adapters that connects to a multi-strand fiber optic cable (12 fibers per cable is common, and the fiber strands may be in ribbon form) via an array adapter, a second fan-out transition device connected to the opposite end of the optic cable via a second array adapter, and corresponding transceivers connected via 2-fiber patch cords to the second fan-out transition device through duplex adapters. Thus, it is important to be able to track individual optical fibers in the various devices and cables between the transceivers in order to ensure that the individual transceivers are connected as desired.

To ensure intermateability of cabling components and signal polarity, standards have been created to define arrangements of fibers, cables, adapters and connectors. For example, one such standard for array connectors, TIA-604-5B, is directed to multi-fiber push-on (MPO) fiber optic connector intermateability. Another standard, TIA 568-B.3 with addendum No. 7 written by committee TR-42, is directed to maintaining optical fiber polarity with systems using array connectors and adapters, including MPOs. Systems built using these methods utilize fiber optic cables, adapters, transition devices and patch cords that are typically partially or completely unique to one of these methods.

In some instances, transceivers may utilize less than all of the fibers of the cable. For example, a transceiver may have only four channels, each of which has a "transmit" fiber and a "receive" fiber. Commonly, two such transceivers would utilize the outer four fibers on either end of a 12-fiber cable; i.e., the transmit fibers would use fibers 1-4 of the cable, and the receive fibers would use fibers 9-12 of the cable. When such transceivers are used in combination with other optical distribution connections, routing of signals can become complicated.

Examples of complications in fiber routing arise when higher bandwidth applications are desired. For example, traditionally, a 40 Gbps service will use four channels, or eight fiber pairs, and 100 Gbps service will use ten channels, or 20 fiber pairs. Although greater bandwidths may be achieved using these same fiber pairs. Concurrently, traditional 10 Gbps service will use a single channel, or two fibers. Difficulties in routing fibers arise when determining how best to distribute fibers to deliver such services. This is particularly the case when more than one such cable is used for service delivery in these higher bandwidth operations, including circumstances in which 12-fiber cables or connectors are used, and in which fewer than all of the connectors of a cable might be utilized. Such difficulties can lead to technician errors in optical routing when relying on fanout cables or other types of optical distribution systems in which correct fanout of optical signals is required.

SUMMARY

In accordance with the following disclosure, the above and other issues are addressed by a fiber optic distribution system including modules and cables for interconnection therewith, for example to breakout 40 Gbps or 100 Gbps transceivers to individual 10 Gbps channels.

In a first aspect, a fiber optic distribution module includes a housing, a plurality of multi-fiber push-on (MPO) connectors including a first MPO connector and a second MPO connector exposed at a first side of the housing, and a plurality of LC connectors disposed on a second side of the housing opposite the first side, the plurality of LC connectors arranged into a first row and a second row. The module further includes a plurality of fibers, each of the plurality of fibers routed between one of the first and second MPO connectors and a different one of the plurality of LC connectors. The plurality of LC connectors in the first row and the second row are grouped into N groups of LC connectors with M connectors in each group, the M connectors corresponding to M/2 channels included in each group and including a fiber pair, the M connectors of each group and being disposed across the first and second rows and each of M, N, and M/2 being an integer. Indicia disposed on the second side of the housing visually distinguish each group of the N groups from an adjacent neighboring group.

In a second aspect, an optical distribution system includes a first optical distribution module having a first multi-fiber push-on (MPO) connector having a first alignment key and a second optical distribution module having a second multi-fiber push-on (MPO) connector having a second alignment key having a same configuration as the first alignment key. The system further includes a fiber optic cable comprising a plurality of optical fibers and first and second terminals attached to opposite ends of the fibers, each of the terminals having an alignment key, the first terminal optically connected to the first MPO connector and the second terminal optically connected to the second connector. The fibers enter the first terminal in an arrangement of two rows and enter the second terminal in an arrangement of two rows, each fiber defining a position in the first terminal that is laterally transposed within the same row as compared to the position in the fiber defined in the first terminal.

In a third aspect, an optical cable useable to connect between a first multi-fiber push-on (MPO) connector of a first optical module and a second multi-fiber push-on (MPO)

connector of a second optical module oriented in an inverted orientation, wherein first and second MPO connectors each include twelve sequentially arranged optical fibers. The optical cable includes a first twelve-fiber MPO connector on a first end of the optical cable including first, second, third, fourth, fifth, sixth, seventh, eighth, ninth, tenth, eleventh, and twelfth sequential optical connections, and a second twelve-fiber MPO connector on a second end of the optical cable opposite the first end and including first, second, third, fourth, fifth, sixth, seventh, eighth, ninth, tenth, eleventh, and twelfth sequential optical connections. The optical cable further includes first, second, third, fourth, fifth, sixth, seventh, eighth, ninth, tenth, eleventh, and twelfth optical fibers extending along the length of the cable between the first twelve-fiber MPO connector and the second twelve-fiber MPO connector. The first optical fiber connects between the first optical connection of the first twelve-fiber MPO connector and the fourth optical connection of the second twelve-fiber MPO connector, the second optical fiber connects between the first optical connection of the first twelve-fiber MPO connector and the third optical connection of the second twelve-fiber MPO connector, the third optical fiber connects between the first optical connection of the first twelve-fiber MPO connector and the second optical connection of the second twelve-fiber MPO connector, the fourth optical fiber connects between the first optical connection of the first twelve-fiber MPO connector and the first optical connection of the second twelve-fiber MPO connector, the ninth optical fiber connects between the first optical connection of the first twelve-fiber MPO connector and the twelfth optical connection of the second twelve-fiber MPO connector, the tenth optical fiber connects between the first optical connection of the first twelve-fiber MPO connector and the eleventh optical connection of the second twelve-fiber MPO connector, the eleventh optical fiber connects between the first optical connection of the first twelve-fiber MPO connector and the tenth optical connection of the second twelve-fiber MPO connector, and the twelfth optical fiber connects between the first optical connection of the first twelve-fiber MPO connector and the ninth optical connection of the second twelve-fiber MPO connector.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 8 is a table illustrating an internal fiber routing of the optical distribution module of FIG. 1;

FIG. 10 is a logical view of the connectivity at LC connectors of the optical distribution module of FIG. 1;

FIG. 18 is a table illustrating an internal fiber routing of the optical distribution module of FIG. 11;

FIG. 27 is a table illustrating an internal fiber routing of the optical distribution module of FIG. 20;

FIG. 50 illustrates a first example cable routing for a twelve fiber cable;

FIG. 51 illustrates a second example cable routing for a twelve fiber cable;

FIGS. 53, 53A and 53B illustrate a second portion of an optical distribution system useable to convert 40 Gbps service to 10 Gbps service using optical distribution modules as discussed herein;

FIGS. 54, 54A and 54B illustrate a portion of an optical distribution system useable to convert 40 Gbps service to 10 Gbps service using optical distribution modules as discussed herein, according to a second possible implementation;

FIGS. 55, 55A and 55B illustrate a portion of an optical distribution system in which 10 Gbps service is routed to a 40 Gbps service section, and then redistributed as 10 Gbps service, according to a possible implementation.

DETAILED DESCRIPTION

Figure 1:
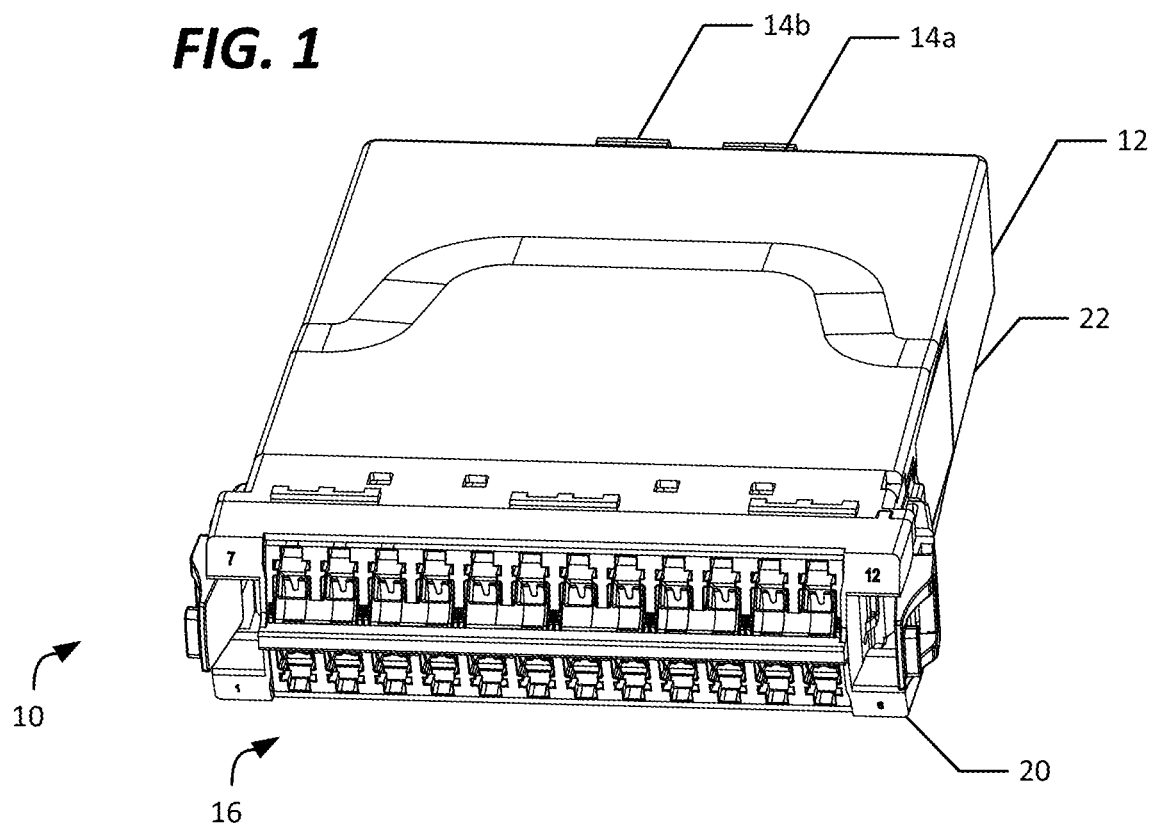
FIG. 1 illustrates a front perspective view of an optical distribution module, according to a first example embodiment.
Figure 2:
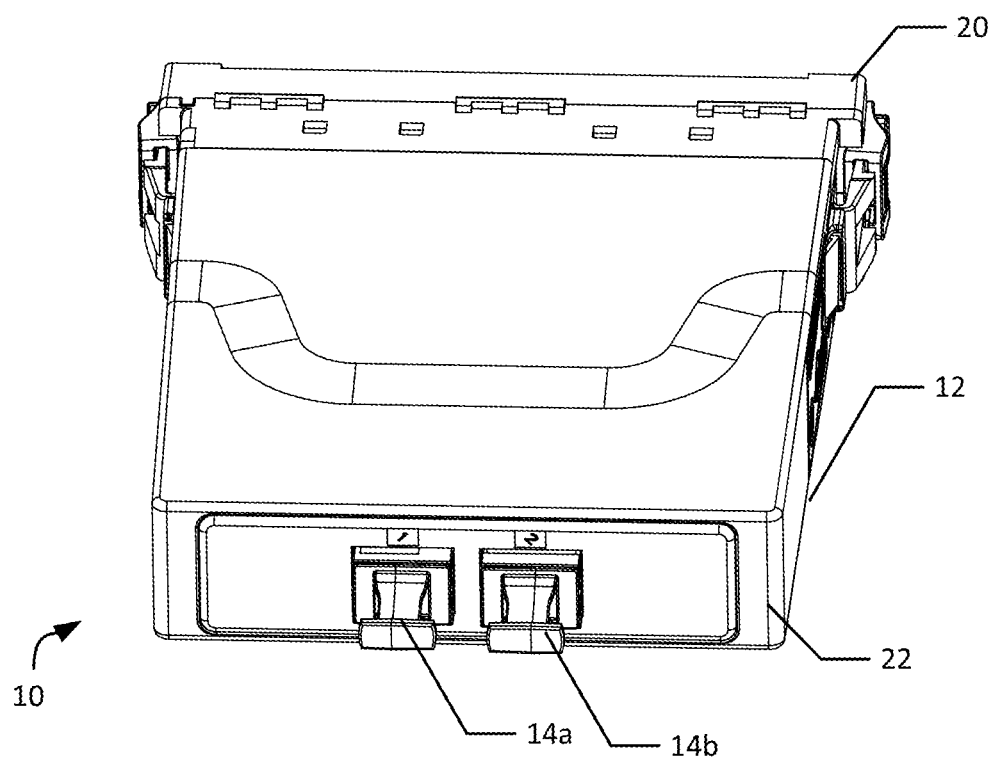
FIG. 2 illustrates a rear perspective view of the optical distribution module of FIG. 1.
Figure 3:
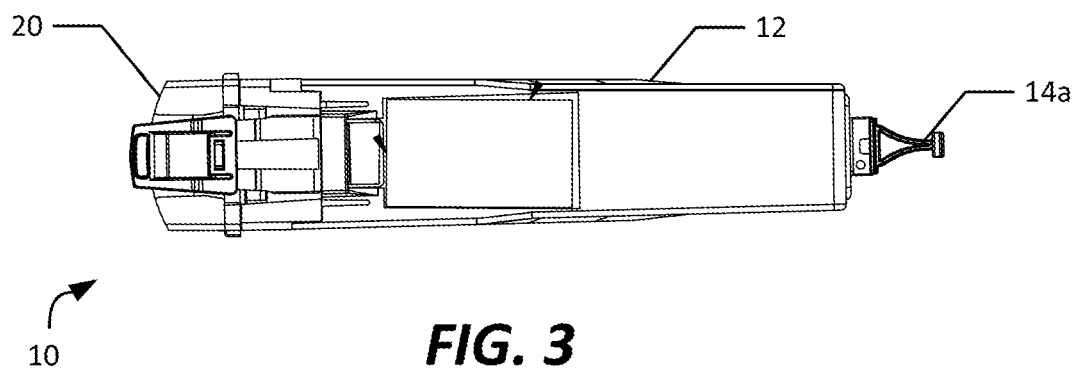
FIG. 3 is a side view of the optical distribution module of FIG. 1.
Figure 4:
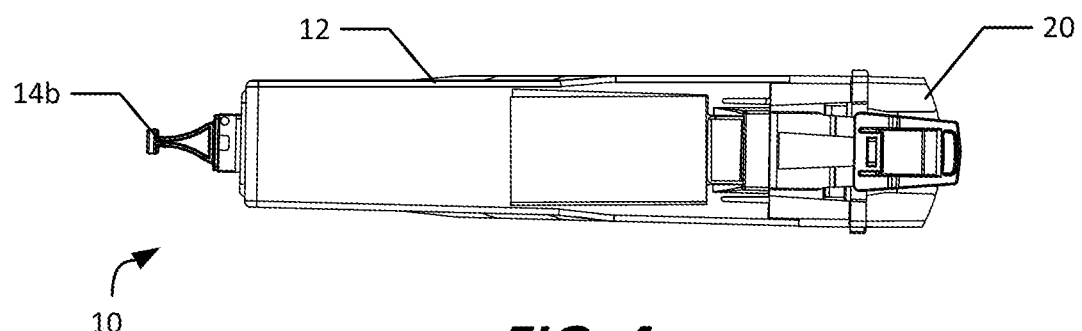
FIG. 4 is an opposite side view of the optical distribution module of FIG. 1.
Figure 5:
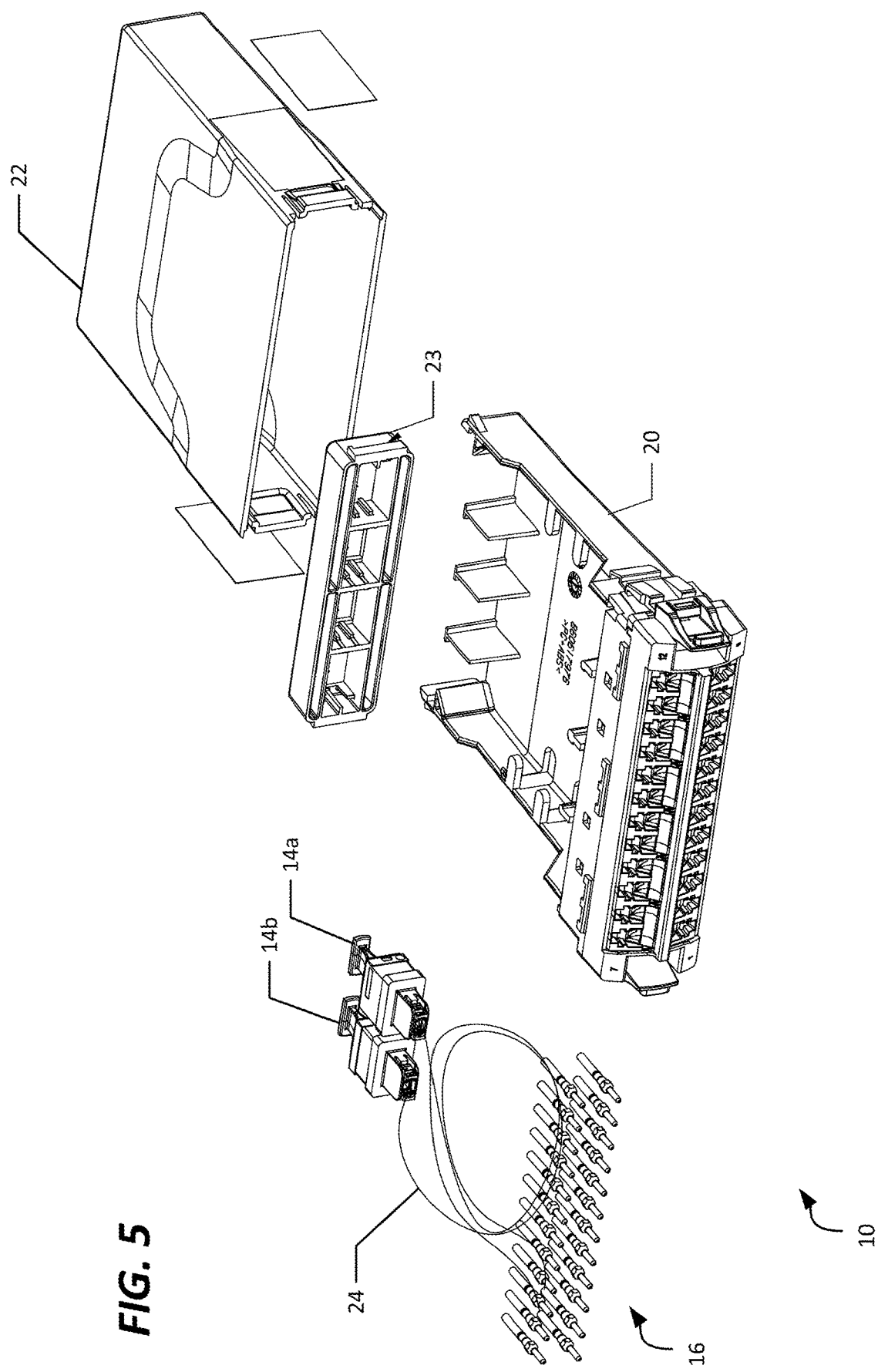
FIG. 5 is an exploded view of the optical distribution module of FIG. 1.
Figure 6:
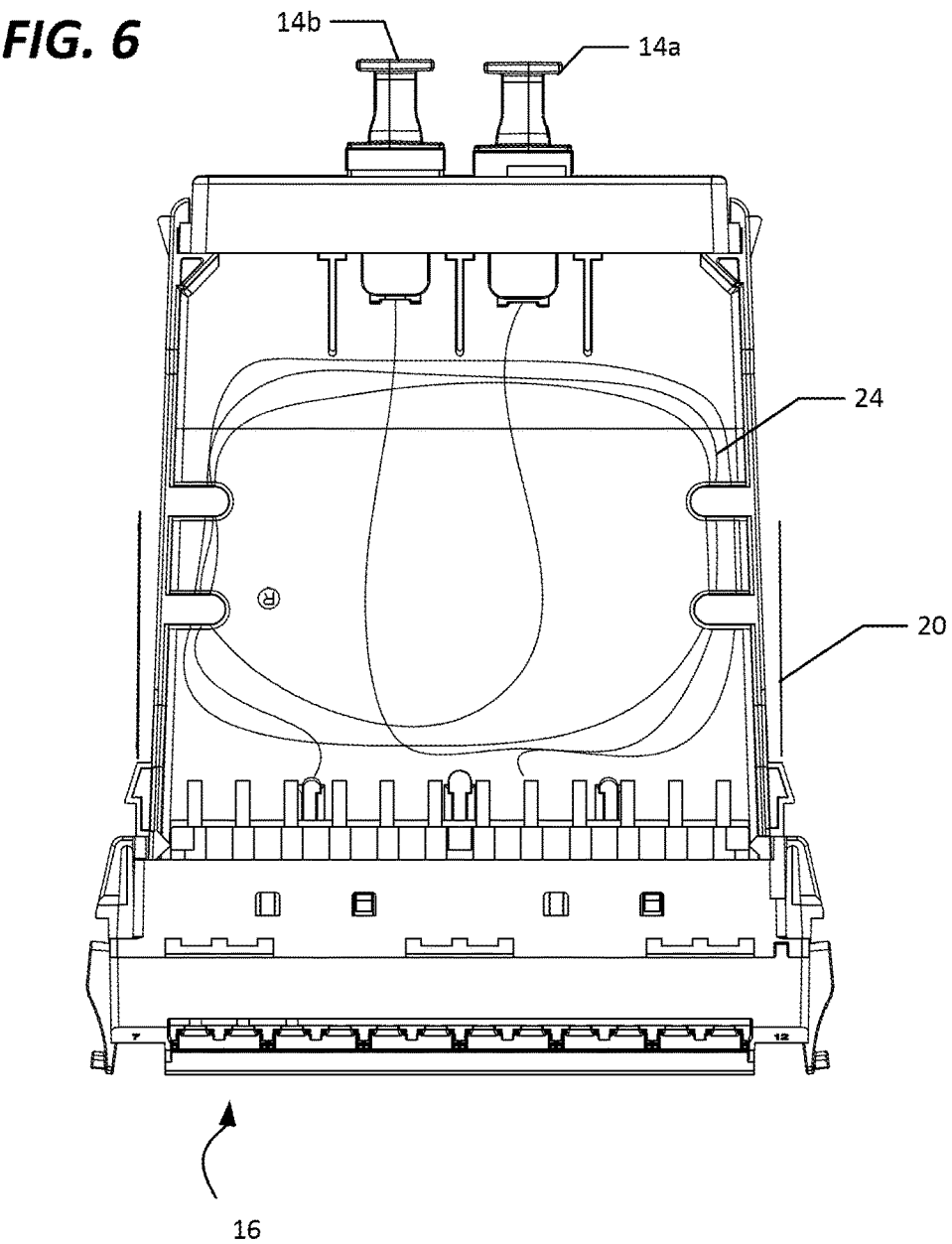
FIG. 6 is a top plan view with a cover removed of the optical distribution module of FIG. 1.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, optical distribution systems are described herein that provide for improved connection arrangements for fiber optic distribution systems. It is noted that in the past, numerous fiber routing approaches have been taken. Example approaches include those defined in the TIA 568 standard, referred to as "Method A", "Method B", and "Method C", as well as other proprietary arrangements. While each of these arrangements has advantages over the others, each has disadvantages in terms of fiber routing and upgrade when used in a complex system. For example, in Method A, careful placement of a "flipped" cable may be needed to invert cable routing at an appropriate location within an optical network. Furthermore, in Method B, either different modules at each end of an optical path, or a flipped "Alpha/Beta" module might need to be used. Additionally, in some proprietary and standardized systems, connection of multi-fiber push-on (MPO) connectors may be required to be in a particular non-standard alignment in which connection keys are opposite of each other, leading to potential connection confusion.

By way of contrast to the above disadvantages, in example embodiments, the modules, cables, and systems including such modules and cables allow for distribution of various service types on traditional, "straight through" Method B trunk cables, while avoiding the requirement of a different or flipped module at one end of the optical network (as might be required in traditional Method B), and also avoiding the requirement of a key-up to key-down inverted connection arrangement at a junction of MPO connectors (as might be required in certain proprietary systems). This greatly simplifies routing for optical technicians. Such improved connection arrangements also simplify the connections among, for example, eight-fiber transceivers and twelve-fiber optical cables, and guides routing of service. In example embodiments, 10 Gbps duplex ports, distributed on pairs of LC connectors, can be broken out from higher density optical connectors; in other examples, twelve, twenty four, or other numbers of fiber connectors could be used. The number of connectors depends at least in part on the optical distribution service desired, as well as the type of optical service that is being delivered via the system (e.g., duplex or parallel signaling, with single-mode or multi-mode fiber optic systems). It is noted that, in some embodiments, the present disclosure provides a routing system and modules useable to provide an improved fiber routing system at current bandwidths (e.g., at 10 Gbps, 40 Gbps, and 100 Gbps service levels) by simplifying routing among optical modules, while also simplifying an upgrade path for such optical services by allowing modules to be readily substituted for one (within the same signaling systems) to provide a simpler upgrade path to higher-bandwidth services.

Referring now to FIGS. 1-10, a first example fiber optic distribution module 10 is illustrated. The module 10 includes a housing 12 having opposed first and second sides. A first side of the housing 12 has a plurality of multi-fiber push-on (MPO) connectors 14 disposed thereon. In the example shown, two twelve-fiber MPO connectors 14a, 14b are illustrated. In the embodiment shown, a plurality of LC connectors 16 are disposed on the second side of the housing 12. The plurality of LC connectors 16 are disposed in two rows 18a-b. In the example shown, twelve LC connectors 16 are disposed in each of two rows.

In the example shown, the housing can include a cassette 20 and a shell 22. The cassette 20 includes the second side, in which the LC connectors 16 can be mounted. A faceplate 23 can be positioned within the shell 22 and the MPO connectors 14a-b can extend through the faceplate 23, being removably mounted at the first side of the housing 12. Fibers 24 can be positioned within the shell 22 and extend between the MPO connectors 14a-b and the LC connectors 16. The shell 22 can, in the embodiment shown, feature a snap-fit connection over the cassette 20, to encase and protect the fibers 24. Optionally, the fibers 24 are of adequate length to form a fiber loop within the enclosure (seen best in FIGS. 5-6) which can allow for movement and/or replacement of the LC connectors 16 or MPO connectors 14 as may be desired.

Figure 7:
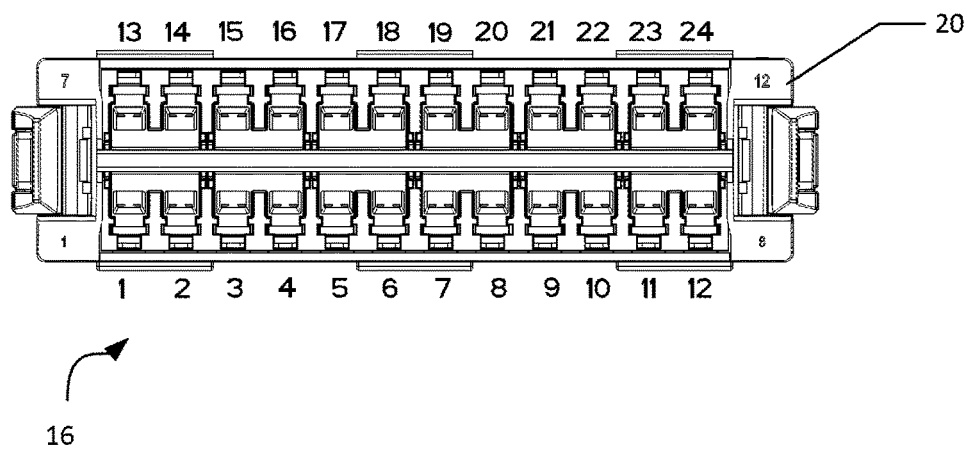
FIG. 7 is a front plan view of the optical distribution module of FIG. 1.
Figure 9:
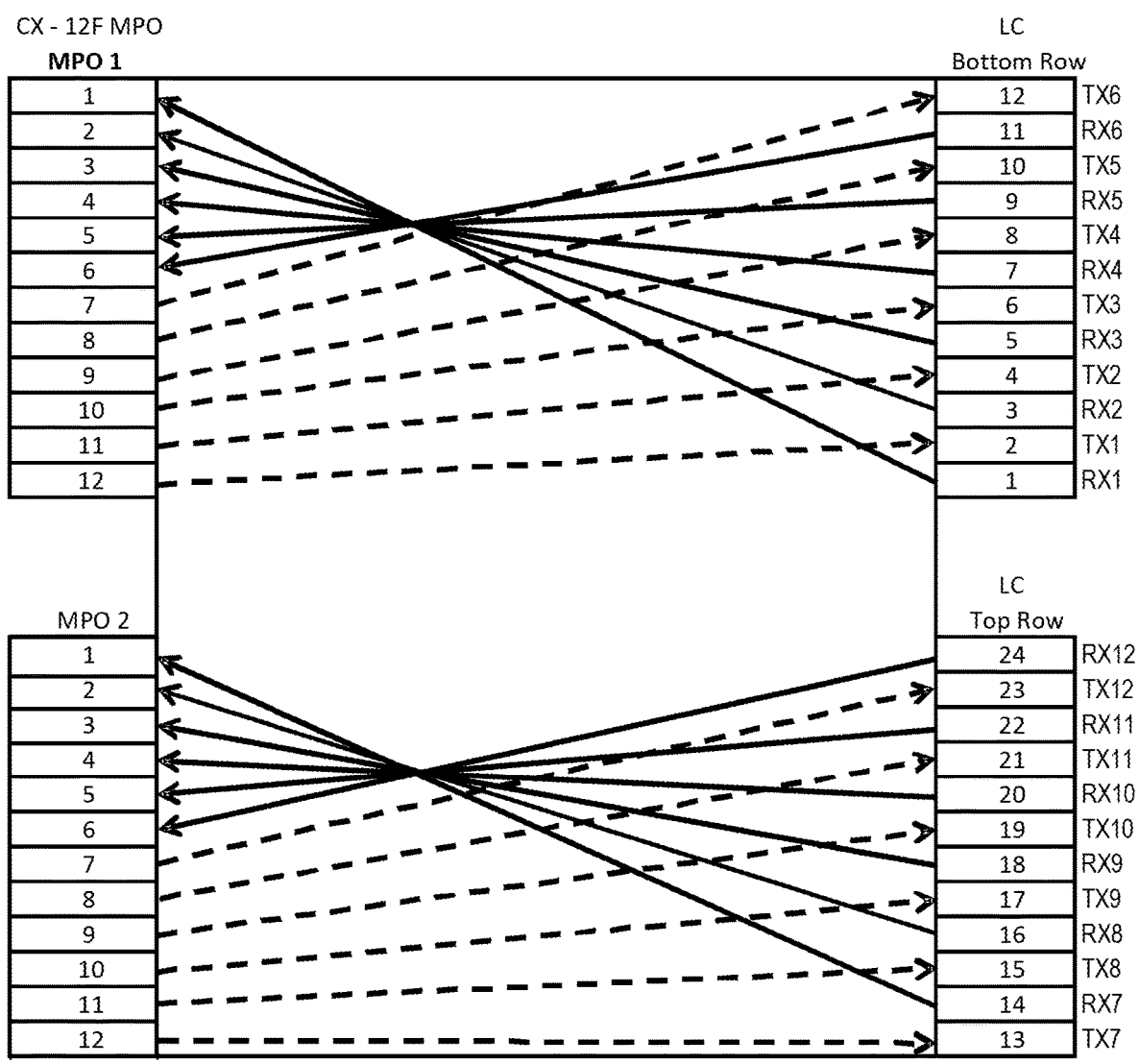
FIG. 9 is a graphical depiction of the internal fiber routing of the optical distribution module of FIG. 1.
Figure 11:
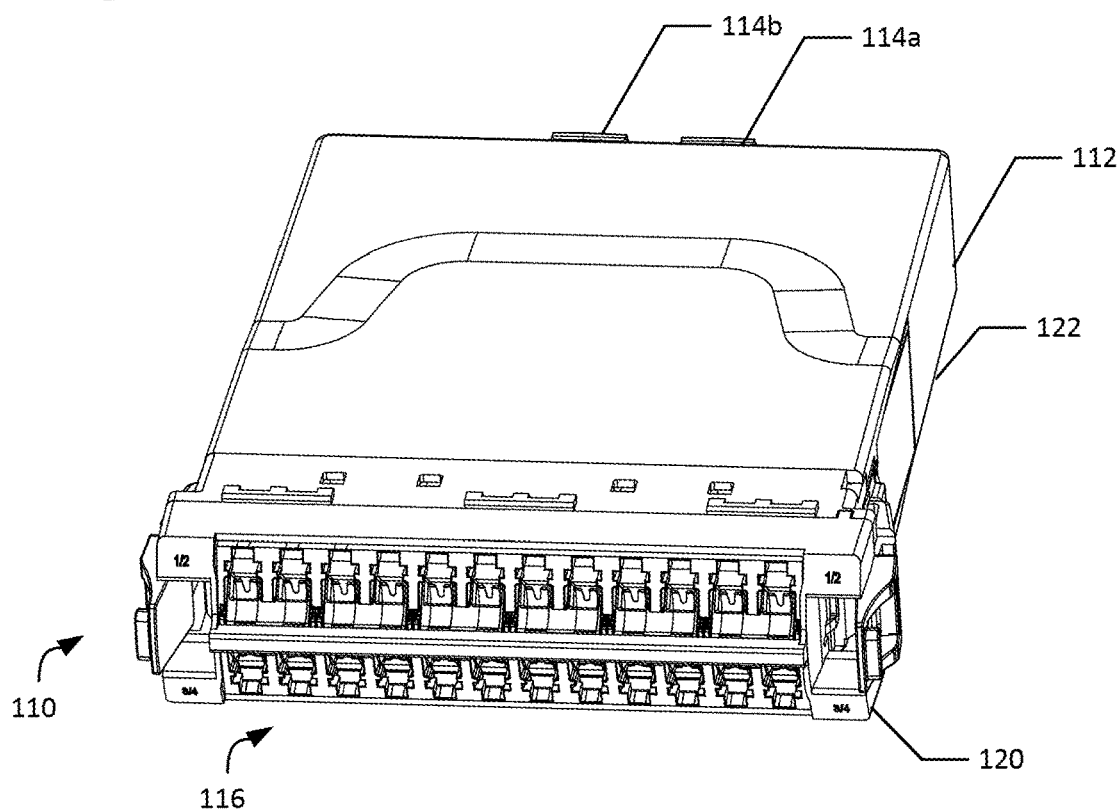
FIG. 11 illustrates a front perspective view of an optical distribution module, according to a second example embodiment.
Figure 12:
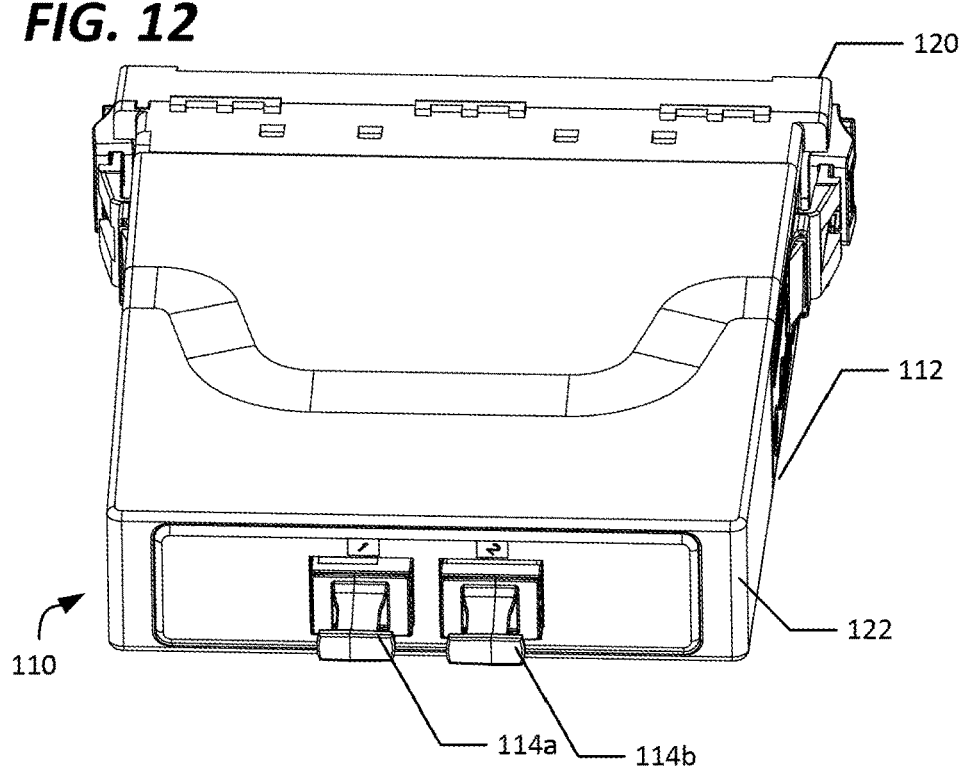
FIG. 12 illustrates a rear perspective view of the optical distribution module of FIG. 11.
Figure 13:
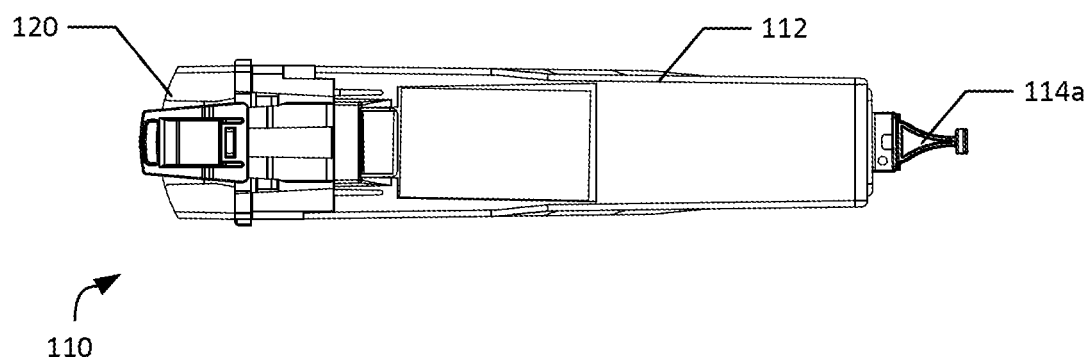
FIG. 13 is a side view of the optical distribution module of FIG. 11.
Figure 14:
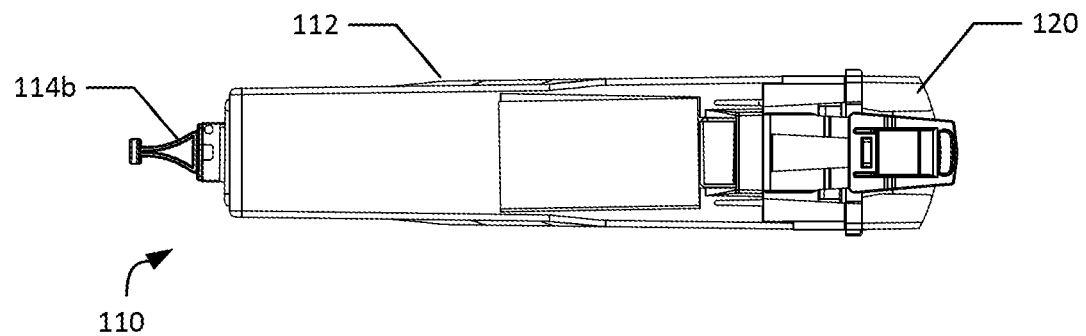
FIG. 14 is an opposite side view of the optical distribution module of FIG. 11.
Figure 15:
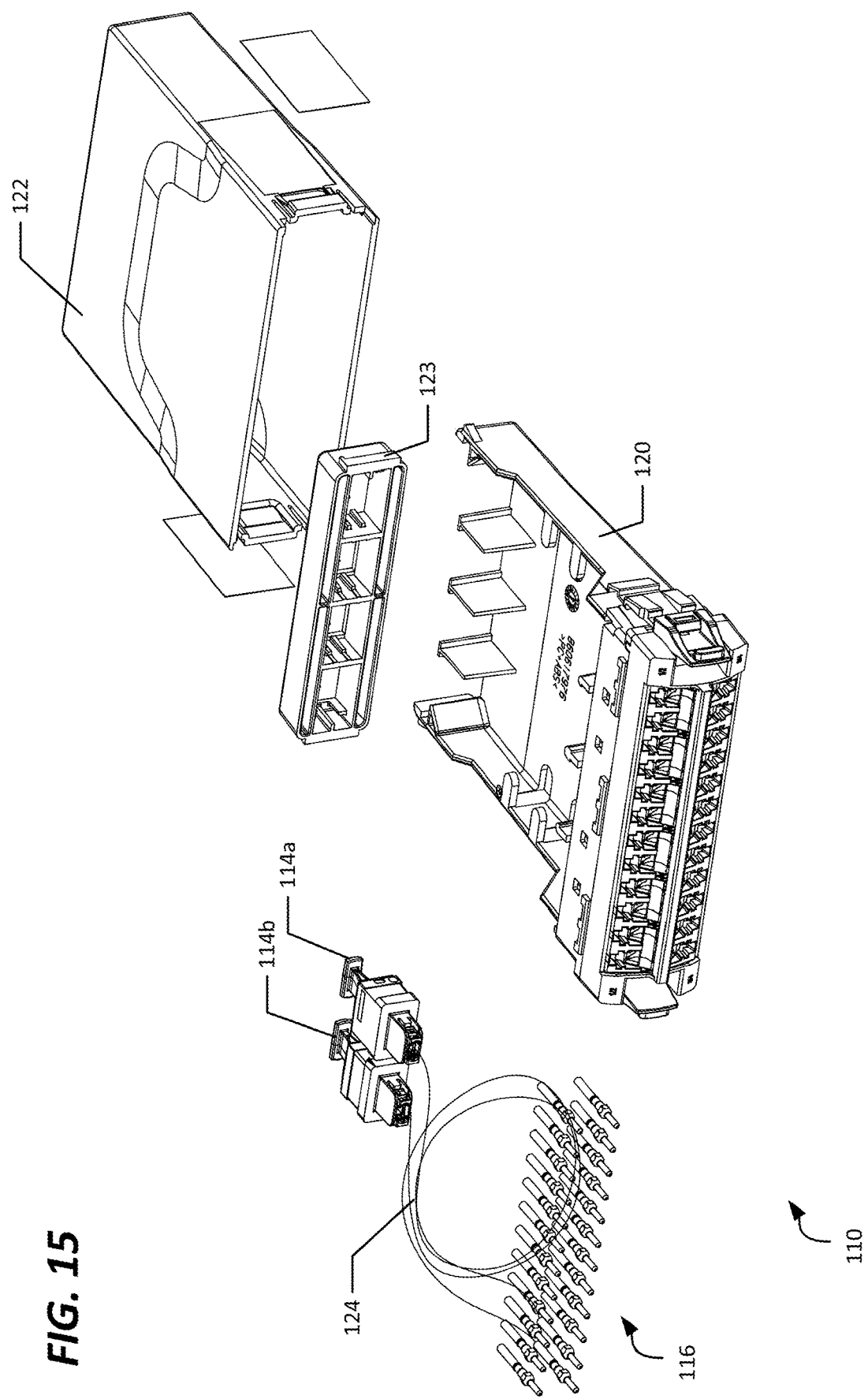
FIG. 15 is an exploded view of the optical distribution module of FIG. 11.
Figure 16:
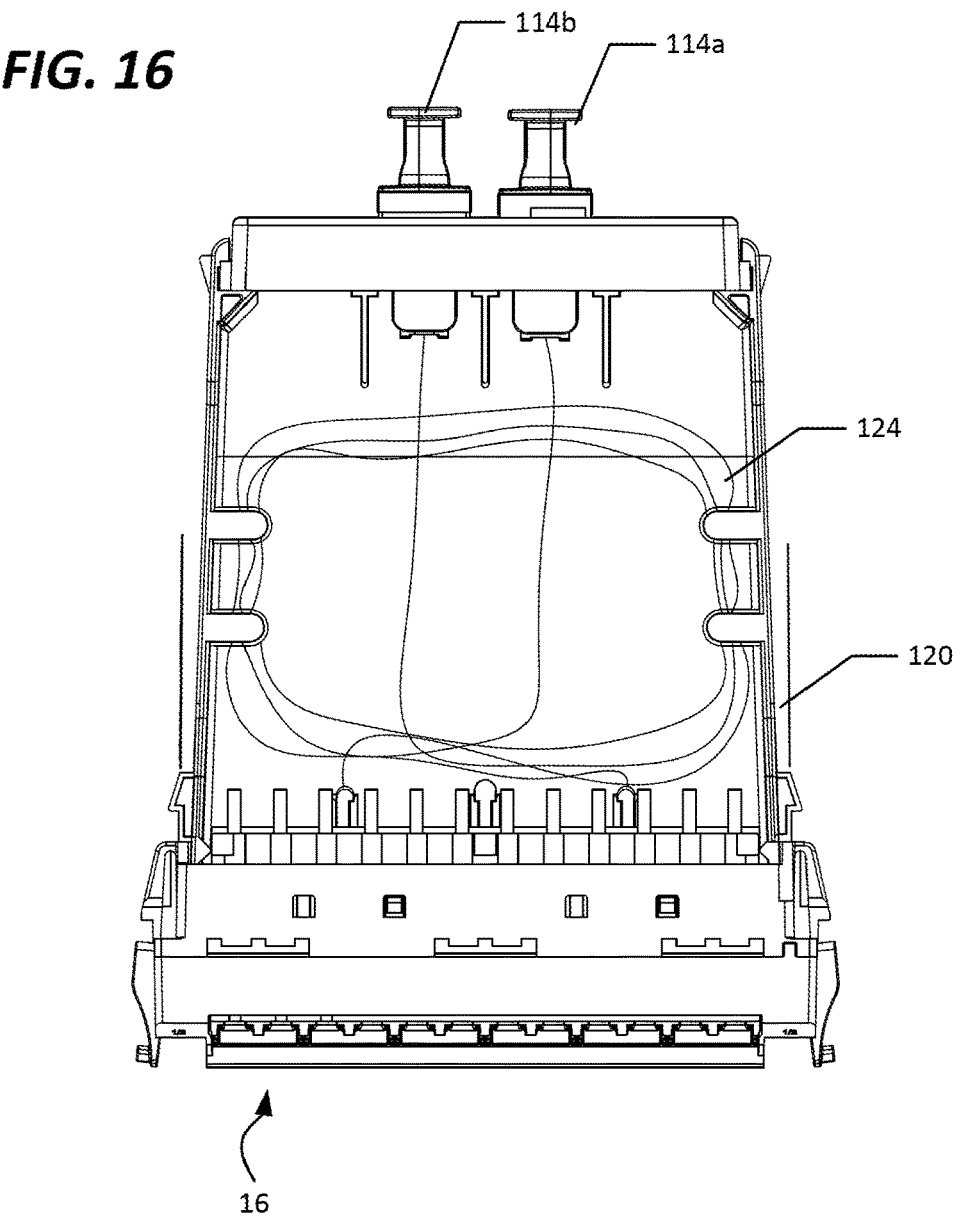
FIG. 16 is a top plan view with a cover removed of the optical distribution module of FIG. 11.
Figure 17:
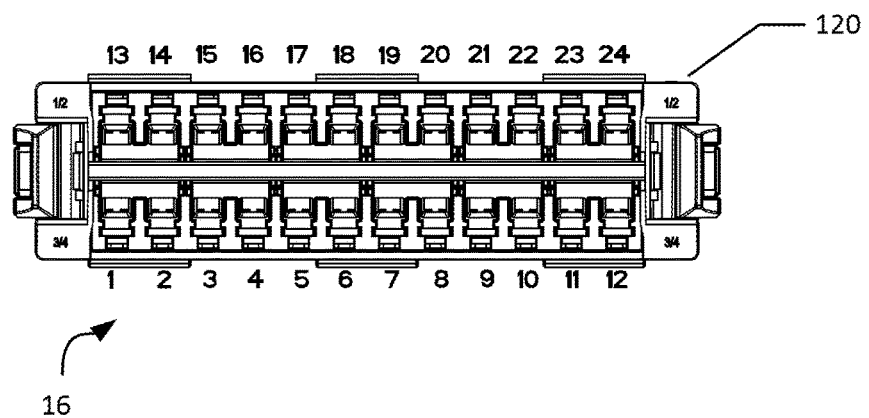
FIG. 17 is a front plan view of the optical distribution module of FIG. 11.

As seen best in FIG. 7 and FIG. 10, the LC connectors 16 are numbered and arranged consecutively in the first and second rows 18a-b (shown as numbered 1-12 and 13-24, respectively). Referring specifically to FIGS. 8-10, a routing and layout of fibers between the MPO connectors 14a-b and the LC connectors 16 is discussed in further detail. As seen in FIGS. 8-9, in this embodiment a first MPO connector 14a includes twelve fiber connections. In the embodiment shown, each of the twelve fiber connections of the first MPO connector 14a connect to a same row of the LC connectors, shown as the bottom row, or connectors 1-12 of FIGS. 8-9. Furthermore, the receive fibers (typically fibers 1-6 of the MPO connector) are connected to alternating LC connectors, e.g., the first, third, fifth, seventh, ninth, and eleventh LC connectors, and the transmit fibers (typically fibers 7-12 of the MPO connector) are connected to the corresponding alternating LC connectors in the same row (e.g., second, fourth sixth, eighth, tenth, and twelfth LC connectors). In particular, a first LC connector connects to the first MPO fiber connection, the second LC connector connects to the twelfth MPO fiber connection, the third LC connector connects to the second MPO fiber connection, the fourth LC connector connects to the eleventh MPO fiber connection, the fifth LC connector connects to the third MPO fiber connection, the sixth LC connector connects to the tenth MPO fiber connection, the seventh LC connector connects to the fourth MPO fiber connection, the eighth LC connector connects to the ninth MPO fiber connection, the ninth LC connector connects to the fifth MPO fiber connection, the tenth LC connector connects to the eighth MPO fiber connection, the eleventh LC connector connects to the sixth MPO fiber connection, and the twelfth LC connector connects to the seventh MPO fiber connection.

Regarding the second MPO connector 14b, a similar scheme is used, in which twelve MPO connectors, typically using receive fibers 1-6 and transmit fibers 7-12, are connected such that the receive fibers are connected to even numbered LC connectors (e.g., LC connectors 14, 16, 18, 20, 22, and 24), and transmit fibers are connected to odd-numbered LC connectors (e.g., LC connectors #13, 15, 17, 19, 21, 23). In particular, a thirteenth LC connector connects to the twelfth MPO fiber connection of the second MPO 14b, a fourteenth LC connector connects to the first MPO fiber connection of the second MPO 14b, a fifteenth LC connector connects to the eleventh MPO fiber connection, a sixteenth LC connector connects to the second MPO fiber connection, a seventeenth LC connector connects to the tenth MPO fiber connection, an eighteenth LC connector connects to the third MPO fiber connection, a nineteenth LC connector connects to the ninth MPO fiber connection, a twentieth LC connector connects to the fourth MPO fiber connection, a twenty-first LC connector connects to the eighth MPO fiber connection, a twenty-second LC connector connects to the fifth MPO fiber connection, a twenty-third LC connector connects to the seventh MPO fiber connection, and a twenty-fourth LC connector connects to the sixth MPO fiber connection.

As an end effect of the routing, the two rows of LC connectors 16 include alternating transmit and receive fibers, rather than a single row completely of transmit fibers and a second single row of receive fibers as in certain prior modules. Furthermore, a grouping of fibers includes four transmit fibers and four receive fibers, and four fibers from each of first and second rows. Furthermore, at the MPO side, the first and second MPOs 14a, 14b include fiber routings from the first and second rows of LC connectors, respectively, with the transmit and receive fibers segregated such that one or more of the the pairs of transmit and receive fibers at the LC connectors are non-adjacent to one another. In the particular example shown, a first transmit fiber and first receive fiber (e.g., LC connectors #1-2) are routed to outermost fibers of the MPO 14a, a second transmit and second receive fiber (e.g., LC connectors 3-4) are routed to next-outermost fibers of the MPO 14a, the third transmit and receive fiber (e.g., LC connectors 5-6) are routed to the third-outermost fibers, and so on, with LC connectors 11-12 routed to the innermost fibers of the MPO 14a. A similar arrangement is provided as well with respect to the second row of LC connectors, with LC connectors 13-24 being routed to MPO 14b in a complementary manner.

Referring to FIGS. 11-19, a second module 110 is illustrated, in accordance with the present disclosure. The second module 110 generally has corresponding components to those of module 10 of FIGS. 1-10, above. For consistency, like features are numbered similarly, with housing 112 having first and second MPO connectors 114a-b on a first side, extending through a faceplate 123, and an array of LC connectors 116 disposed in two rows 118a-b on a second side. However, a routing of fibers 124 housed by the cassette 120 and shell 122 varies compared to the routing of module 10 of FIGS. 1-10. In this example, the module 110 can be configured to connect to three 8-fiber transceivers using a single 2×3 array cord, which is a 24 fiber cable having two 12-fiber MPOs on a first end and 3 8-fiber MPOs on a second end, as seen below in connection with FIGS. 31-34.

As in the module 10 of FIGS. 1-10, the LC connectors 116 are arranged into a number of groups having an even number of fibers therein. In both example configurations, the LC connectors 116 are arranged into three groups of eight fibers each (4 transmit and 4 receive fibers).

Figure 19:
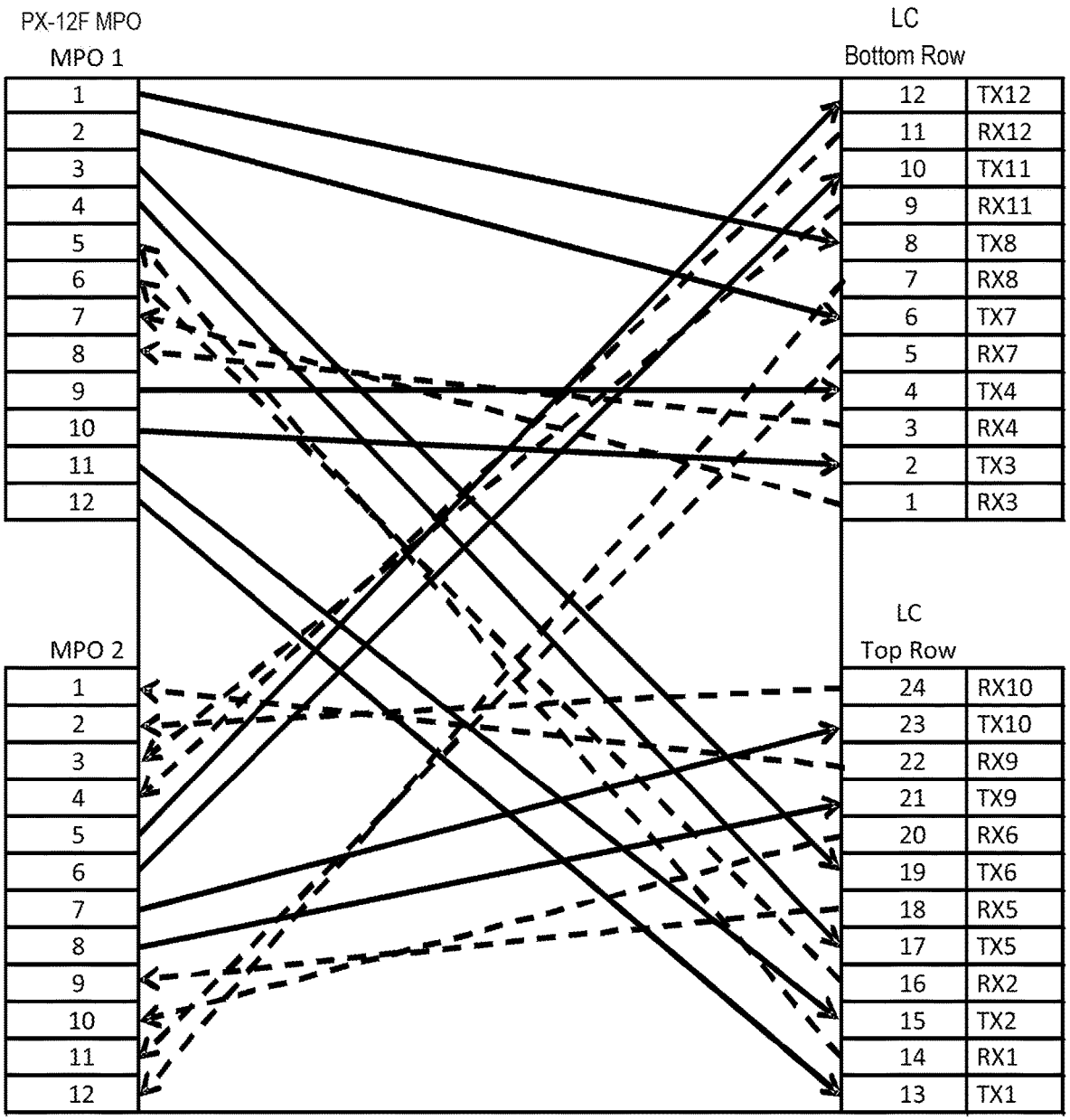
FIG. 19 is a graphical depiction of the internal fiber routing of the optical distribution module of FIG. 11.
Figure 20:
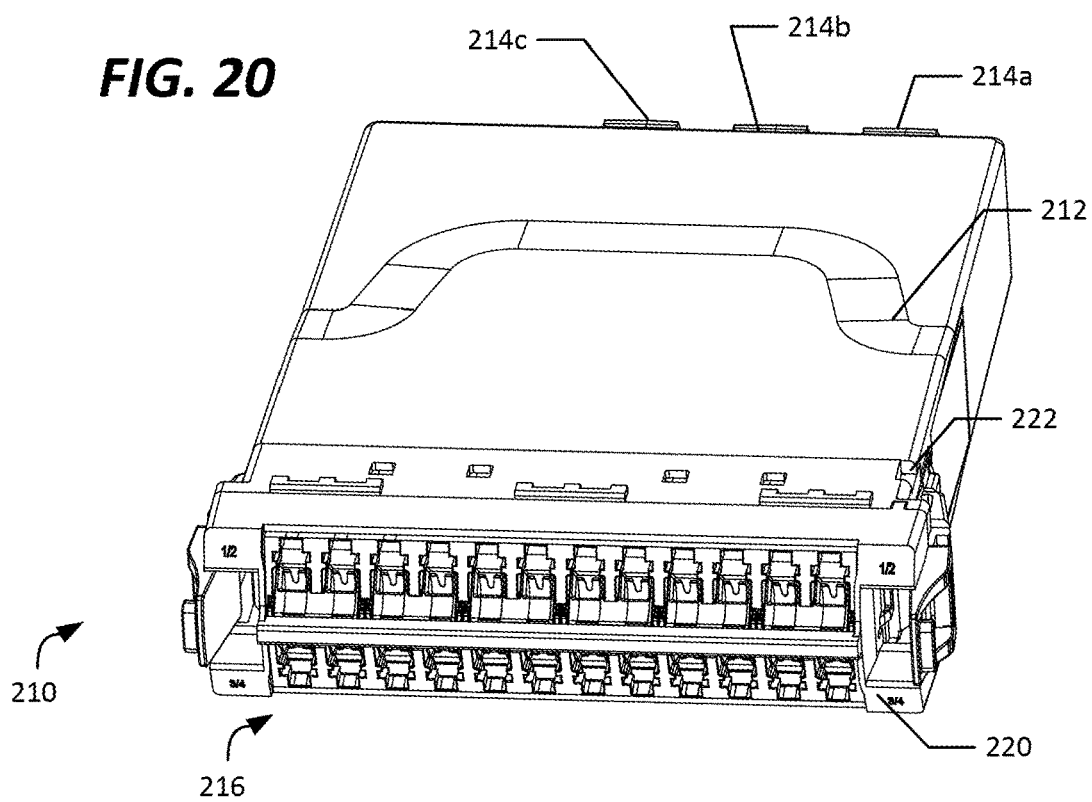
FIG. 20 illustrates a front perspective view of an optical distribution module, according to a third example embodiment.
Figure 21:
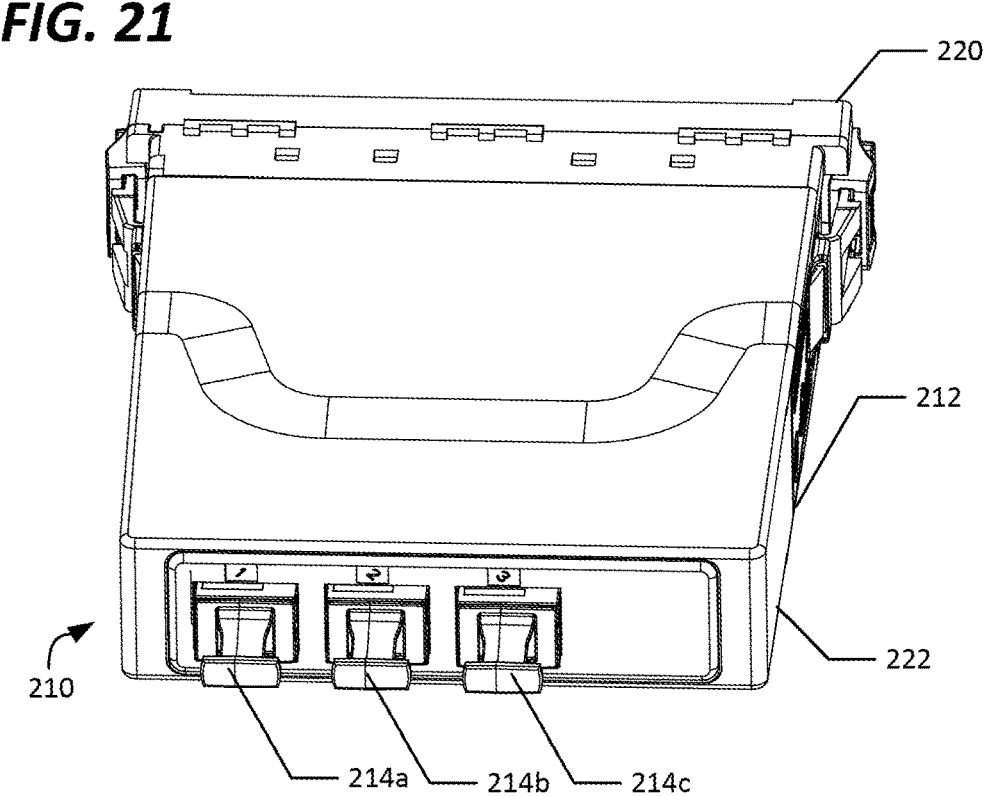
FIG. 21 illustrates a rear perspective view of the optical distribution module of FIG. 20.
Figure 22:
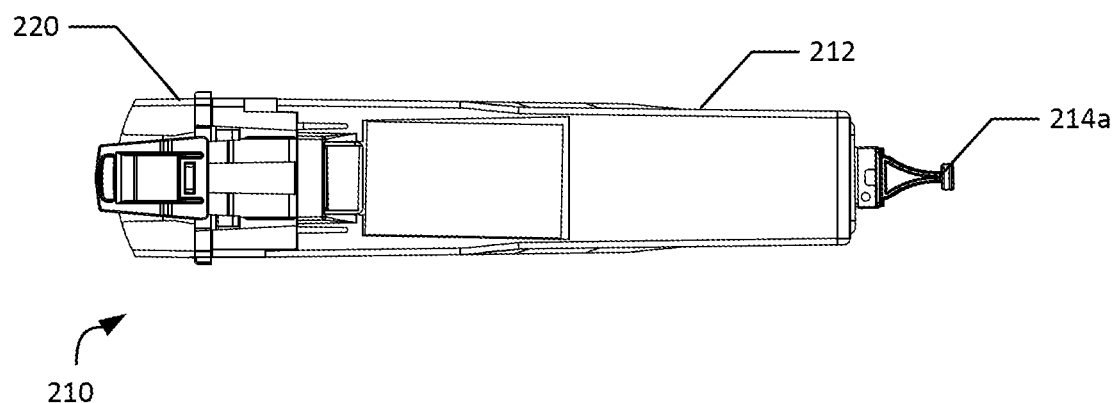
FIG. 22 is a side view of the optical distribution module of FIG. 20.
Figure 23:
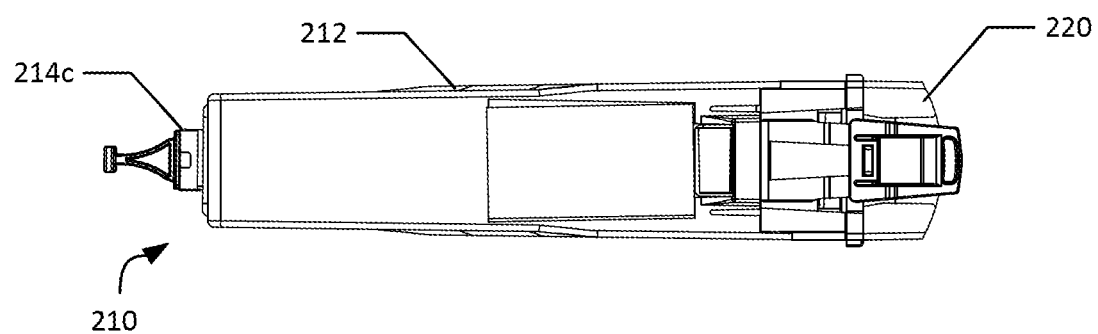
FIG. 23 is an opposite side view of the optical distribution module of FIG. 20.
Figure 24:
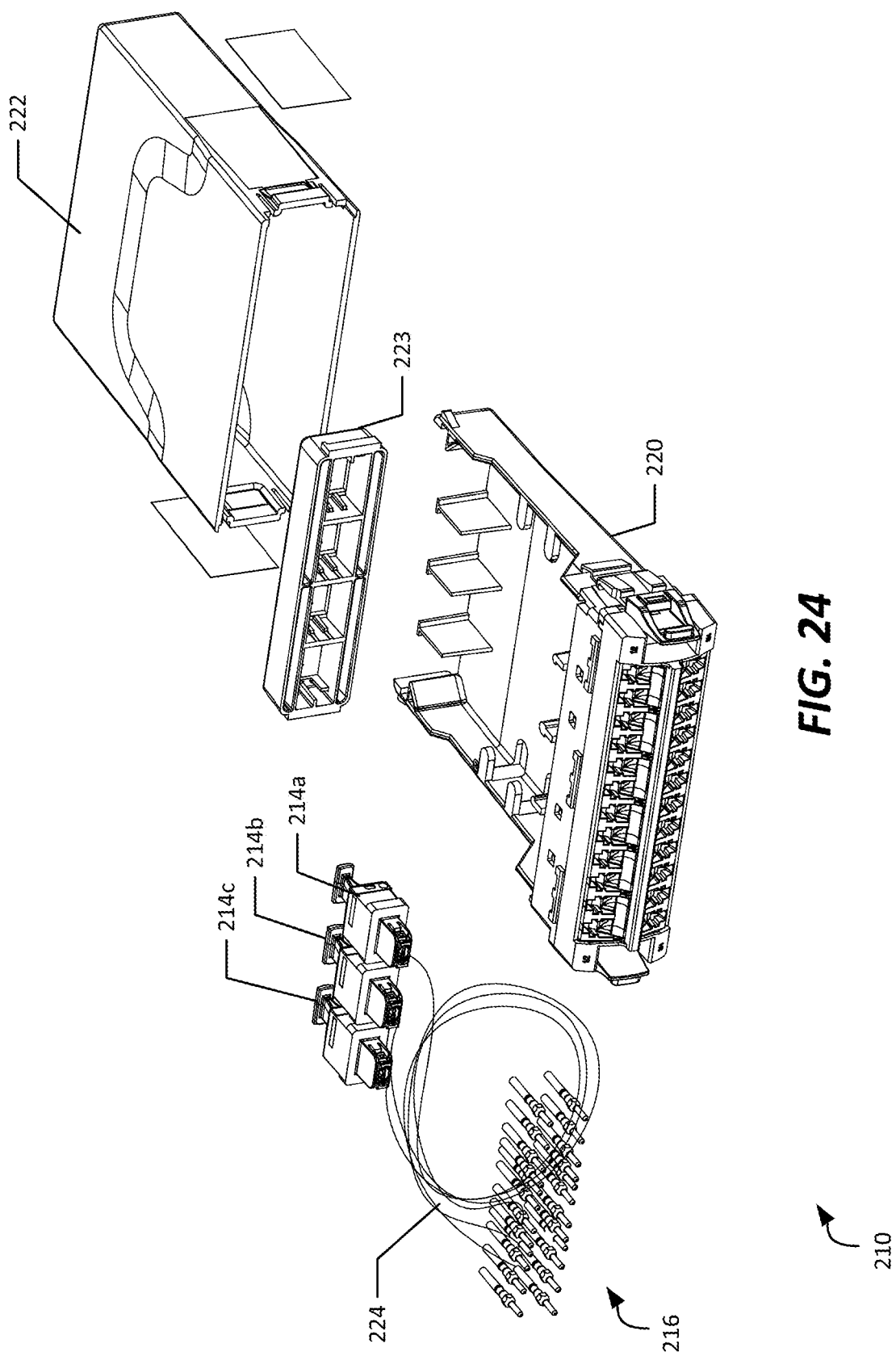
FIG. 24 is an exploded view of the optical distribution module of FIG. 20.
Figure 25:
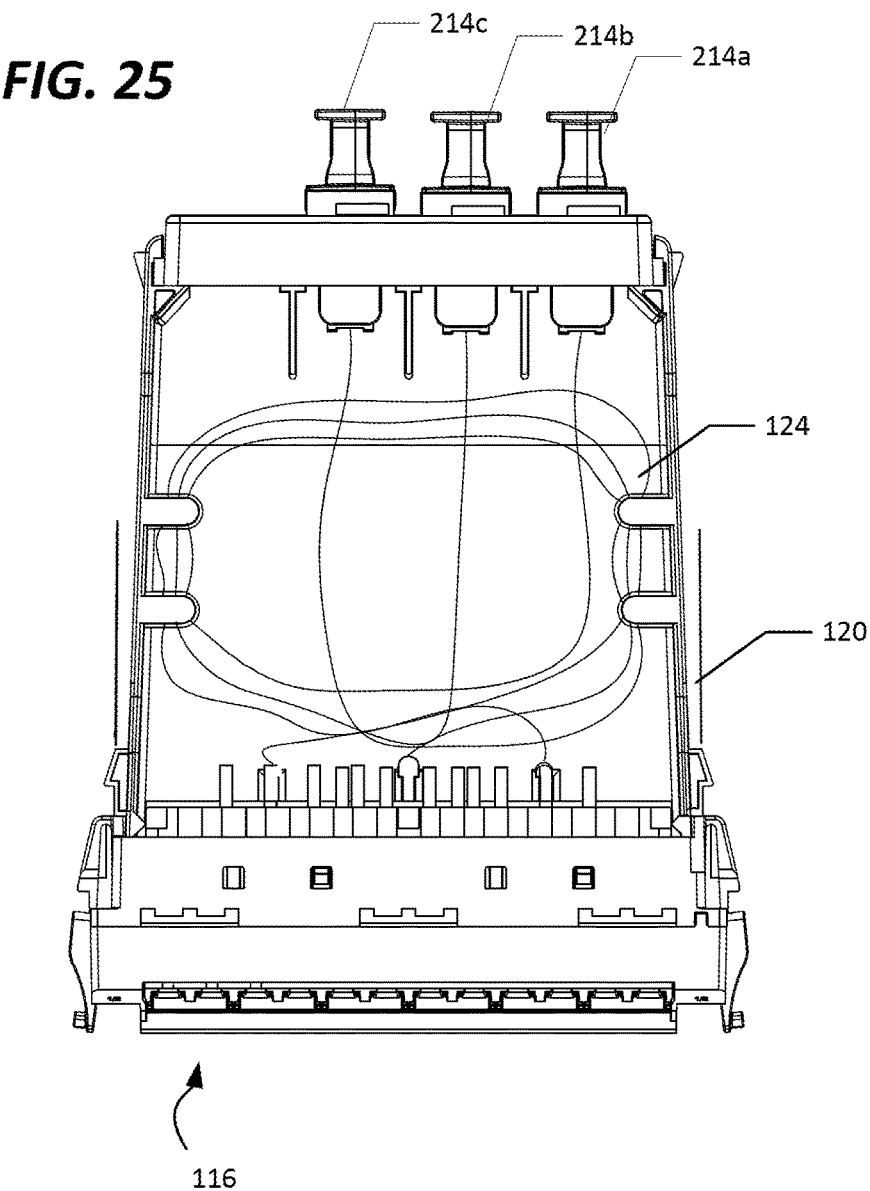
FIG. 25 is a top plan view with a cover removed of the optical distribution module of FIG. 20.
Figure 26:
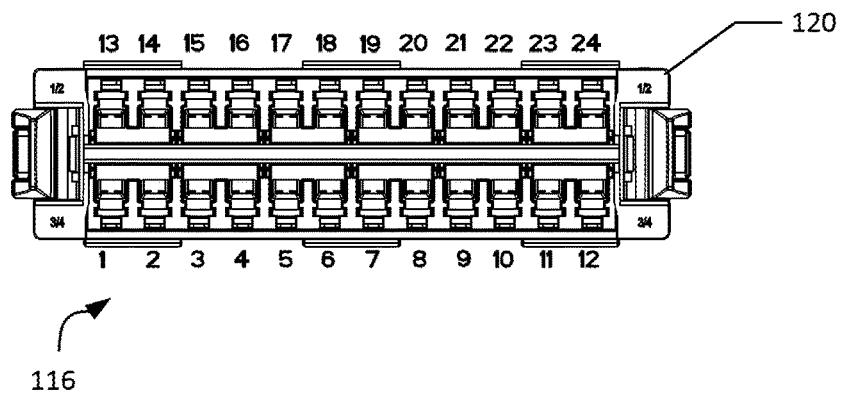
FIG. 26 is a front plan view of the optical distribution module of FIG. 20.

In the example of FIGS. 11-19, and as specifically illustrated in FIGS. 18-19, it is noted that the arrangement of fibers 124 differs from that in FIGS. 1-10 because the fibers route from the MPO connectors differently, with fibers from a single MPO connector 114 being routed to LC connectors 116 both within a first row and a second row 118a-b. In the example shown, the first MPO connector 114a carries eight transmit fibers, routing four to each of the top and bottom rows 118a-b of LC connectors 116. The first MPO connector carries four receive fibers, which are distributed, two each, to the first and second (bottom and top) rows 118a-b of LC connectors. The second MPO connector 114b carries four transmit fibers, routing two each to the first and second (bottom and top) rows 118a-b of LC connectors 116, and eight receive fibers, routing four each to the first and second (bottom and top) rows 118a-b of LC connectors 116.

Specifically, in the embodiment shown, if the LC connectors are numbered and arranged sequentially in first and second rows 118a-b, for the first row 118a of LC connectors 116, a first LC connector (in first row 118a) connects to a seventh MPO fiber connection of the first MPO connector 114a, the second LC connector connects to the tenth MPO fiber connection of the first MPO connector 114a, the third LC connector connects to the eighth MPO fiber connection of the first MPO connector 114a, the fourth LC connector connects to the ninth MPO fiber connection of the first MPO connector 114a, the fifth LC connector connects to the eleventh MPO fiber connection of the second MPO connector 114b, the sixth LC connector connects to the second MPO fiber connection of the first MPO connector 114a, the seventh LC connector connects to the twelfth MPO fiber connection of the second MPO connector 114b, the eighth LC connector connects to the first MPO fiber connection of the first MPO connector 114a, the ninth LC connector connects to the third MPO fiber connection of the second MPO connector 114b, the tenth LC connector connects to the sixth MPO fiber connection of the second MPO connector 114b, the eleventh LC connector connects to the fourth MPO fiber connection of the second MPO connector 114b, and the twelfth LC connector connects to the fifth MPO fiber connection of the second MPO connector 114b.

Regarding the second row 118b of LC connectors 116, a thirteenth LC connector connects to the twelfth MPO fiber connection of the first MPO connector 114a, a fourteenth LC connector connects to the fifth MPO fiber connection of the first MPO connector 114a, a fifteenth LC connector connects to the eleventh MPO fiber connection of the first MPO connector 114a, a sixteenth LC connector connects to the sixth MPO fiber connection of the first MPO connector 114a, a seventeenth LC connector connects to the fourth MPO fiber connection of the first MPO connector 114a, an eighteenth LC connector connects to the ninth MPO fiber connection of the second MPO connector 114b, a nineteenth LC connector connects to the third MPO fiber connection of the first MPO connector 114a, a twentieth LC connector connects to the tenth MPO fiber connection of the second MPO connector 114b, a twenty-first LC connector connects to the eighth MPO fiber connection of the second MPO connector 114b, a twenty-second LC connector connects to the first MPO fiber connection of the second MPO connector 114b, a twenty-third LC connector connects to the seventh MPO fiber connection of the second MPO connector 114b, and a twenty-fourth LC connector connects to the second MPO fiber connection of the second MPO connector 114b.

Referring to FIGS. 20-28, a third module 210 is illustrated, in accordance with the present disclosure. The third module 210 generally has corresponding components to those of module 10 of FIGS. 1-10, above. For consistency, like features are numbered similarly, with housing 212 having a first side and a second side and formed from a cassette 220 and shell 222, with an array of LC connectors 216 disposed in two rows 218a-b on a second side. However, on the first side of the housing 212, there are three MPO connectors 214a-c extending through a faceplate 223, and fibers 224 are routed differently from the three MPO connectors 214a-c to the 24 LC connectors 216, disposed in first and second rows 218a-b, respectively.

Generally, the arrangement of MPO connectors 214a-c and routing to LC connectors 216 allows three 8-fiber 40 G fiber optic transceivers, such as QSFP transceivers, to broken out into 10 G duplex LC ports. The module 210 connects to 3 8-fiber transceivers using 3 separate 8-fiber or 12-fiber MPO patch cords. This allows the 3 transceivers to optionally be located in 3 separate locations. The fibers within the module 210 are arranged to accept Method B MPO patch cords (which map position 1 at a first end to position 12 at a second end, and vice versa, for a twelve-fiber MPO connector).

Figures 30, 30A, 30B:
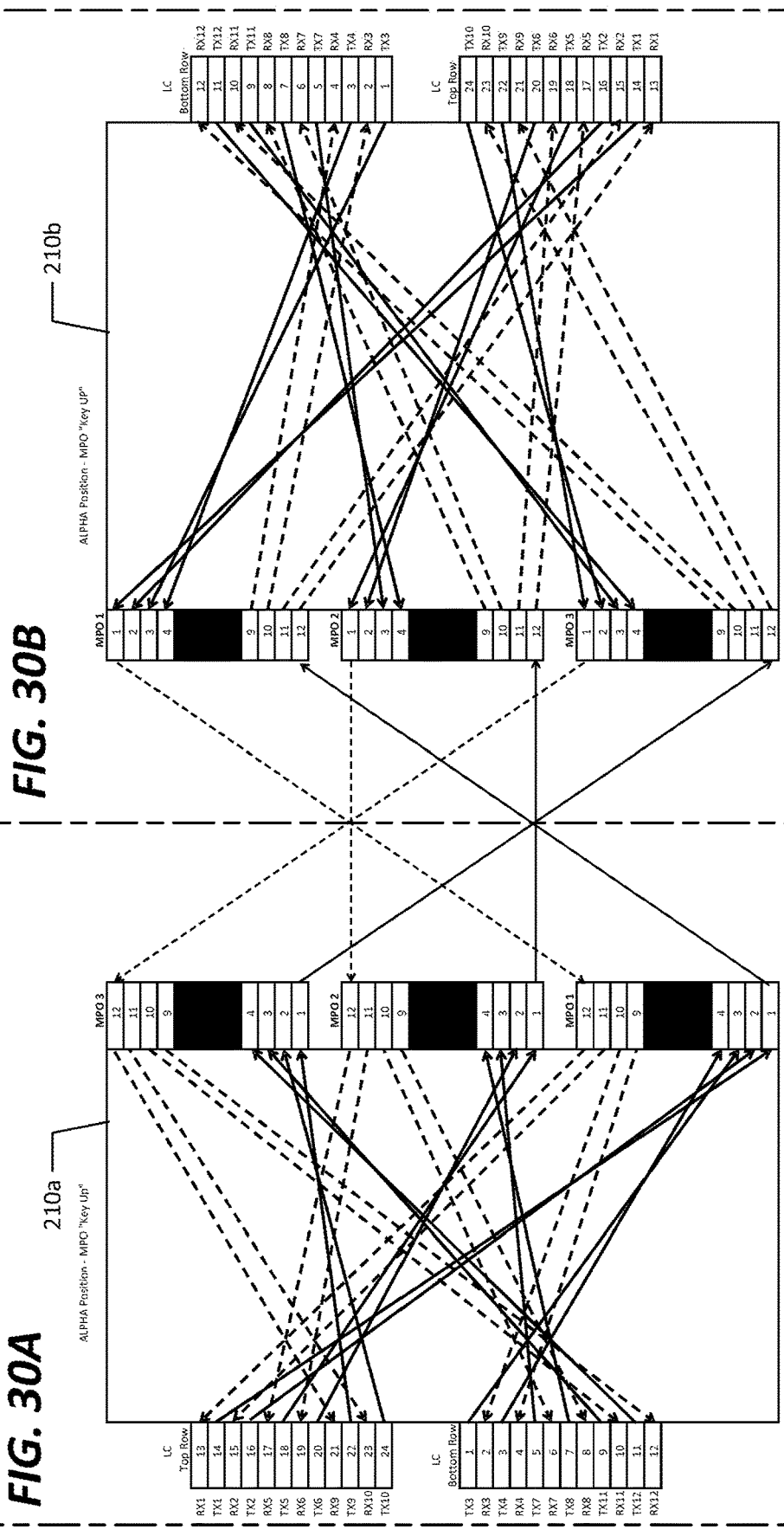
FIGS. 30, 30A and 30B illustrate an alpha-alpha arrangement interconnecting the module of FIGS. 20-29.
Figure 30A:
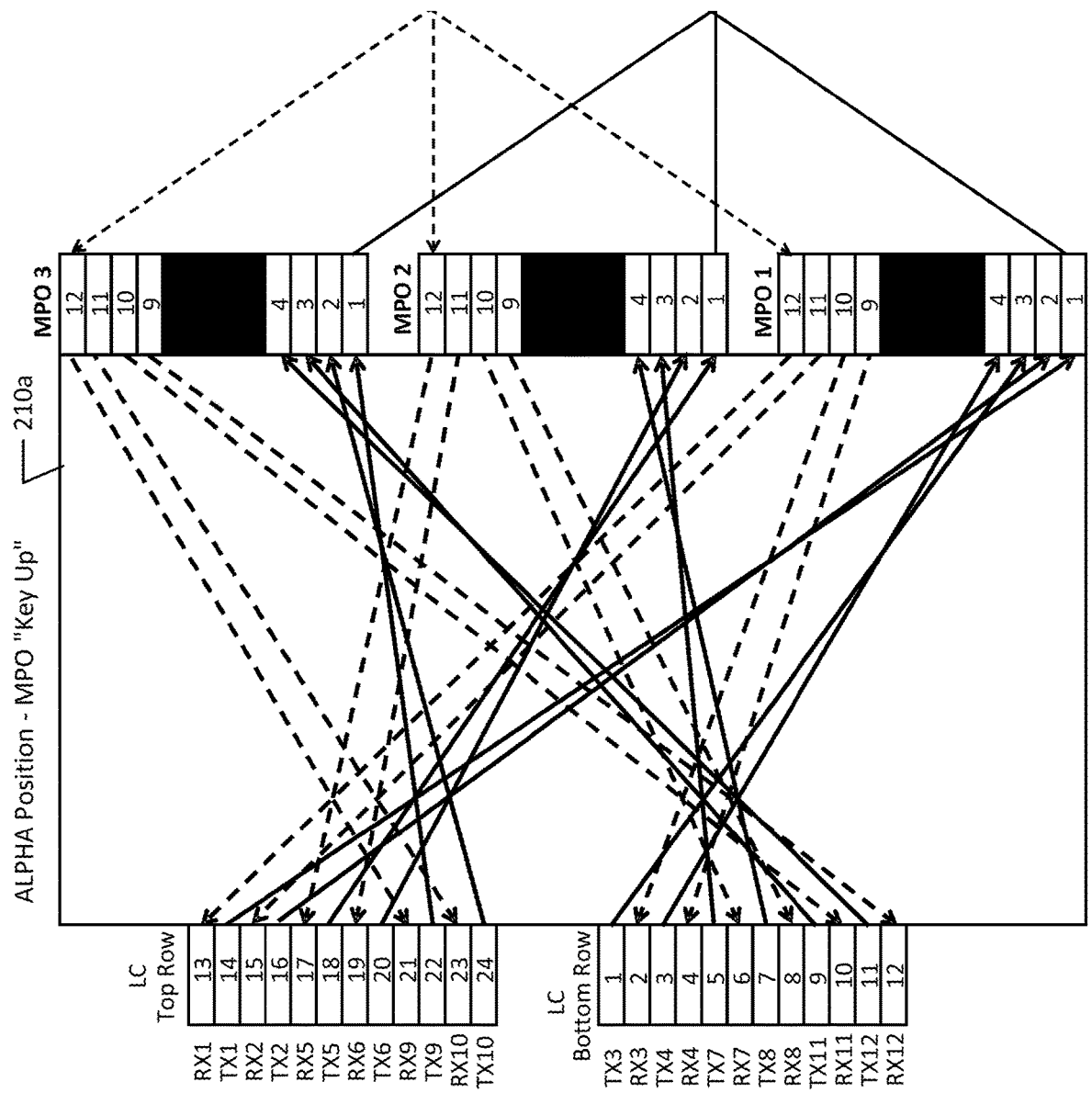
Figure 30B:
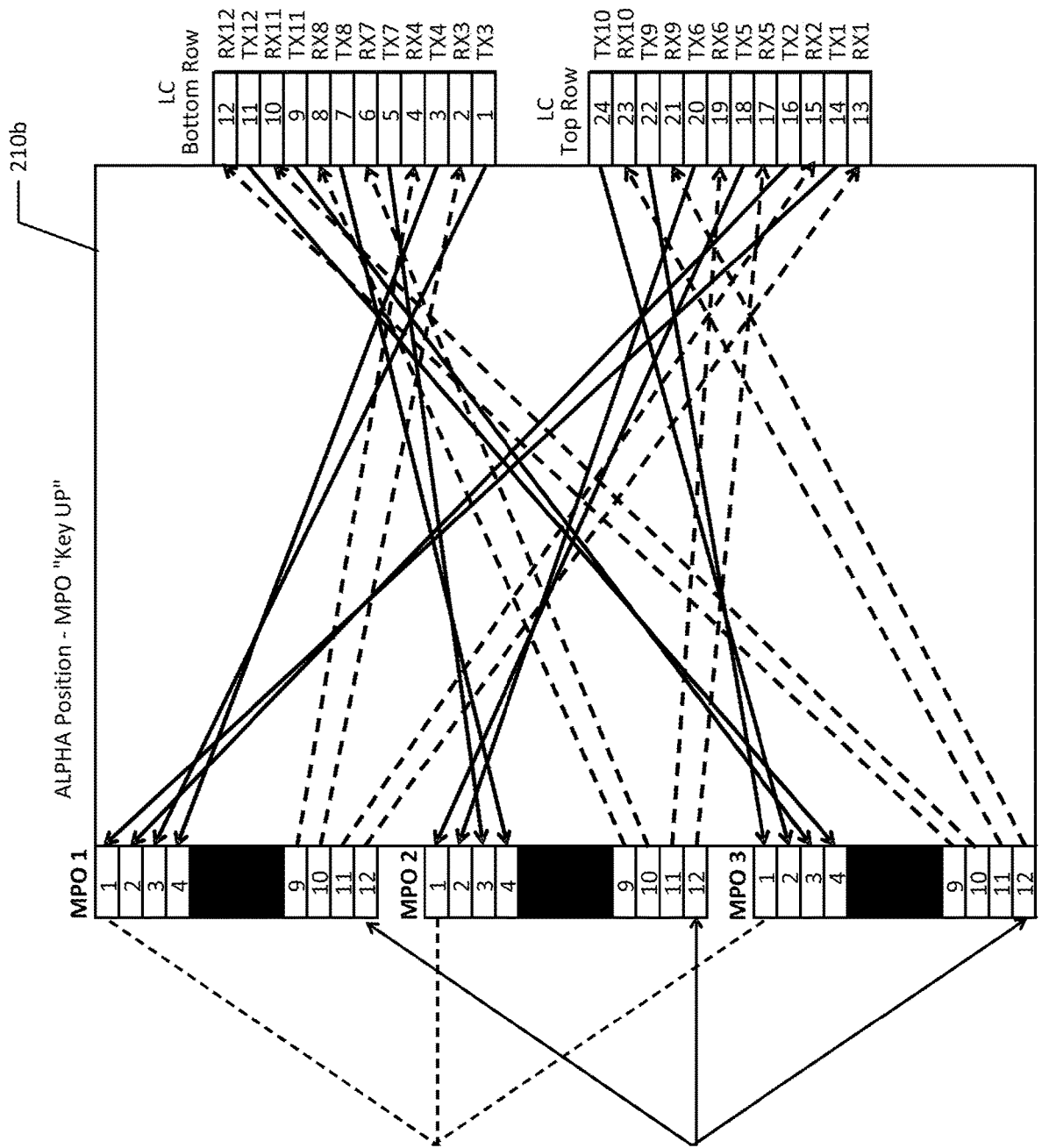
Figures 31, 31A, 31B:
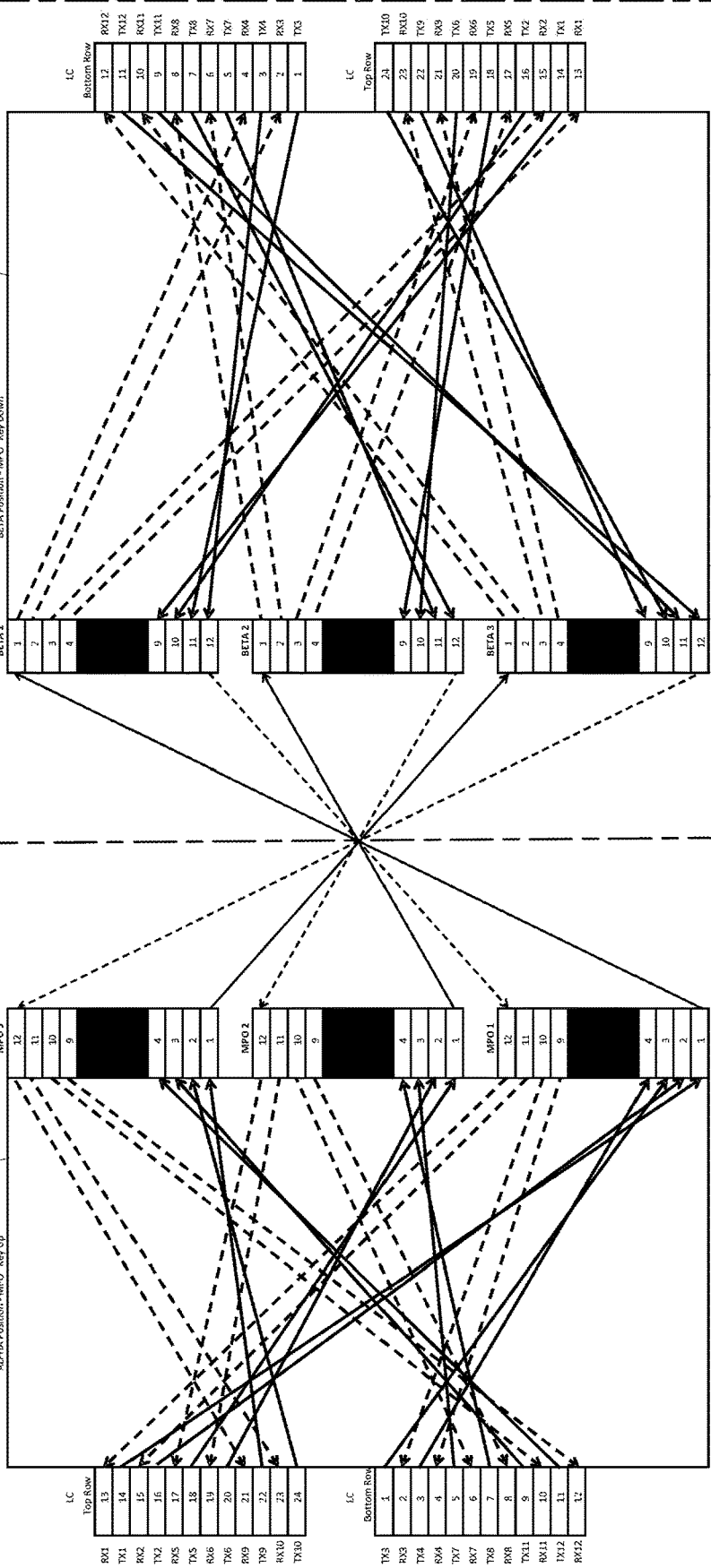
FIGS. 31, 31A and 31B illustrate an alpha-beta arrangement interconnecting the module of FIGS. 20-29, with one of the modules inverted.
Figure 31A:
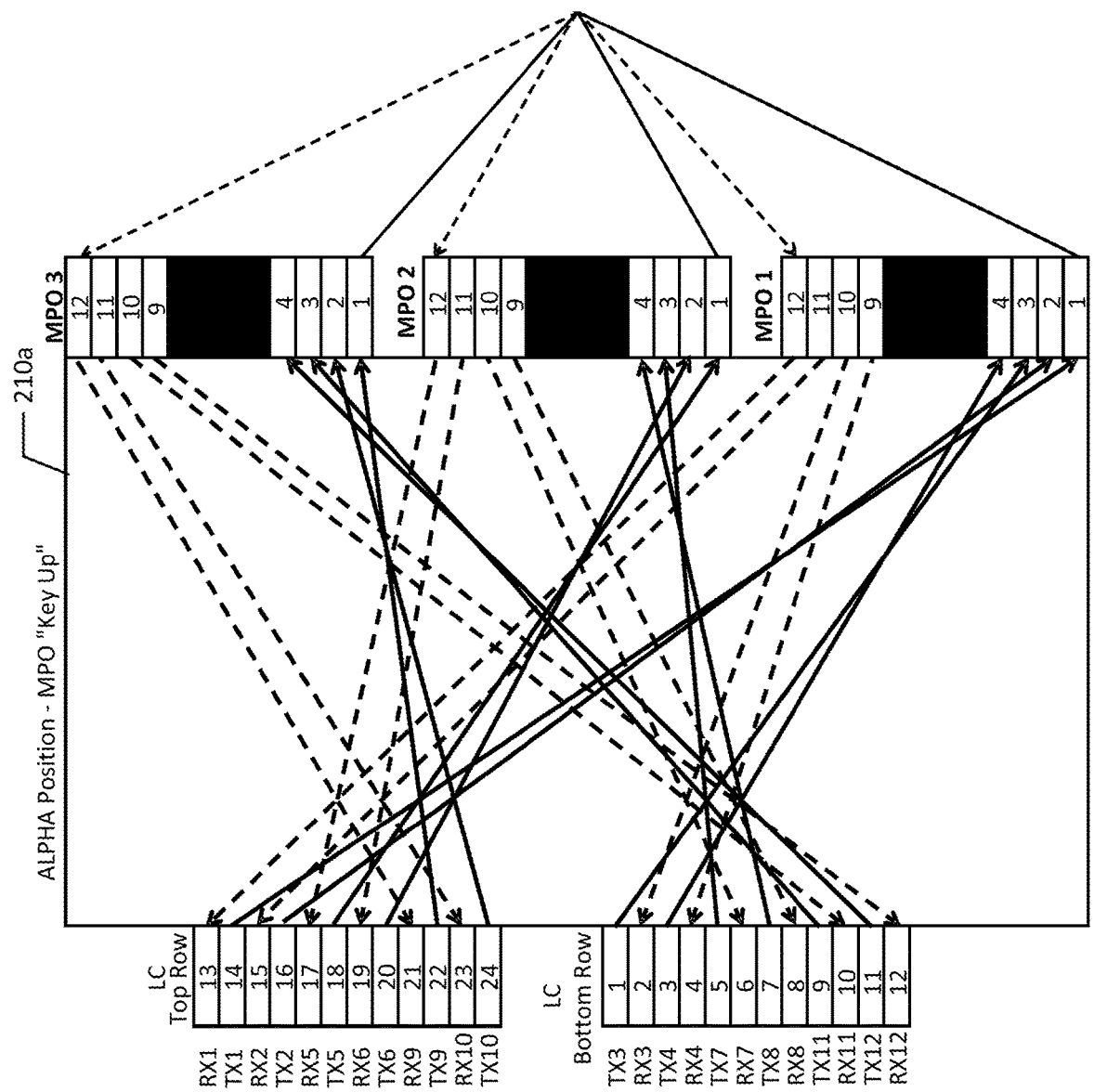
Figure 31B:
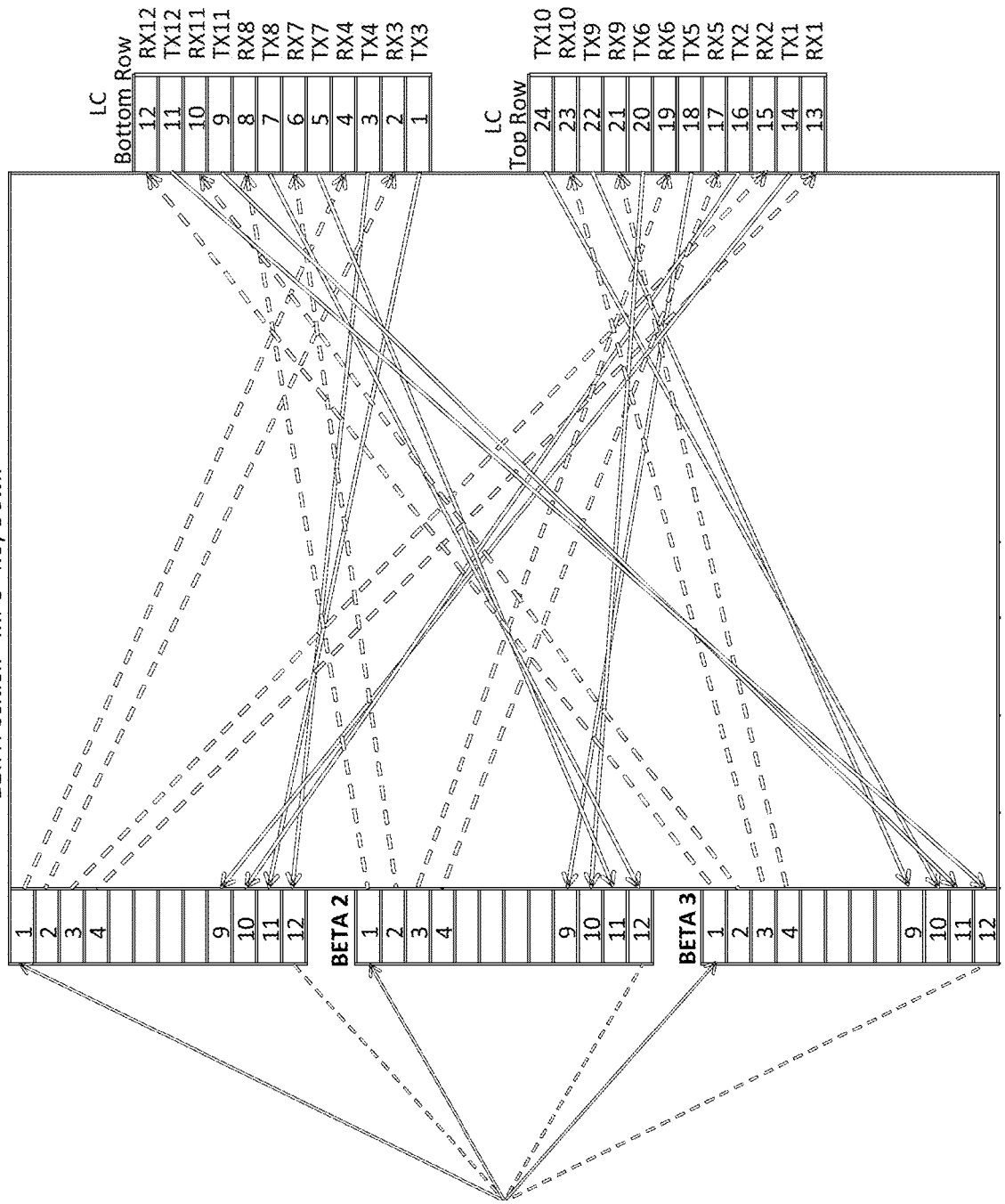
Figure 32:
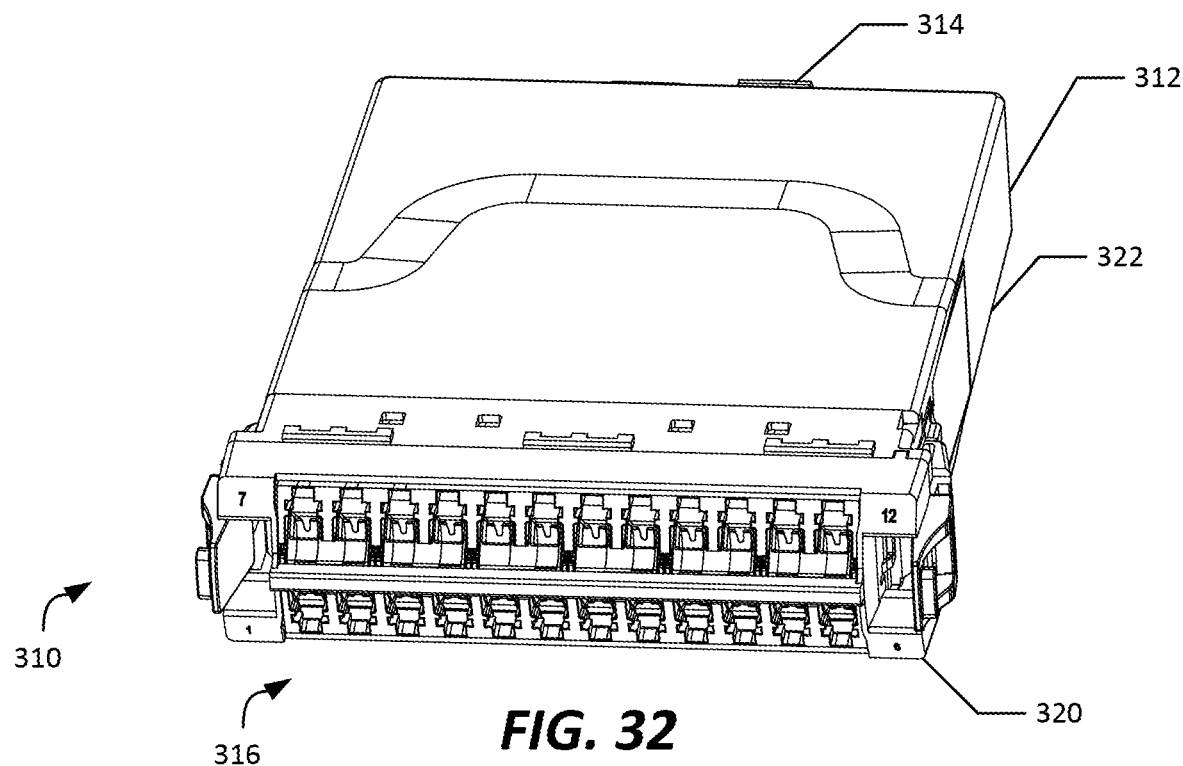
FIG. 32 illustrates a front perspective view of an optical distribution module, according to a fourth example embodiment.
Figure 33:
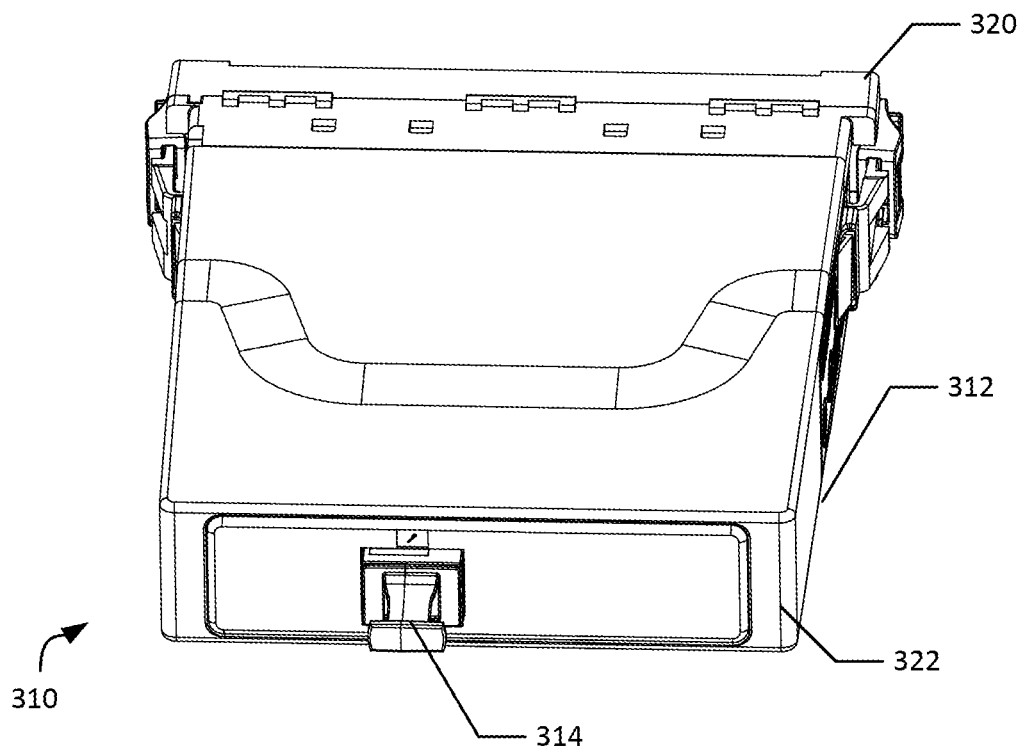
FIG. 33 illustrates a rear perspective view of the optical distribution module of FIG. 32.
Figure 34:
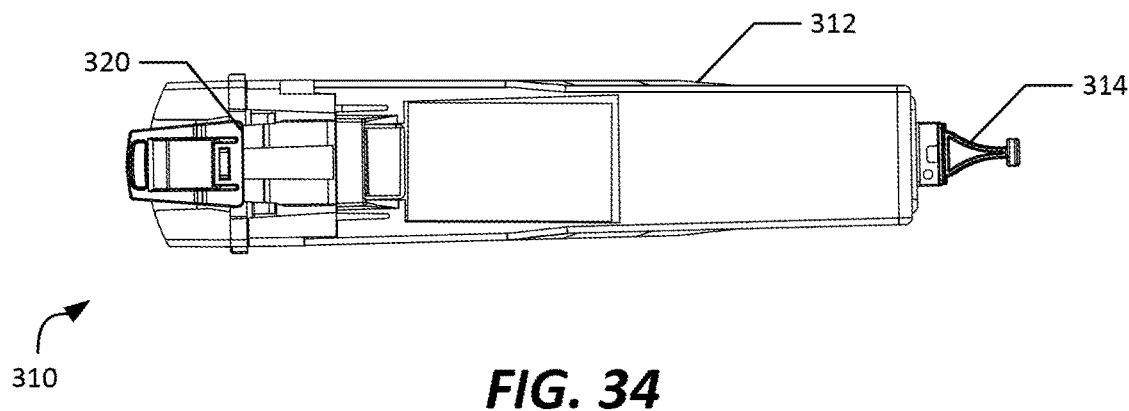
FIG. 34 is a side view of the optical distribution module of FIG. 32.
Figure 35:
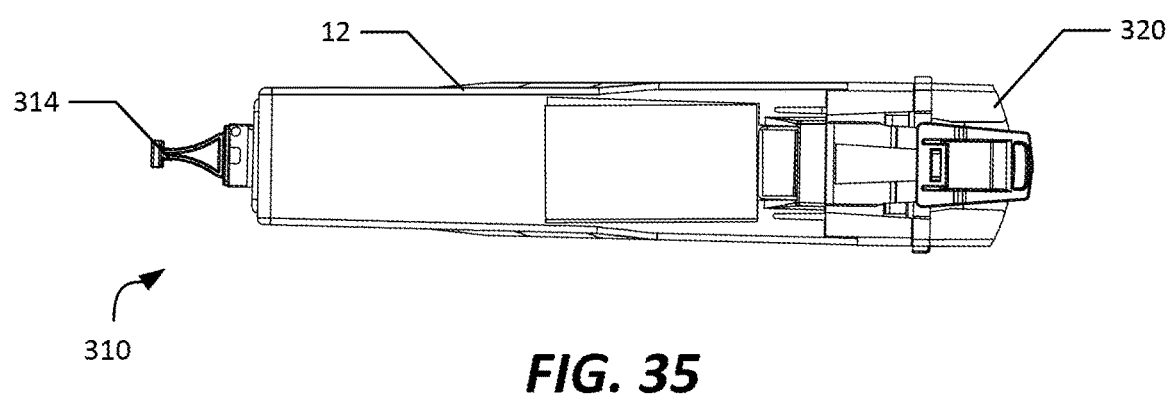
FIG. 35 is an opposite side view of the optical distribution module of FIG. 32.
Figure 36:
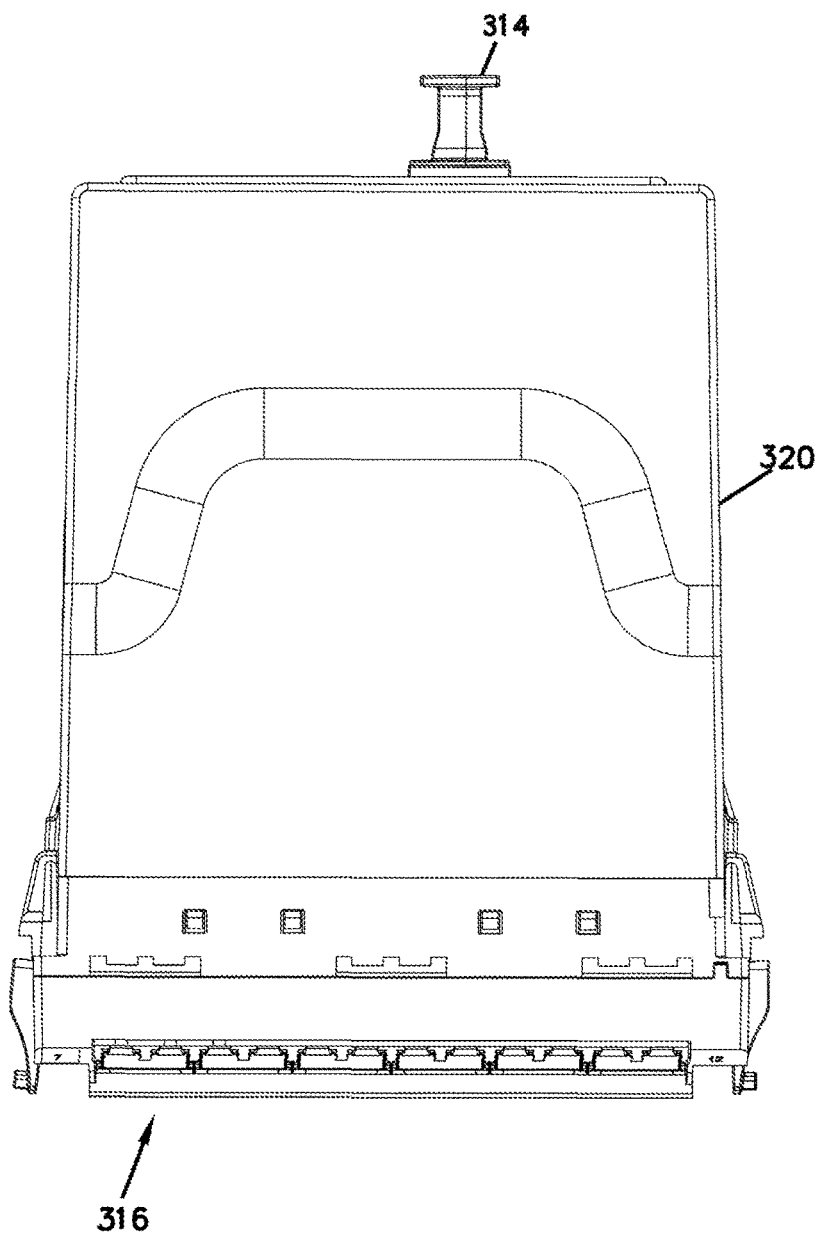
FIG. 36 is a top plan view the optical distribution module of FIG. 32.
Figure 37:
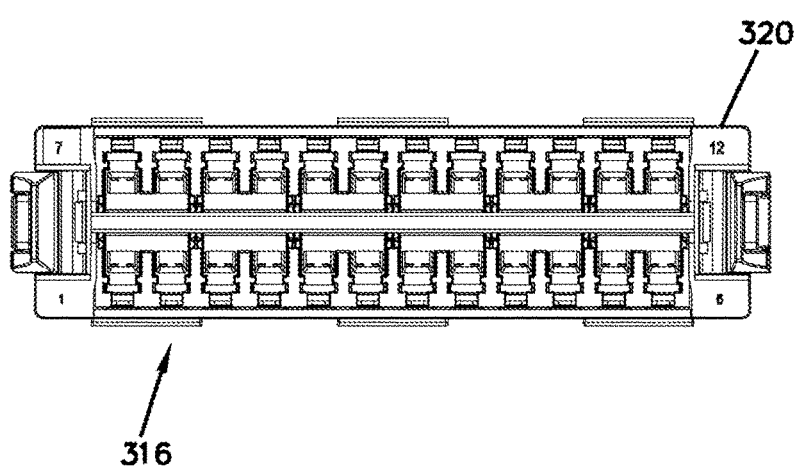
FIG. 37 is a front plan view the optical distribution module of FIG. 32.

As in the module 10 of FIGS. 1-10, the LC connectors 216 are arranged into a number of groups having an even number of fibers therein, and arranged into transmit-receive pairs. In this example, at the LC connectors, various different arrangements can be used to distribute the transmit and receive pairs across the first and second rows 218a-b, as illustrated in FIGS. 30-31, discussed below.

Figure 28:
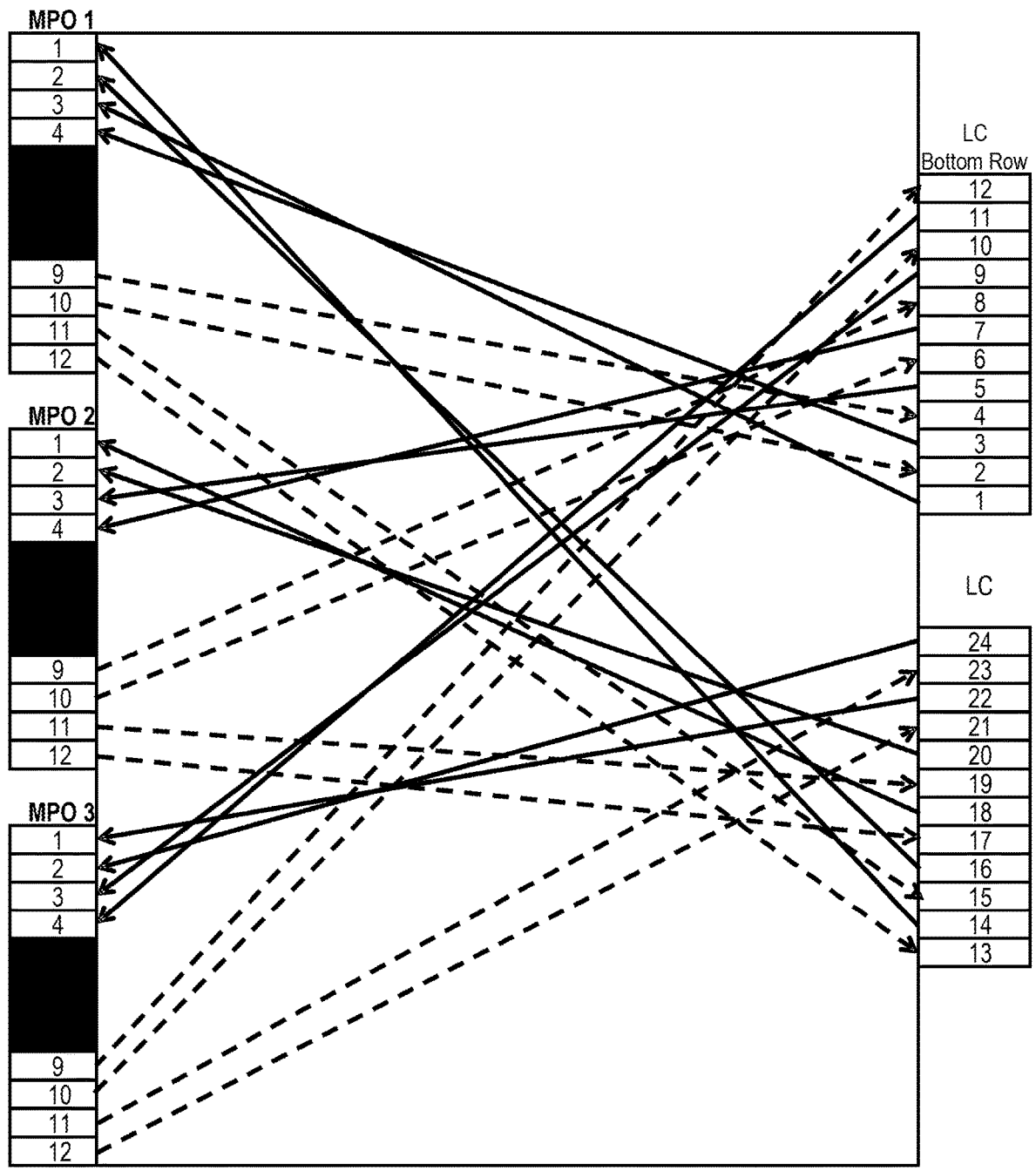
FIG. 28 is a graphical depiction of the internal fiber routing of the optical distribution module of FIG. 20.

In the example fiber routing configuration of FIG. 28, three twelve-fiber MPO connectors 214a-c are used, in which a middle four fibers of each MPO remain dark. Accordingly, at module 210, only a first four and a last four fibers (a total of eight fibers) are utilized from each MPO connector 214a-c.

In the example fiber routing configuration as shown, each of the MPO connectors uses a first four sequential fiber connections as receive fibers and a last four sequential fiber connections as transmit fibers. Each MPO connector 214a-c routes two transmit and two receive fibers to each of a first (bottom) row 218a and second (top) row 218b of the LC connectors 216.

For the first row 218a of LC connectors 216, a first LC connector (in first row 218a) connects to a third MPO fiber connection of the first MPO connector 214a, the second LC connector connects to the tenth MPO fiber connection of the first MPO connector 214a, the third LC connector connects to the fourth MPO fiber connection of the first MPO connector 214a, the fourth LC connector connects to the ninth MPO fiber connection of the first MPO connector 214a, the fifth LC connector connects to the third MPO fiber connection of the second MPO connector 214b, the sixth LC connector connects to the tenth MPO fiber connection of the second MPO connector 214b, the seventh LC connector connects to the third MPO fiber connection of the second MPO connector 214b, the eighth LC connector connects to the ninth MPO fiber connection of the second MPO connector 214b, the ninth LC connector connects to the third MPO fiber connection of the second MPO connector 114b, the tenth LC connector connects to the tenth MPO fiber connection of the third MPO connector 214c, the eleventh LC connector connects to the fourth MPO fiber connection of the third MPO connector 214c, and the twelfth LC connector connects to the ninth MPO fiber connection of the third MPO connector 214c.

Regarding the second row 218b of LC connectors 216, a thirteenth LC connector connects to the twelfth MPO fiber connection of the first MPO connector 214a, a fourteenth LC connector connects to the first MPO fiber connection of the first MPO connector 214a, a fifteenth LC connector connects to the eleventh MPO fiber connection of the first MPO connector 214a, a sixteenth LC connector connects to the second MPO fiber connection of the first MPO connector 214a, a seventeenth LC connector connects to the twelfth MPO fiber connection of the second MPO connector 214b, an eighteenth LC connector connects to the first MPO fiber connection of the second MPO connector 214b, a nineteenth LC connector connects to the eleventh MPO fiber connection of the second MPO connector 214b, a twentieth LC connector connects to the second MPO fiber connection of the second MPO connector 214b, a twenty-first LC connector connects to the twelfth MPO fiber connection of the third MPO connector 214c, a twenty-second LC connector connects to the first MPO fiber connection of the third MPO connector 214c, a twenty-third LC connector connects to the eleventh MPO fiber connection of the third MPO connector 214c, and a twenty-fourth LC connector connects to the second MPO fiber connection of the third MPO connector 214c.

As compared with the arrangement of LC connectors in FIG. 10, the transmit and receive pairs can be arranged in groups with transmit and receive fibers for a particular pair being next to each other, and with groups of transmit and receive pairs being positioned such that groups could be used for higher data rate services. In the embodiment shown, the transmit and receive pairs are grouped such that a first four transmit and receive pairs (TX1-4 and RX1-4) are along a first side group, a second four transmit and receive pairs (TX5-8 and RX5-8) are in a central group, and a third four transmit and receive pairs (TX9-12 and RX9-12) are in a second side group. Although a similar grouped indicia could be used analogous to that seen in FIG. 29, in the embodiment shown each transmit and receive pair could also be individually color-coded to illustrate the positions of the common transmit and receive pair within the same row.

Figure 29:
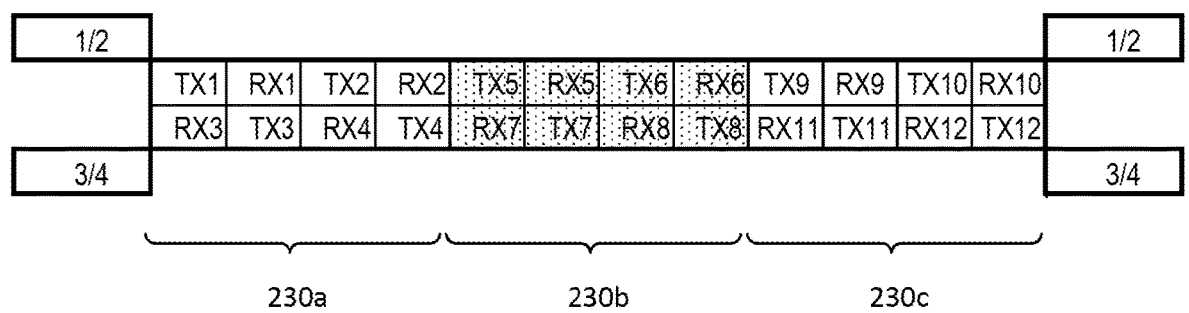
FIG. 29 is a logical view of the connectivity at LC connectors of the optical distribution module of FIG. 20.

As seen in FIG. 29, and by way of contrast to use of modules 10, 110 of FIGS. 1-19, in the arrangement of FIGS. 20-28, the transmit and receive fibers can be grouped such that, for a particular service, a selected set of closely-located LC connectors 216 can be used in a single, combined channel of a higher data rate. In example implementations, three separate groups 230a-c of LC connectors 216 can be considered, with connectors 1-4 and 13-16 corresponding to a first group 230a, connectors 5-8 and 17-20 corresponding to a second group 230b, and connectors 9-12 and 21-24 corresponding to a third group 230c. This corresponds to grouping of a first four transmit and receive pairs (TX1-4 and RX1-4) in the first group 230a, a second four transmit and receive pairs (TX5-8 and RX5-8) in the second group 230b, and a third four transmit and receive pairs (TX9-12 and RX9-12) in the third group 230c. This routing of fibers to the LC connectors 216 allows for grouping of LC fibers for higher data rate services. Other groupings could be used as well; however, this grouping provides some advantages with respect to fiber routing. In particular, this arrangement allows for connection to three 8-fiber transceivers via a 2×3 array cord, as discussed in further detail below.

In the embodiment shown, the groups of LC connectors 216 can be identified visually on the module 210, to improve the manner in which a technician can determine which LCs correspond to which fiber paths. In an example embodiment, indicia may be disposed on the second side of the housing to visually distinguish each group of LC connectors from an adjacent neighboring group of LC connectors. This visual distinction can be accomplished in many ways. For example, in one possible embodiment, a first group (e.g., connectors 1-4 and 13-16) can have a first color coded appearance, while a second group (connectors 5-8 and 17-20) may have a second color coded appearance that is readily visually distinguishable from the first group. A third group (e.g., connectors 9-12 and 21-24) may have a third color coded appearance that is different from the second group, to which it is also adjacent. In some examples, the color coding of the first and third group may be the same, but may be distinguished from the second group. In this way, the fiber routing may be viewed as reversible between the first and third groups, but each group is visually distinct from one another, because the first and third groups are separated from each other by the second group. In some examples, the color coding of the first and third groups may be the same, but may be distinguished from the second group (as seen in FIG. 29, and as compared to FIG. 10). In this way, the fiber routing may be viewed as reversible between the first and third groups, but each group is visually distinct from one another, because the first and third groups are separated from each other by the second group. In the example shown, the second group 230b has a grayed visual appearance to visually separate that group from adjacent groups 230a, 230c. Other visual indicia could be used as well, in other embodiments.

It is noted that the module 210 described in connection with FIGS. 20-29 has additional advantages as well with respect to fiber routing. As seen in FIGS. 30-31, the module 210 can be used in pairs for interconnection and routing of optical signals in various ways. In FIG. 30, two modules 210a-b are used, and interconnected using three standard Method B MPO cables. In this arrangement, the fiber routing is maintained on both sets of LC connectors 216, with a first transmit and receive pair being on the thirteenth and fourteenth LC connectors, a second transmit and receive pair being on fifteenth and sixteenth LC connectors, a third transmit and receive pair being on first and second LC connectors, a fourth transmit and receive pair being on third and fourth LC connectors, a fifth transmit and receive pair being on fifth and sixth LC connectors, a sixth transmit and receive pair being on seventh and eighth LC connectors, a seventh transmit and receive pair being on seventeenth and eighteenth LC connectors, an eighth transmit and receive pair being on nineteenth and twentieth LC connectors, a ninth transmit and receive pair being on ninth and tenth LC connectors, a tenth transmit and receive pair being on eleventh and twelfth LC connectors, an eleventh transmit and receive pair being on twenty-first and twenty-second LC connectors, and a twelfth transmit and receive pair being on twenty-third and twenty-fourth LC connectors. This arrangement corresponds to a key up to key up arrangement in which the two modules 210a-b are positioned such that the MPOs are connected in a same orientation. Furthermore, this arrangement maintains fiber routing numbers at the LCs of the modules, thereby eliminating the requirement of either (1) an Alpha/Beta arrangement with one module inverted, or (2) use of two different modules with opposite routings at opposite sides of the Method B cable. In other words, because the two modules 210a-b are maintained in a same vertical position (but are horizontally mirrored, or transposed horizontally), the connectors are arranged to be complementary and allow for connection and correct routing in the same orientation, with both the keyed MPO connectors maintained in a same orientation, and the modules oriented the same and being the same on both sides as well.

It is noted that although the arrangement of FIG. 30 is particularly advantageous, in some situations, users may wish to utilize Method A cables, or otherwise to use a key up to key down arrangement, in which the MPOs are connected in both reversed and inverted format. In this example, as shown in FIG. 31, if three "Method A" cables are used to connect the MPO connectors 214a-c, this results in mis-routing of fibers, and therefore existing cabling solutions cannot accommodate an alpha-beta arrangement of modules 210. Details regarding a possible cabling solution useable to address this issue are provided below in connection with FIG. 50.

Referring to FIGS. 32-38, a fourth module 310 is illustrated, in accordance with the present disclosure. The fourth module 310 generally has corresponding components to those of module 10 of FIGS. 1-10, above. For consistency, like features are numbered similarly, with housing 312 having a first side and a second side and formed from a cassette 320 and shell 322, with an array of LC connectors 316 disposed in two rows 318a-b on a second side. However, on the first side of the housing 312, there is a single 24-fiber MPO connector 314 extending through a faceplate 323, and fibers 324 are routed differently from the MPO connector 314 to the 24 LC connectors 316, disposed in first and second rows 318a-b, respectively.

Generally, the arrangement of MPO connector 314 and routing to LC connectors 316 allows a single 24-fiber MPO to be connected via a trunk cable to the LCs on the opposite side of the module 310. As in the module 10 of FIGS. 1-10, the LC connectors 316 are arranged into a number of groups having an even number of fibers therein, and arranged into transmit-receive pairs. In this example, at the LC connectors, various different arrangements can be used to distribute the transmit and receive pairs across the first and second rows 318a-b.

Figure 38:
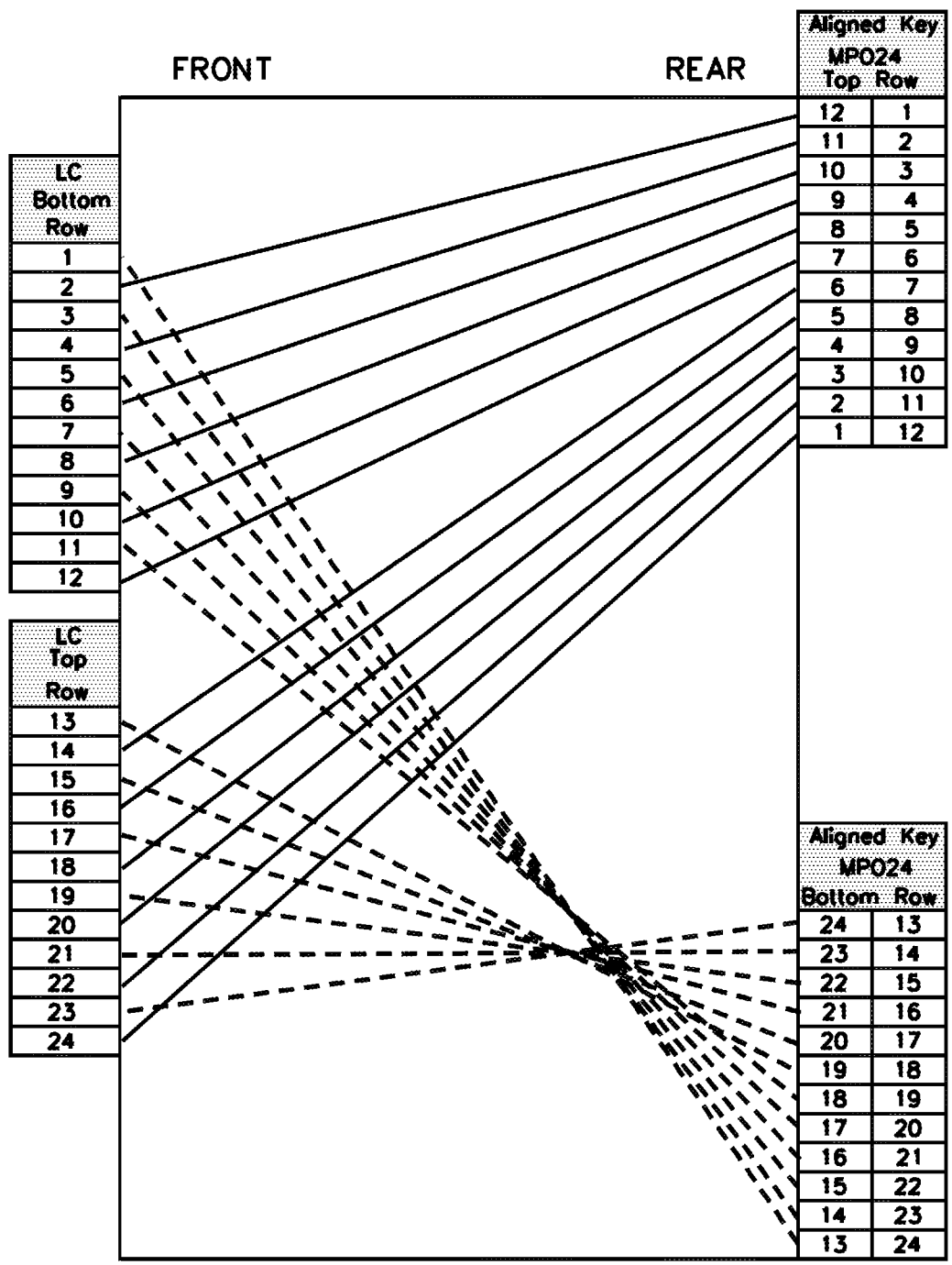
FIG. 38 is a graphical depiction of the internal fiber routing of the optical distribution module of FIG. 32.
Figure 39:
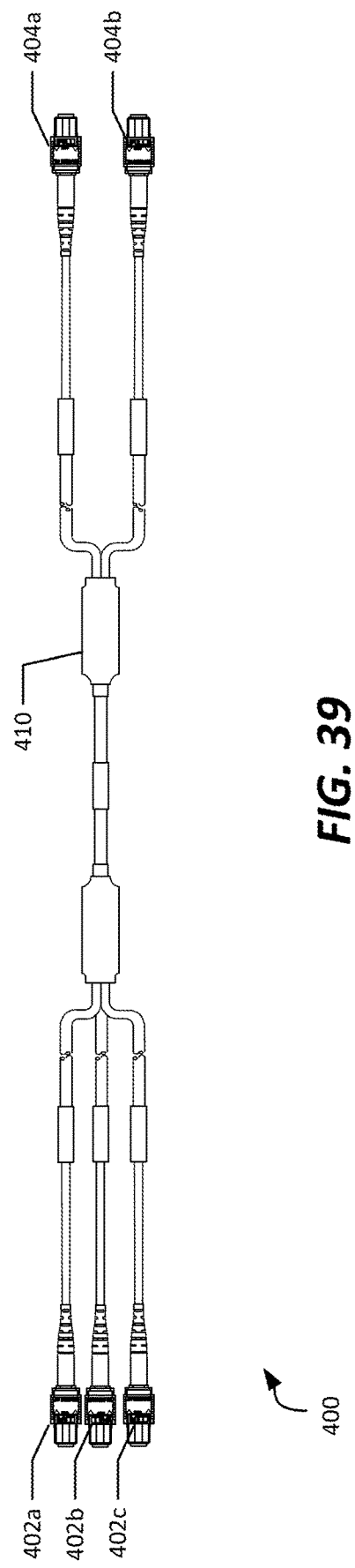
FIG. 39 illustrates a 2×3 array cable useable to implement aspects of the present disclosure.
Figure 40:
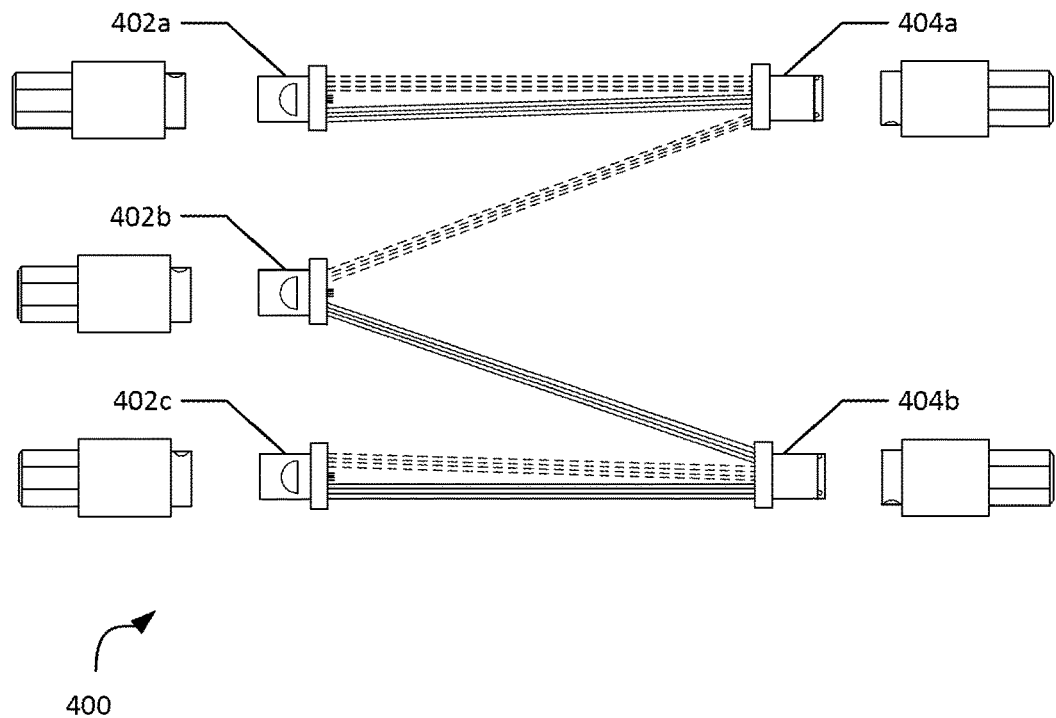
FIG. 40 illustrates an example routing of fibers between two female MPO connectors on a first side and three female MPO connectors on a second side of the 2×3 array cable of FIG. 39.
Figure 41:
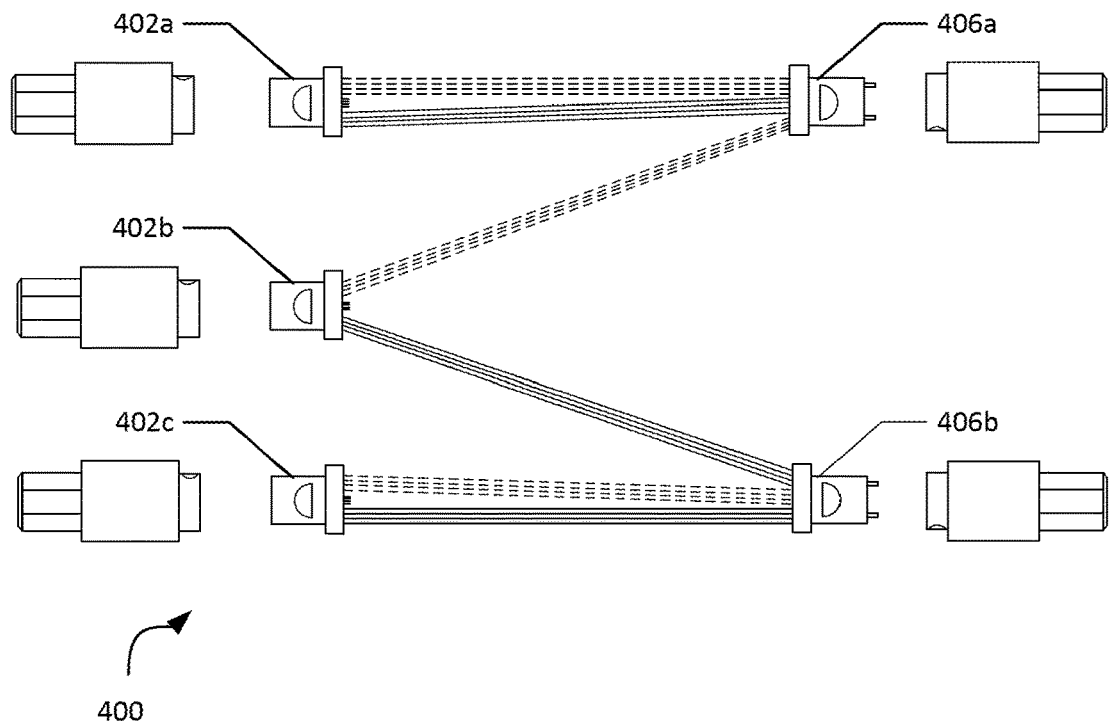
FIG. 41 illustrates an example routing of fibers between two female MPO connectors on a first side and three male MPO connectors on a second side of the 2×3 array cable of FIG. 39.
Figure 42:
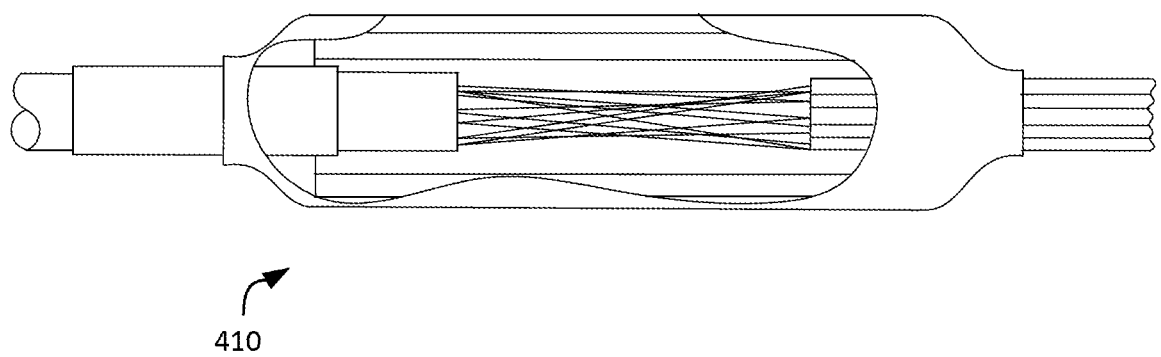
FIG. 42 illustrates crossover of fibers within the 2×3 array cable of FIG. 39.
Figure 43:
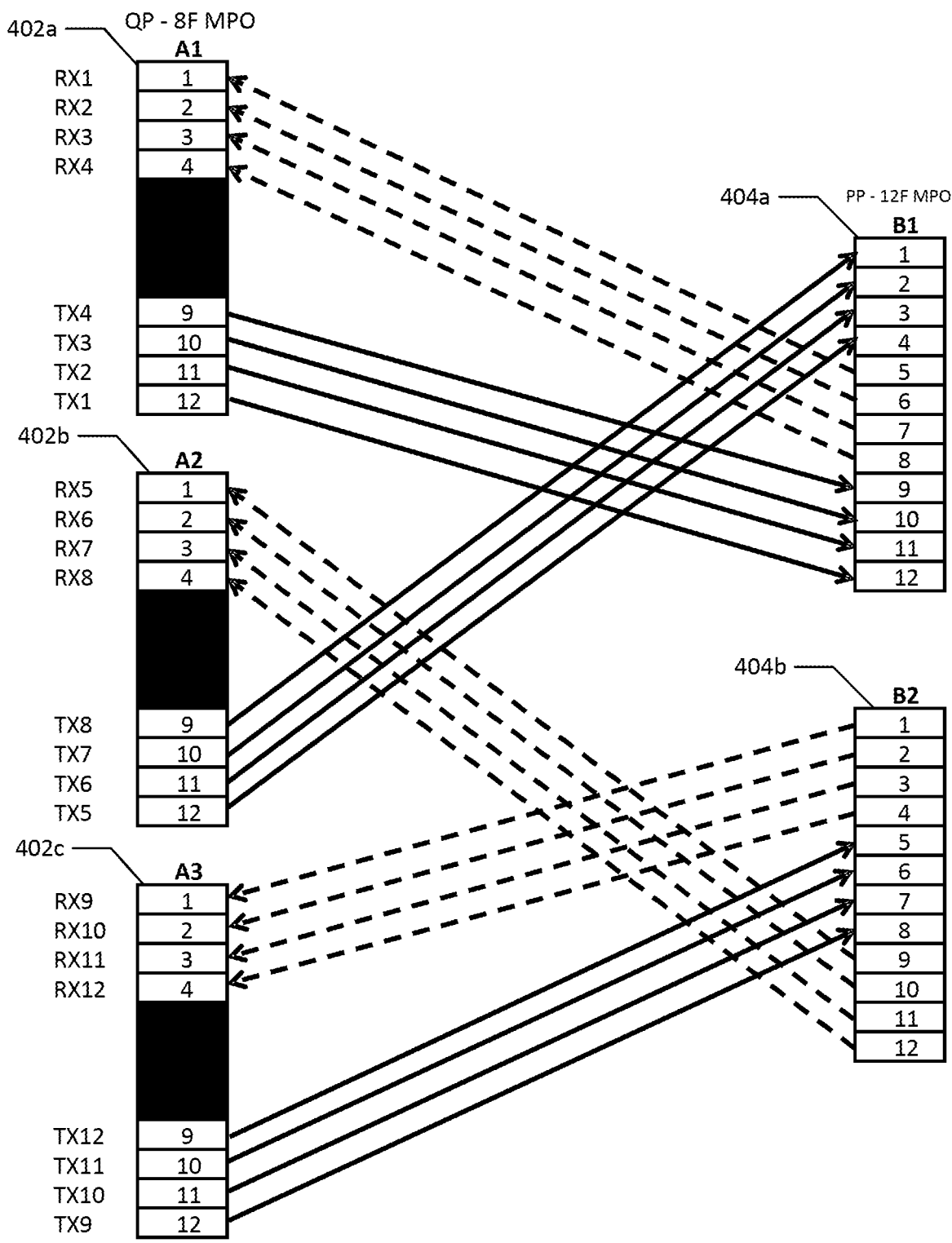
FIG. 43 is a graphical depiction of the internal fiber routing of the 2×3 array cable of FIG. 39.

In the example fiber routing configuration of FIG. 38, each of the MPO connectors uses a first four sequential fiber connections as receive fibers and a last four sequential fiber connections as transmit fibers. The module 310 routes the transmit fibers from a first row 318a of the LC connectors 316 and the receive fibers from a second row 318b of the LC connectors 316 to a first row of fibers in the MPO connector 314 (which typically includes two rows of 12 fibers therein) The module 310 also routes the receive fibers from the first row 318a of the LC connectors 316 and the transmit fibers from the second row 318b of the LC connectors to a second row of fibers in the MPO connector 314. Accordingly, each of the first and second rows of fibers in the MPO connector 314 includes six transmit fibers and six receive fibers, although those fibers are unpaired; furthermore, the transmit and receive fibers are separated in each row, with the transmit fibers and receive fibers being segregated on opposite sides within a row.

More particularly, a first LC connector (in first row 318a) connects to a thirteenth MPO fiber in the MPO connector 314, a second LC connector connects to a twelfth MPO fiber in the MPO connector, a third LC connector connects to a fourteenth MPO fiber, a fourth LC connector connects to an eleventh MPO fiber, a fifth LC connector connects to an fifteenth MPO fiber, a sixth LC connector connects to a tenth MPO fiber, a seventh LC connector connects to a sixteenth MPO fiber, an eighth LC connector connects to a ninth MPO fiber, a ninth LC connector connects to a seventeenth MPO fiber, a tenth LC connector connects to an eighth MPO fiber, an eleventh LC connector connects to an eighteenth MPO fiber, a twelfth LC connector connects to a seventh MPO fiber, a thirteenth LC connector connects to a nineteenth MPO fiber, a fourteenth LC connector connects to a sixth MPO fiber, a fifteenth LC connector connects to a twentieth MPO fiber, a sixteenth LC connector connects to a fifth MPO fiber, a seventeenth LC connector connects to a twenty-first MPO fiber, an eighteenth LC connector connects to a fourth MPO fiber, a nineteenth LC connector connects to a twenty-second MPO fiber, a twentieth LC connector connects to a third MPO fiber, a twenty-first LC connector connects to a twenty-third MPO fiber, a twenty-second LC connector connects to a second MPO fiber, a twenty-third LC connector connects to a twenty-fourth MPO fiber, and a twenty-fourth LC connector connects to a first MPO fiber.

Referring to FIGS. 1-38 generally, it can be seen that the various modules, including MPO connectors and LC connectors, are currently described as routing 8, 12, or 24 fiber paths, and being grouped into one, two, or three output fiber groups. However, other numbers of fibers or connectors can be used. In example embodiments, the LC connectors form N groups of connectors with M connectors in each group, with M/2 channels corresponding to each group as well (since the M connectors are arranged for use with fiber pairs). Generally, other numbers of routed fibers could be applied, given that N, M, and M/2 are maintained as integers.

Referring to FIGS. 39-44, an example 2×3 array cable 400 is illustrated that can be used to connect the modules 10, 110 to three transceivers in example implementations using embodiments of the present disclosure. In the example shown, a cable can include female connectors 402a-c on a three-connector side useable to connect to transceivers, and can use either female connectors 404a-b on a two-connector side (as in FIG. 40) or male connectors 406a-b on the two-connector side (as in FIG. 41). In both instances, the three-connector side routes eight fibers from each transceiver to the two connectors on the module side, with a middle connector splitting transmit and receive fibers across the two connectors on the module side. This arrangement can be accomplished, for example, by fiber crossover in a fiber furcation region 410 positioned along the cable, with furcation arrangements illustrated in FIG. 43.

Figure 44:
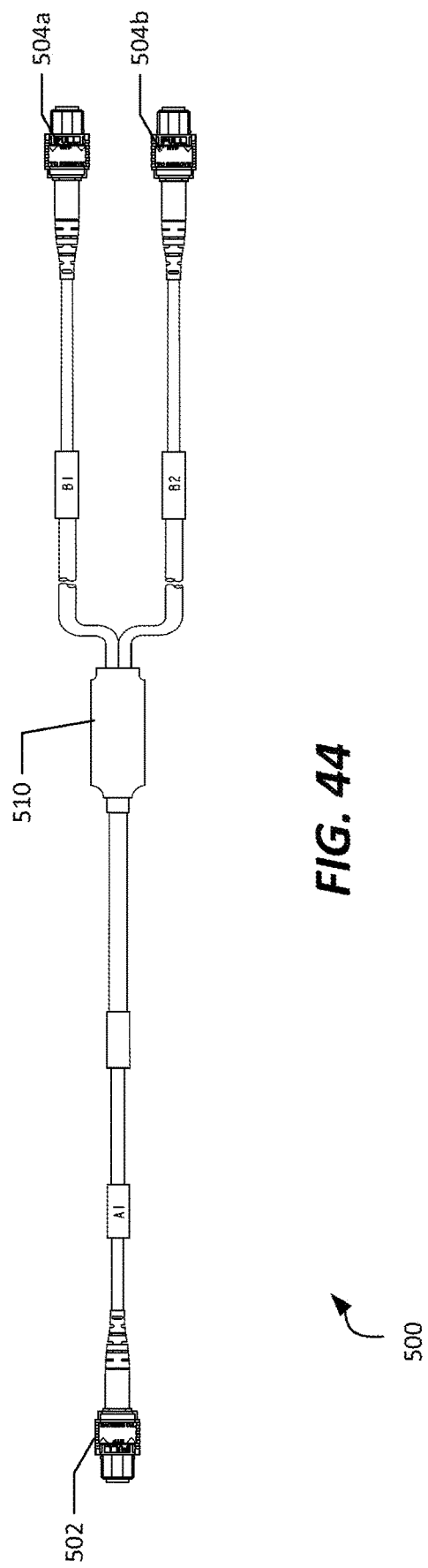
FIG. 44 illustrates a 2×1 array cable useable to implement aspects of the present disclosure.
Figure 45:
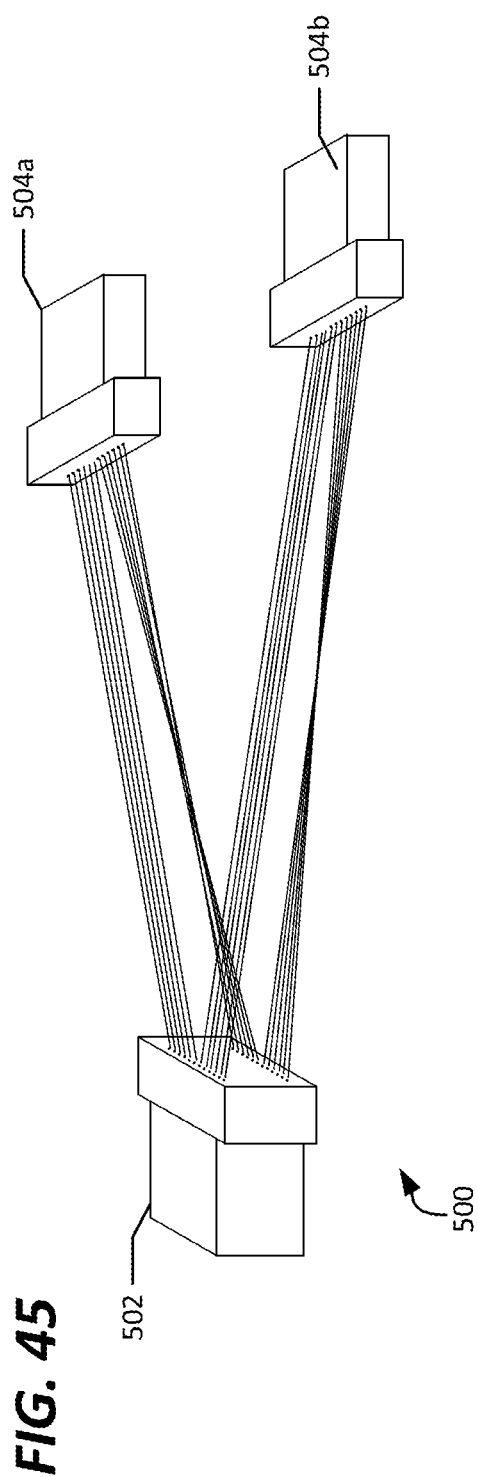
FIG. 45 illustrates an example routing of fibers between one female MPO connectors on a first side and two female MPO connectors on a second side of the 2×1 array cable of FIG. 44.

An example fiber routing within the 2×3 cable is illustrated in FIG. 44. As seen therein, three MPO connectors 402a-c route to two twelve-fiber MPO connectors 404a-b, such that each of eight fibers of the first MPO connector 402a connect to MPO connector 404a, each of the eight fibers of the third MPO connector 402c connect to MPO connector 404c, and the four transmit and receive fibers are routed to the MPO connector 404a and 404b, respectively.

Figure 46:
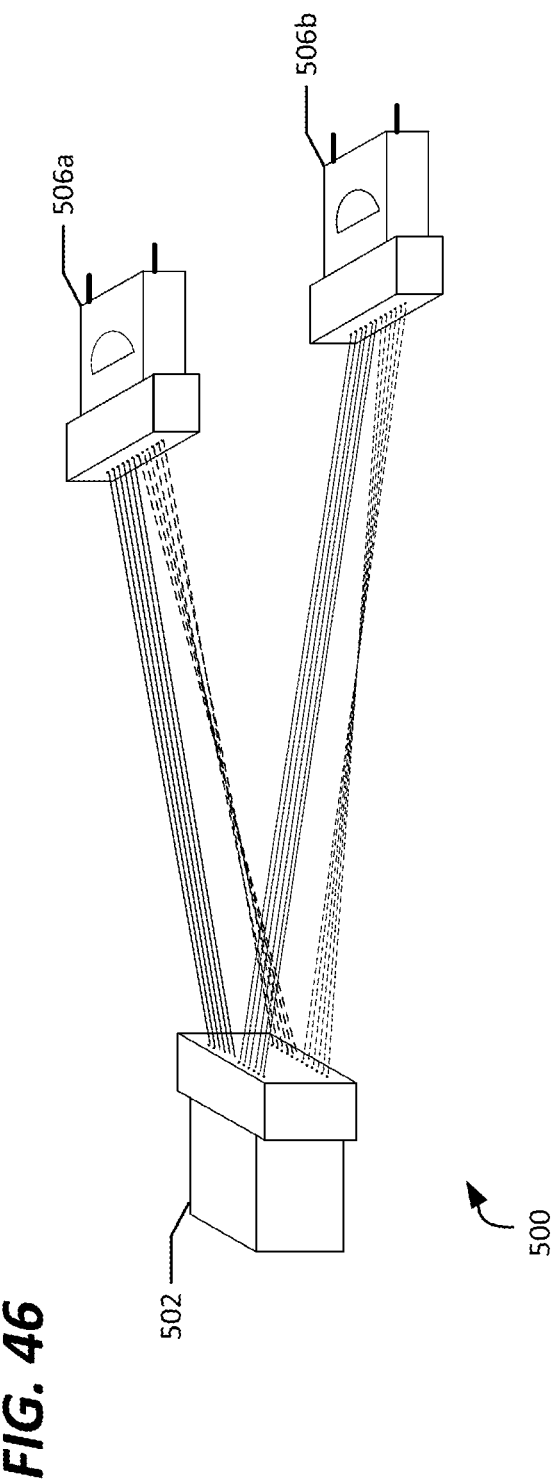
FIG. 46 illustrates an example routing of fibers between one female MPO connectors on a first side and two male MPO connectors on a second side of the 2×1 array cable of FIG. 44.
Figure 47:
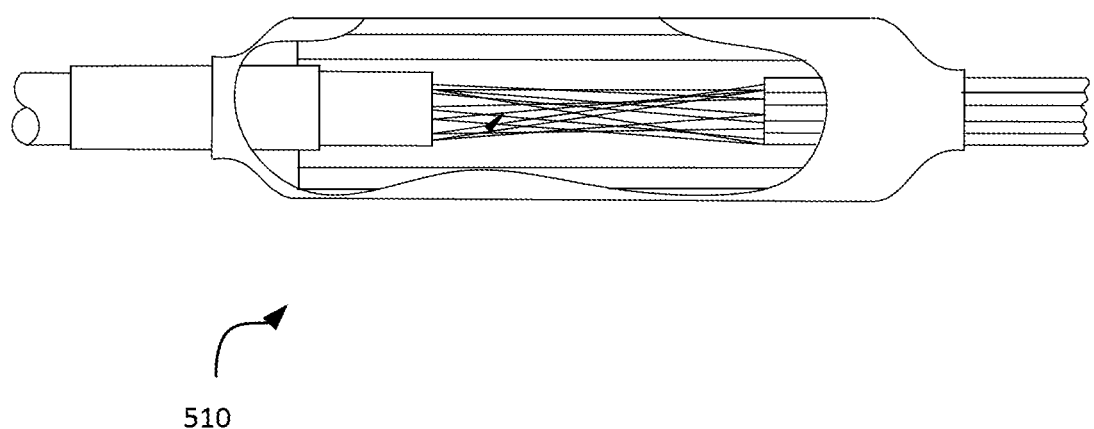
FIG. 47 illustrates crossover of fibers within the 2×1 array cable of FIG. 36.
Figure 48:
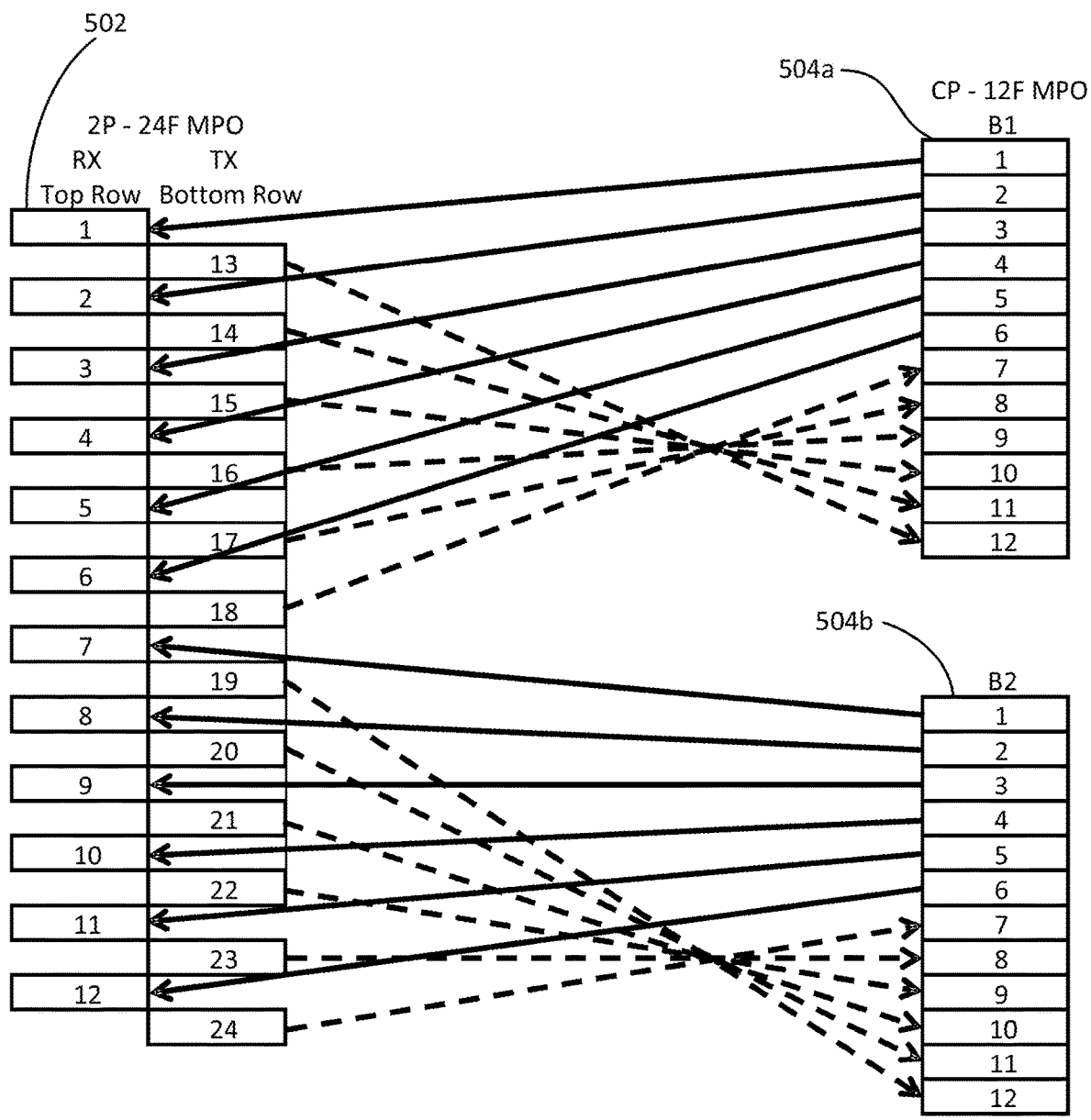
FIG. 48 is a graphical depiction of the internal fiber routing within the 2×1 array cable of FIG. 44.
Figure 49:
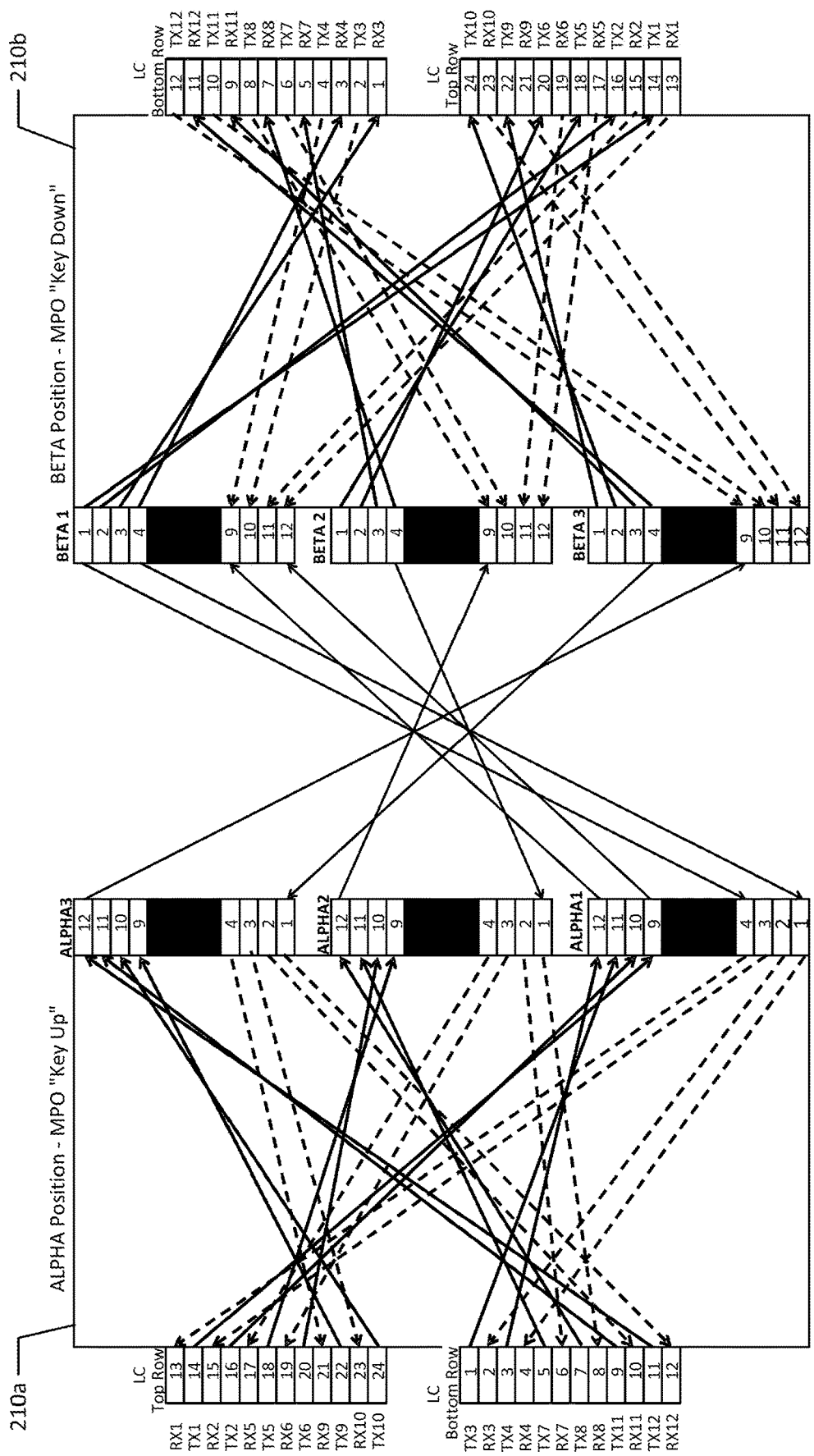
FIG. 49 illustrates interconnection of two fiber optic modules in an "alpha-beta" configuration in which one of the two modules is inverted, and including a cable useable to accomplish crossover of fiber connections therebetween.

Referring to FIGS. 45-49, a cable 500 is illustrated that can be used to route fibers to a module such as module 10 of FIGS. 1-10, above, or module 110, 310, above (describing 12- and 24-fiber MPO modules). In the example shown, the cable 500 corresponds to a 1×2 cable, in which a 24-fiber (two row) MPO connector 502 on a first side connects to two twelve-fiber MPO connectors 504a-b. In the example embodiment, fibers 1-12 correspond to receive fibers, and fibers 13-24 correspond to transmit fibers. In the example shown, the cable 500 separates the fibers at a furcation region 510 to route six transmit and six receive fibers to each MPO connector 504a-b. Routing of such fibers is illustrated in FIG. 49. In general, a first six receive fibers from the connector 502 are routed to a first MPO connector 504a in a same order on fibers 1-6 of the MPO connector 504a, while a first six transmit fibers (fibers 13-18) are routed to the first MPO connector 504a in a reversed order on fibers 7-12. Similarly, a next six receive fibers (fibers 7-12) from the connector 502 are routed to a second MPO connector 504b in a same order as fibers 1-6 of the MPO connector 504a, while a second six transmit fibers (fibers 19-24) are routed to the second MPO connector 504b in a reversed order on fibers 7-12 of the second MPO connector 504b. As seen in FIGS. 46-47, rather than the female MPO connectors 504a-b as seen in FIG. 46, alternatively male MPO connectors 506a-b could be used.

Referring now to FIGS. 50-56, example configurations of the various modules and cables discussed above are described. FIG. 50 illustrates an example implementation in which two modules 210 of FIGS. 20-28 are interconnected. While FIGS. 30-31 generally illustrates an optical distribution system in which modules 210a, 210b are positioned in an "alpha-alpha" arrangement and in which three standard Method B MPO cables are utilized. In particular, in that arrangement, the modules 210a, 210b are in reversed position but are not inverted with respect to one another. Accordingly, the MPO connectors of each module 210a-b is maintained in a common, keyed orientation that is the same. FIG. 50 illustrates, by way of comparison, an "alpha-beta" arrangement 600 in which one of the modules (in this case, module 210b) is inverted relative to module 210a, and therefore the MPO connectors of module 210b are inverted in position relative to module 210a. In this arrangement, a traditional Method A cable may work, but may not provide a desired routing of fibers. In FIG. 31 a Method A cable will connect receive fibers to receive fibers, but may result in decoupling of the fiber pairs at the output LC connectors of the module 210b. Instead, to preserve routing such that transmit and receive pairs are adjacent, a different cable is presented herein. In the example shown in FIG. 50, interconnections from three such cables are shown.

In this example, a cable includes twelve fibers, including four dark fibers (fibers 5-8). In such a cable, rather than completely inverting the fibers such that fiber 1 at a first end connects to fiber 12 at a second end, only the transmit and receive fibers are inverted among themselves, such that fiber 1 at a first end is routed to fiber 4 at a second end, fiber 2 at the first end is routed to fiber 3 at the second end, fiber 4 at the first end is routed to fiber 1 at the second end. Similarly, fiber 9 at the first end is routed to fiber 12 at the second end, fiber 10 at the first end is routed to fiber 11 at the second end, fiber 11 at the first end is routed to fiber 10 at the second end, and fiber 12 at the first end is routed to fiber 9 at the second end.

Figures 52, 52A, 52B, 52C:
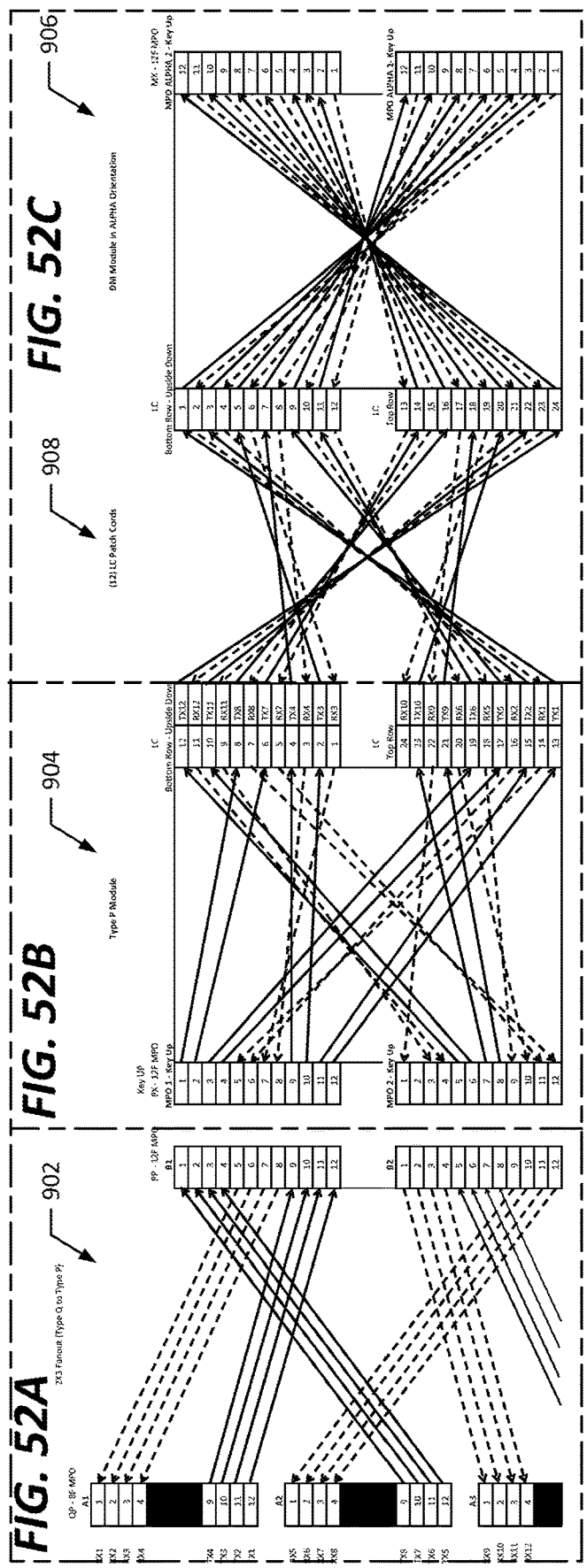
FIGS. 52, 52A, 52B and 52C illustrate a portion of an optical distribution system useable to convert 40 Gbps service to 10 Gbps service using optical distribution modules as discussed herein, according to one possible implementation.
Figure 52A:
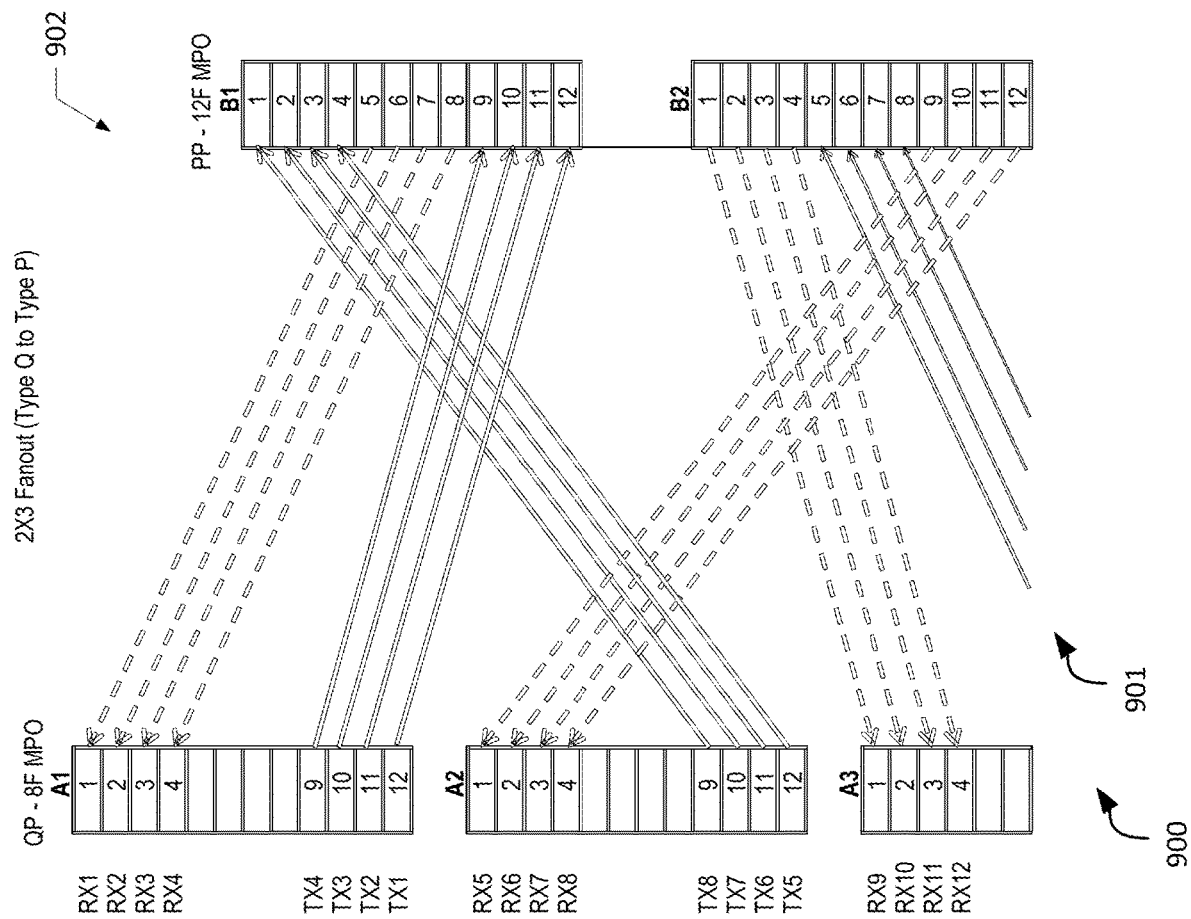
Figure 52B:
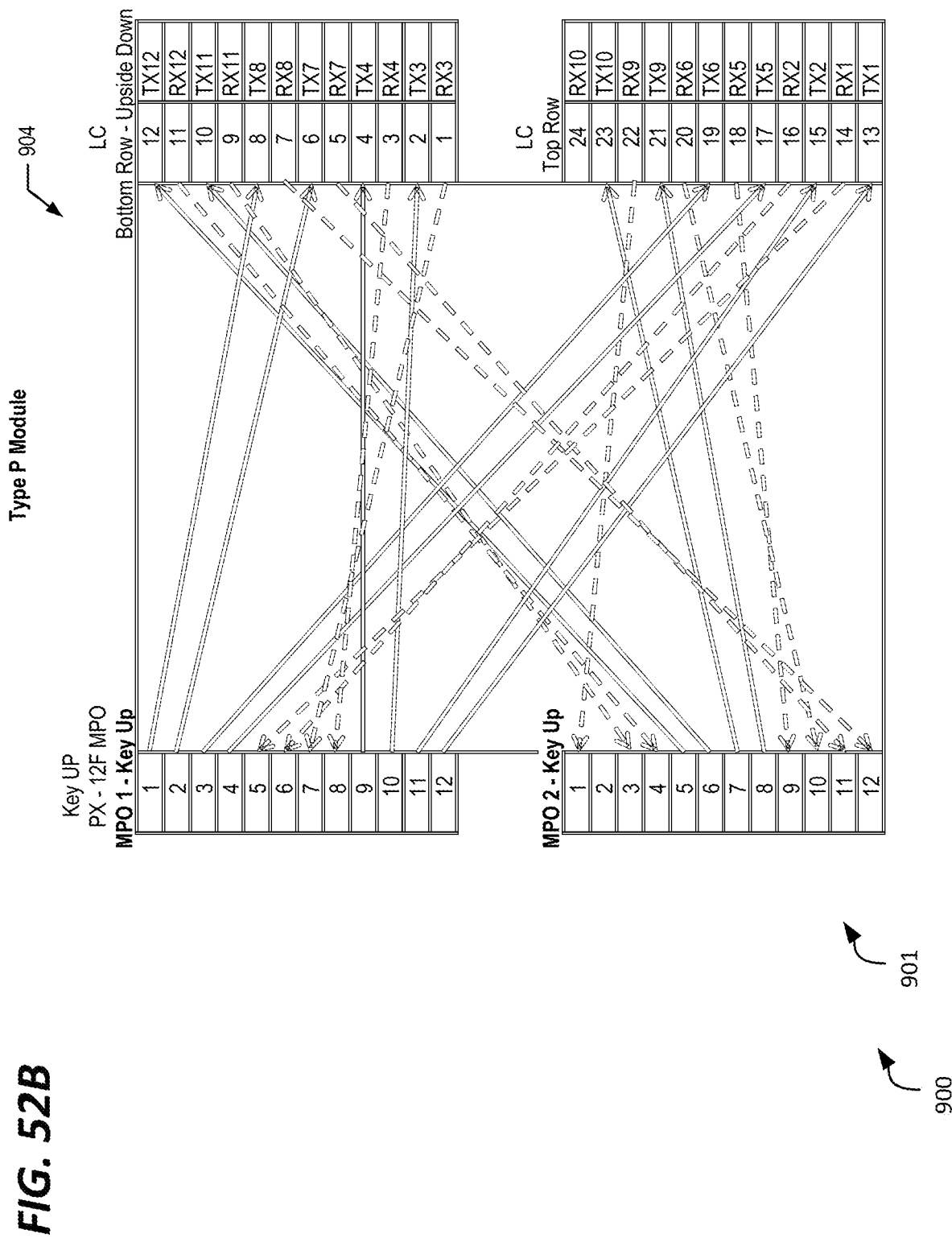
Figure 52C:
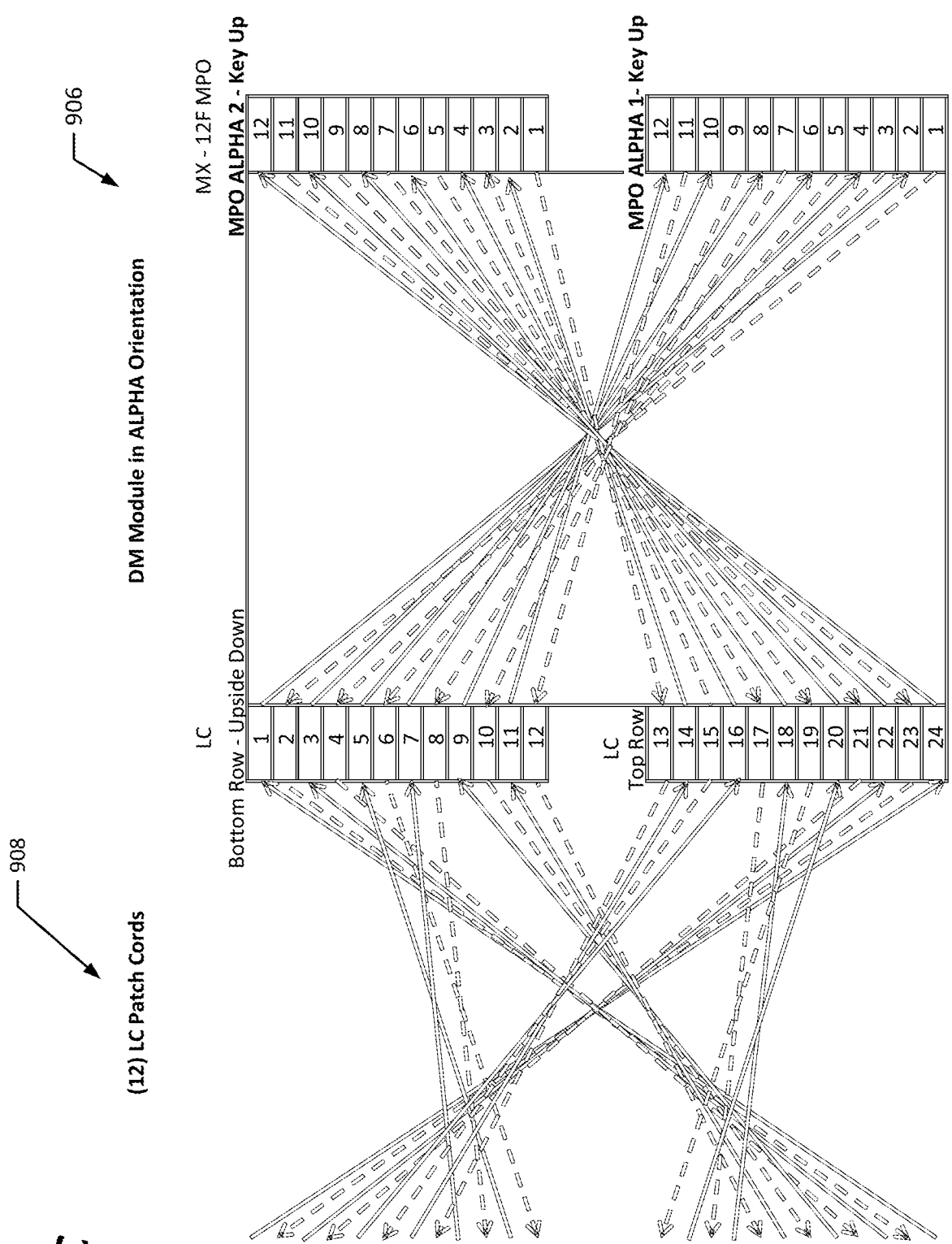

Referring to FIGS. 51-52, alternative routings for a cable that may be useable in connection with the present disclosure are shown, in an alpha-alpha (non-inverted) and alpha-beta (inverted key) arrangement. Generally, the routings are such that arranged such that the first four fiber connection locations of a first MPO connector are connected (in a non-inverted order) to the last four fiber connection locations of the second MPO connector at a far end of the cable, and the second four fiber connection locations of the first MPO connector are connected (in a non-inverted order) to the first four fiber connection locations of the second MPO connector. FIG. 51 illustrates a cable 700 that includes first and second MPO connectors 702a-b, each having twelve fiber connection locations, in a non-inverted arrangement. In this example, a first fiber connection location of the first MPO connector 702a is connected via a fiber to a ninth fiber connection location of the second MPO connector 702b. Similarly, a second fiber connection location of the first MPO connector 702a is connected via a fiber to a tenth fiber connection location of the second MPO connector 702b, a third fiber connection location of the first MPO connector 702a is connected via a fiber to an eleventh fiber connection location of the second MPO connector 702b, and a fourth fiber connection location of the first MPO connector 702a is connected via a fiber to a twelfth fiber connection location of the second MPO connector 702b. Additionally, a ninth fiber connection location of the first MPO connector 702a is connected via a fiber to a first fiber connection location of the second MPO connector 702b, a tenth fiber connection location of the first MPO connector 702a is connected via a fiber to a second fiber connection location of the second MPO connector 702b, an eleventh fiber connection location of the first MPO connector 702a is connected via a fiber to a third fiber connection location of the second MPO connector 702b, and a twelfth fiber connection location of the first MPO connector 702a is connected via a fiber to a fourth fiber connection location of the second MPO connector 702b. FIG. 52 illustrates the same routings, but the effect of such routings in an inverted arrangement.

Figure 53A:
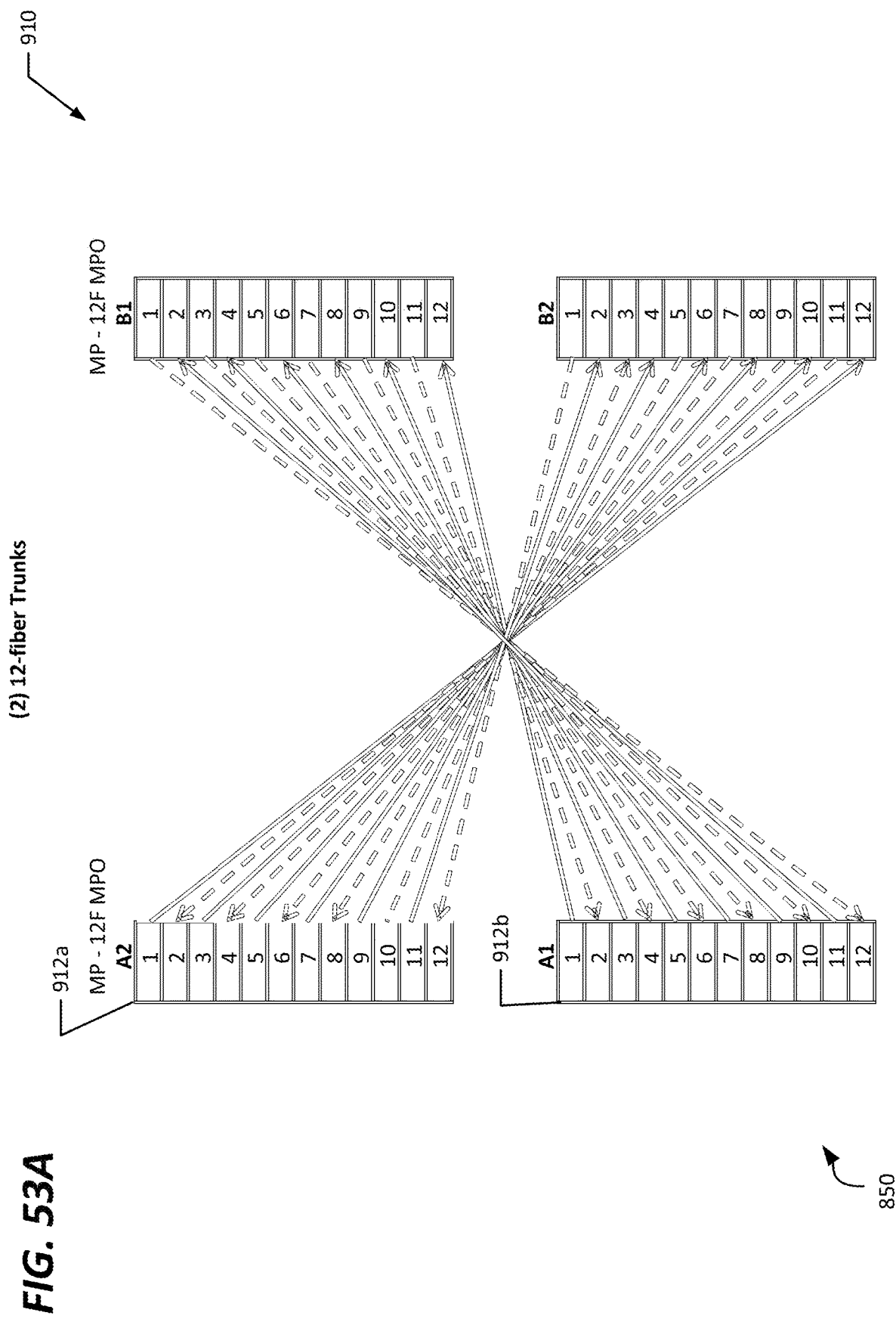
Figure 53B:
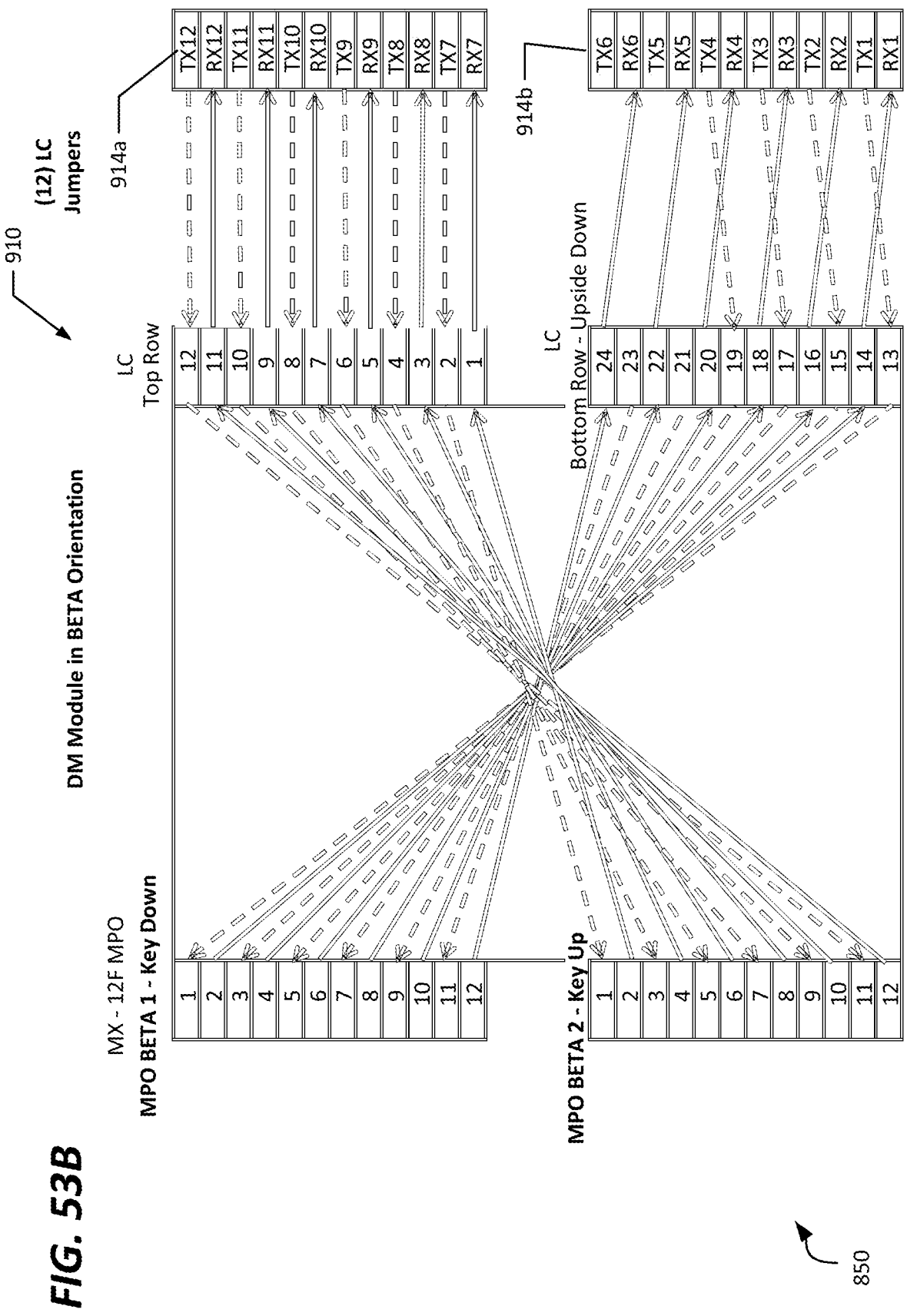
Figure 54A:
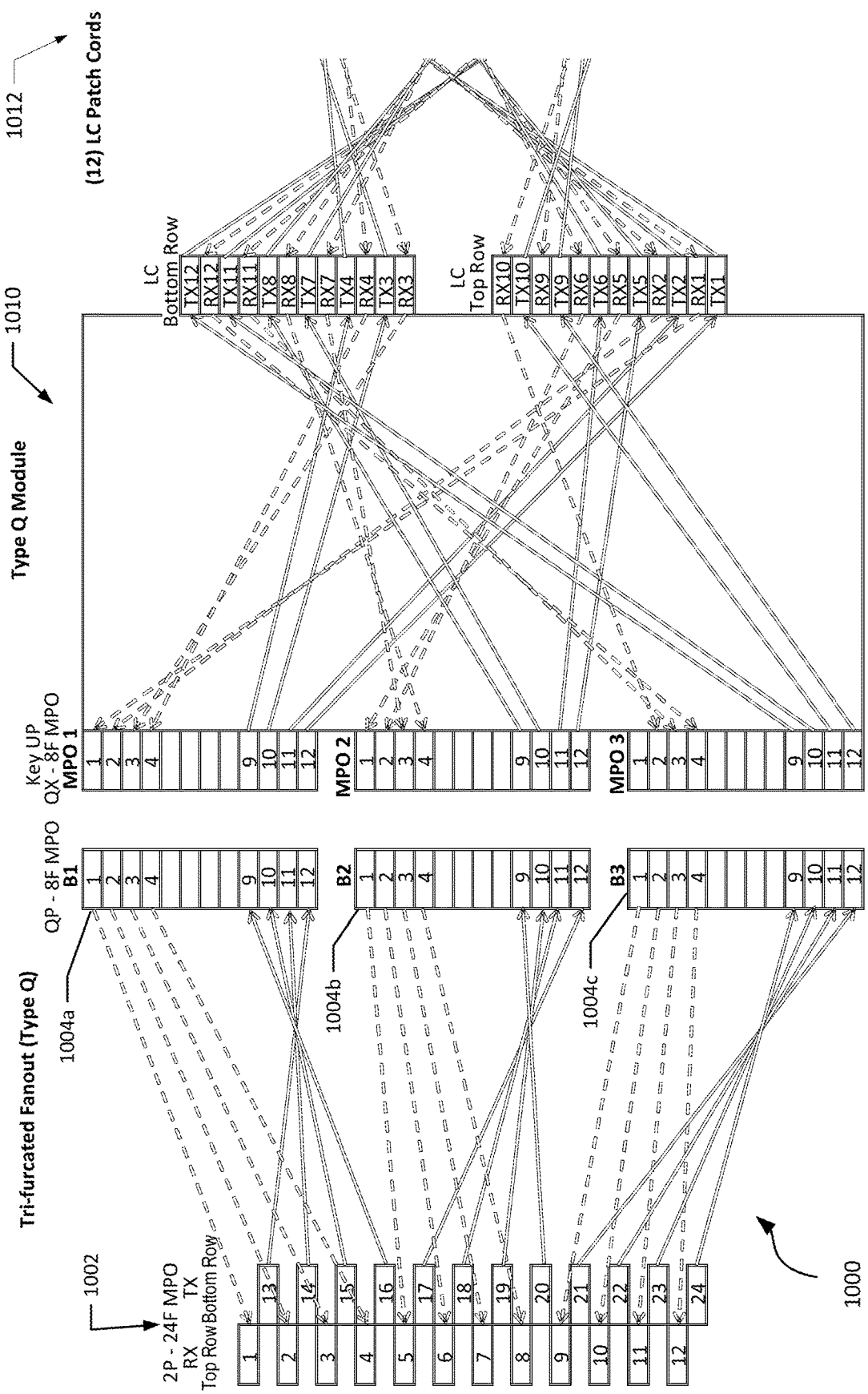
Figure 54B:
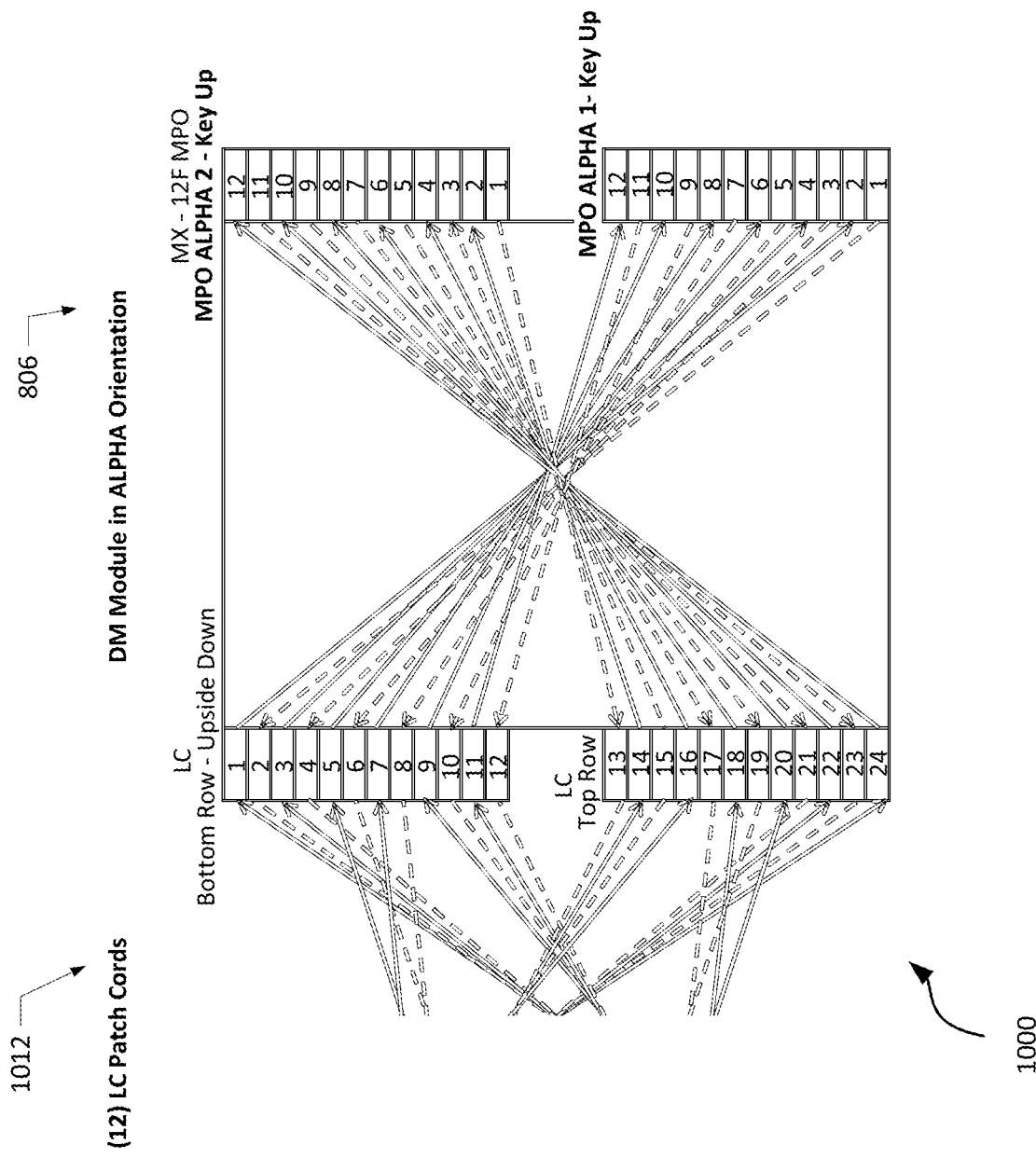

Referring to FIGS. 53-56, the various cables and modules described herein are utilized in a number of fiber optic distribution systems. FIGS. 53-54 illustrate an optical distribution system 900 useable to convert 40 Gbps service to 10 Gbps service using optical distribution modules as discussed herein, according to one possible implementation. The optical distribution system 900 has a first portion 901, shown in FIG. 53, that includes a 2×3 cable 902 interconnected to an optical distribution module 904 having MPO connections on a first side and LC connections on a second side. In example embodiments, the 2×3 cable 902 can include cable routings such as are described above in connection with the 2×3 cable 400 of FIGS. 40-44. Additionally, in example embodiments, the optical distribution module 804 can be implemented using the optical distribution module 110 seen in FIGS. 11-19, above.

In the embodiment shown, the LC connections of the optical distribution module 904 connect to LC connections of a module 906, for distribution onto two 12-fiber MPOs 908a-b of the module 906. In example implementations, the optical distribution module 804 can be a DM-style Systimax module from CommScope, Inc. of Hickory, N.C., and can route 24 LC connections (numbered 1-24) to two 12-connector MPO connections in inverse, sequential order.

In the example embodiment described in FIG. 53, LC connections of modules 904, 906 are interconnected via a plurality of LC patch cords 908 in the manner shown. Generally, of the 24 sequential LC connectors of module 904, connectors 1-4 are patched to connectors 6, 5, 8, and 7, respectively, of the 24 sequential LC connectors of module 906. Connectors 5-8 of module 904 are patched in inverse order to connectors 16-13 of module 906, and connectors 9-12 of module 904 are patched in inverse order to connectors 24-21 of module 906. Similarly, connectors 13-16 of module 904 are patched to connectors 1-4 of module 906, and connectors 17-20 of module 904 are patched to connectors 9-12 of module 906. Finally, connectors 21-24 of module 904 are patched to connectors 18, 17, 20, and 19, respectively, of module 906.

Referring to FIG. 54, a second portion 950 of the optical system 900 is shown. In FIG. 54, two 12-fiber cables 912a-b having 12-fiber MPO connectors can connect between the DM-style module 906 of FIG. 53 and a further optical distribution module 910. The optical distribution module 910 can, in the embodiment shown, be implemented using an inverted version of the DM-style Systimax module used as module 906, such that modules 906, 910 are in an alpha-beta orientation (mirrored and inverted). An opposite side of the optical distribution module 910 then includes a set of 24 LCs, which can be connected via jumpers 914a-b to deliver 10 Gbps service to 24 subscriber locations.

Figure 55A:
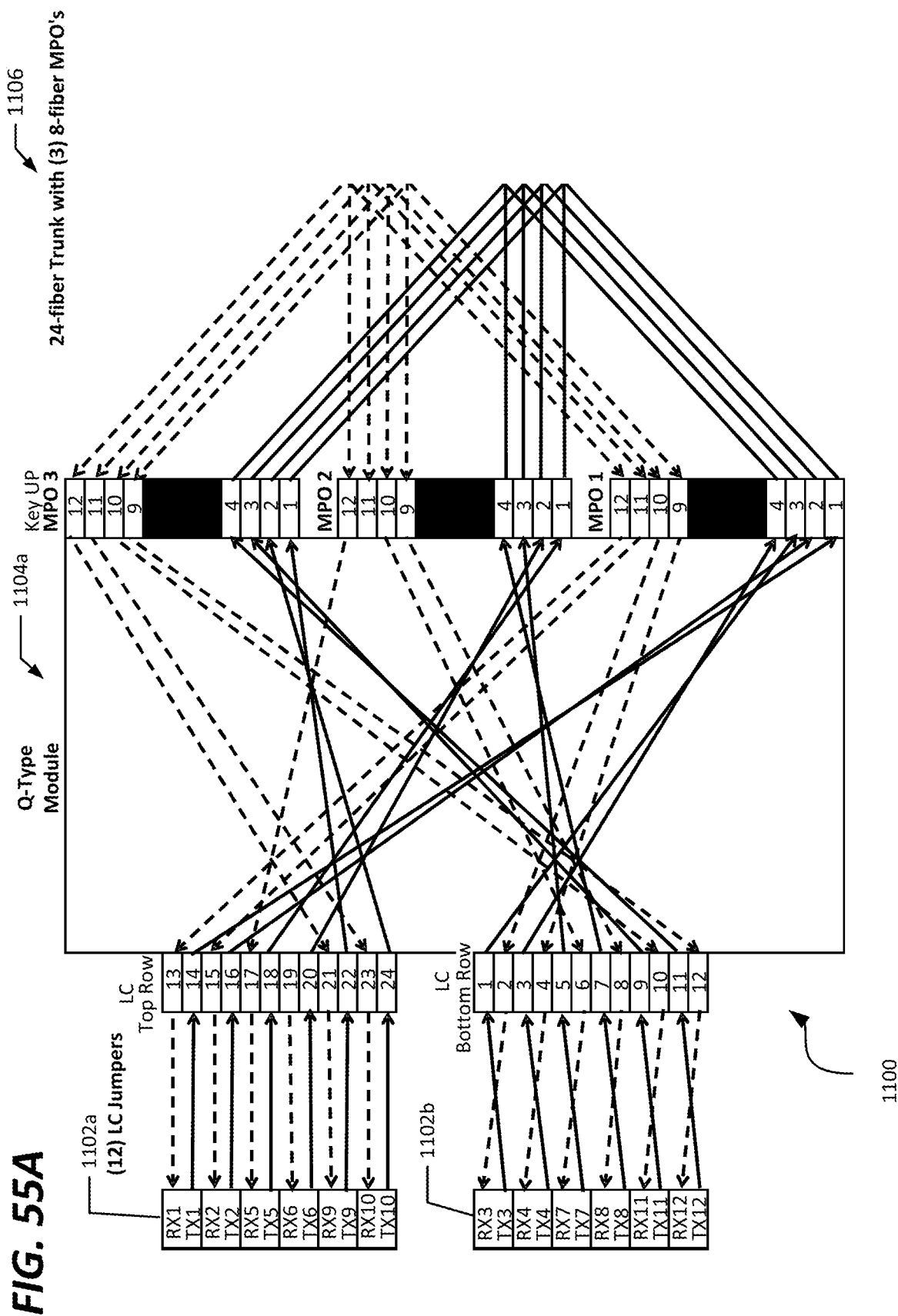
Figure 55B:
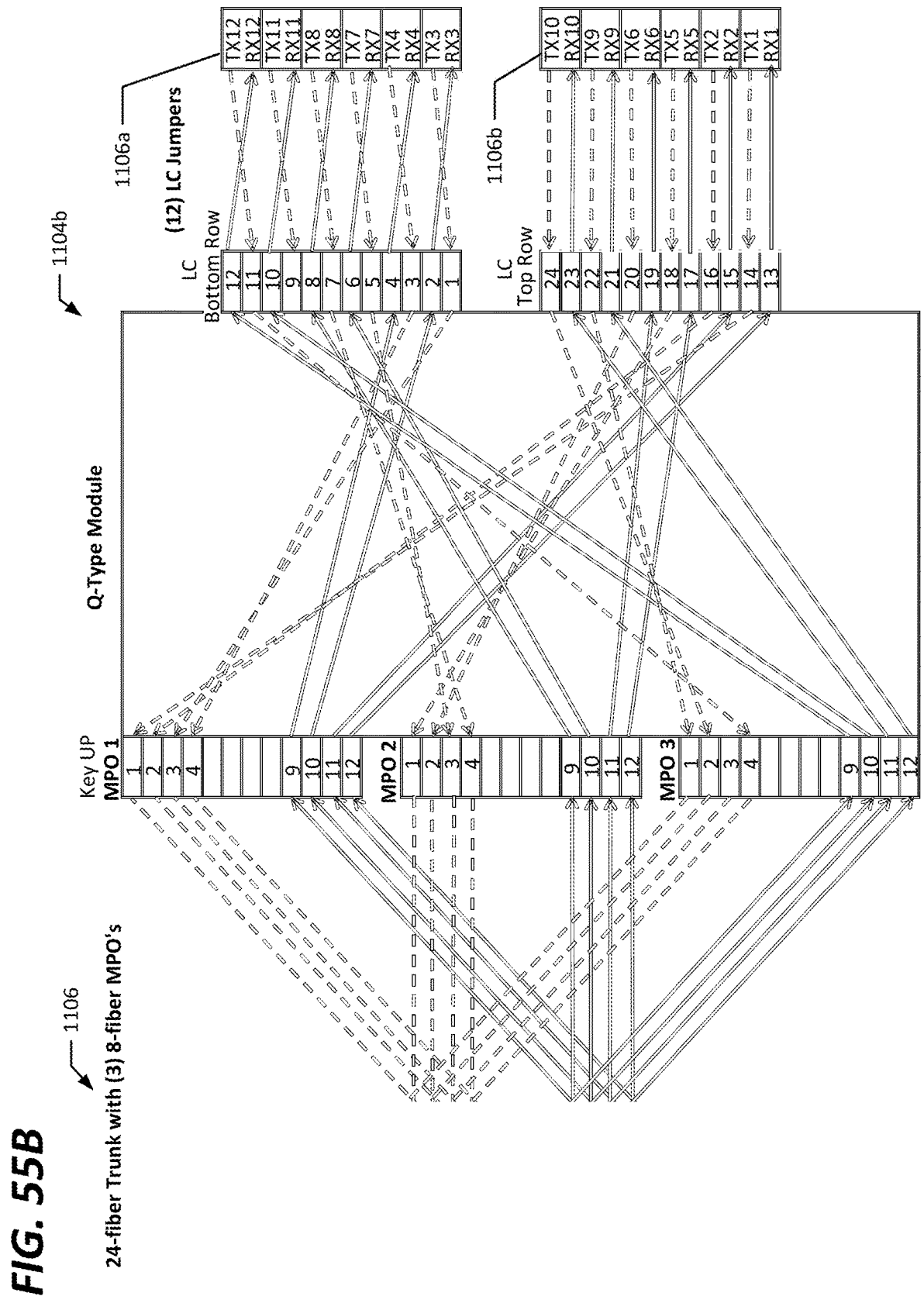

FIG. 55 illustrates a portion 1000 of an optical distribution system useable to convert 40 Gbps service to 10 Gbps service using optical distribution modules as discussed herein, according to a second possible implementation. The portion 1000 can be used in place of portion 901 of FIG. 53, in combination with the second portion 950 of FIG. 54, to provide 10 Gbps service routed to a 40 Gbps service section, and then redistributed as 10 Gbps service. In this example implementation, rather than using module 904 that corresponds to module 110 of FIGS. 11-19, the portion 1000 receives optical signals from a 24-fiber MPO connector 1002, which is connected via a fanout to three twelve-fiber MPO connectors 1004a-c. Each of the MPO connectors 1004a-c have a middle four fibers being dark, with fibers 1-12 of the 24-fiber MPO connector 1002 being receive signals and fibers 13-24 being transmit signals. As such, the receive signals are routed to corresponding fibers 1-4 of MPO connectors 1004a-c, and fibers 13-24 being routed to fibers 9-12 of each of the MPO connectors 1004a-c, in inverted order (e.g., with fibers 13-16 being routed to fibers 12-9 of MPO connector 1004a, etc.)

In the embodiment shown, the MPO connectors 1004a-c are connected to an optical distribution module 1010 having three MPO connectors 1012a-c. In example implementations, the optical distribution module 1010 can be implemented using the module 210 described above in connection with FIGS. 20-28. The optical distribution module has a two-row array of LC connections that are connected, via LC patch cords 1012, to module 906, analogous to the DM-style module described above in connection with FIG. 53. As noted above, the module 906 can be oriented in an "alpha" orientation, for use in combination with a "beta" oriented module 910 of FIG. 54. In the embodiment shown, the patch cable connections between module 1010 and module 906 has the same fiber connection mapping as between modules 904, 906 of FIG. 53.

Referring now to FIG. 56, a further example of an optical distribution system 1100 is illustrated which is useable to convert from 10 Gbps service to 40 Gbps service and back to 10 Gbps service using optical distribution modules described herein. In the example shown, two banks each including a plurality of LC jumpers 1102a-b are shown, interconnected to LC connections of an optical distribution module 1104a. In example implementations, the optical distribution module 1104 can be implemented using the module 210 described above in connection with FIGS. 20-28. The LC jumpers are arranged such that jumpers of a first bank 1102a are crossed with an adjacent one of the transmit/receive pair when connected to LC connections 1-12 of the optical distribution module 1104a, while jumpers of the second bank 1102b are connected straight to LC connections 13-24.

In the embodiment shown, a 24-fiber cable 1106 interconnects between the optical distribution module 1104a and a second optical distribution module 1104b, which is in an alpha-alpha (mirrored, but not inverted) orientation relative to optical distribution module 1104a. The 24-fiber cable includes three MPO connectors at each end, and has a reversed connection sequence in which fiber 1 of an MPO connector at one end connects to fiber 12 of an MPO connector at the opposite end, and vice versa. In the example shown, all eight fiber connections of one MPO connector of the optical distribution module 1104a connect to a same corresponding MPO connector of the optical distribution module 1104b.

The optical distribution module 1104b also has a plurality of LC connections on an opposite side from the MPO connectors, which are connected two additional banks each including a plurality of LC jumpers 1106a-b. In this example, the LC jumpers are again arranged such that jumpers of a first bank 1106a are crossed with an adjacent one of the transmit/receive pair when connected to LC connections 1-12 of the optical distribution module 1104b, while jumpers of the second bank 1006b are connected straight to LC connections 13-24.

Referring to FIGS. 1-56 generally, it is noted that the present disclosure provides specific advantages in routing and breakout of fiber optic signals to be routed to subscribers. For example, rather than using a fanout cable to break out duplex pairs from a multifiber cable, various types of modules such as those described herein can be used to provide immediate breakout of fibers at a location of an optical transceiver or switch. The routing of cable signals using such modules provides additional reliability because of the ability to match modules in various ways to accomplish optical routing within an optical distribution system, and simplifies optical routing tasks for an installer, reducing the burden on the installer to connect optical signals in a correct order. Additional advantages are provided by way of the modules and optical cabling systems provided herein, and are reflected in the embodiments disclosed.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A fiber optic distribution module comprising:
   a housing;
   a plurality of multi-fiber push-on (MPO) connectors including a first MPO connector and a second MPO connector exposed at a first side of the housing;
   a plurality of LC connectors disposed on a second side of the housing opposite the first side, the plurality of LC connectors arranged into a first row and a second row;
   a plurality of fibers, each of the plurality of fibers routed between one of the first and second MPO connectors and a different one of the plurality of LC connectors;
   wherein the plurality of LC connectors in the first row and the second row are grouped into N groups of LC connectors with M connectors in each group, the M connectors corresponding to M/2 channels included in each group and including a fiber pair occupying a pair of adjacent LC connectors of the plurality of LC connectors within a same row of the first row and the second row, the M connectors of each group being disposed across the first and second rows and each of M, N, and M/2 being an integer, and
   indicia disposed on the second side of the housing visually distinguishing each group of the N groups from an adjacent neighboring group, and
   wherein M fibers of the plurality of fibers are routed between the M connectors of a first group of the N groups and the first MPO connector, and
   wherein M fibers of the plurality of fibers are routed between the M connectors of a second group of the N groups and the second MPO connector.

2. The fiber optic distribution module of claim 1, wherein the N groups comprise first, second, and third groups, and wherein the plurality of LC connectors includes 24 LC connectors.

3. The fiber optic distribution module of claim 2, wherein the 24 LC connectors are arranged with 12 LC connectors in the first row and 12 LC connectors in the second row, the first group including four adjacent LC connectors in the first row and four LC connectors in the second row that are aligned with the four LC connectors in the first row belonging to the first group; the second group including four adjacent LC connectors in the first row and four LC connectors in the second row that are aligned with the four LC connectors in the first row belonging to the second group, and the third group including four adjacent LC connectors in the first row and four LC connectors in the second row that are aligned with the four LC connectors in the first row belonging to the third group.

4. The fiber optic distribution module of claim 2, further comprising a third MPO connector.

5. The fiber optic distribution module of claim 4, wherein the first, second, and third MPO connectors comprise twelve-fiber MPO connectors each having twelve sequential fiber connections, wherein the 12 LC connectors of the first row connect to the four outermost fiber connections of each of the first, second, and third MPO connectors, the 12 LC connectors of the second row connect to four inner fiber connections adjacent to the outermost fiber connections connected to the first row, and wherein a central four fiber connection of each if the first, second, and third MPO connector remains unpopulated.

6. The fiber optic distribution module of claim 2, wherein the first MPO connector and the second MPO connector comprise twelve-fiber connectors.

7. The fiber optic distribution module of claim 6, wherein eight fibers from the first MPO connector are routed to the first group, four fibers from the first MPO connector are routed to the second group, four fibers from the second MPO connector are routed to the second group, and eight fibers from the second MPO connector are routed to the third group.

8. The fiber optic distribution module of claim 6, wherein the first MPO connector and the second MPO connector optically interface with a 24-fiber transceiver via a bifurcated fanout cable.

9. The fiber optic distribution module of claim 2, wherein the plurality of MPO connectors are connected to three separate transceivers.

10. The fiber optic distribution module of claim 1, wherein the plurality of LC connectors are arranged into transmit and receive fiber pairs, and wherein each of the transmit and receive fiber pairs are positioned adjacent to each other within the same row of the first and second rows.

11. The fiber optic distribution module of claim 1, wherein the first MPO connector is connected via a first portion of the plurality of the fibers to LC connectors in the first row and the second MPO connector is connected via a second portion of the plurality of the fibers to LC connectors in the second row.

12. The fiber optic distribution module of claim 11, wherein the first MPO connector sequentially connects to first, second, third, fourth, fifth, sixth, seventh, eighth ninth, tenth, eleventh, and twelfth fibers of the first portion, and wherein the first row of LC connectors includes first, second, third, fourth, fifth, sixth, seventh, eighth ninth, tenth, eleventh, and twelfth LC connectors, the first LC connector connecting to the first fiber, the second LC connector connecting to the twelfth fiber, the third LC connector connecting to the second fiber, the fourth LC connector connecting to the eleventh fiber, the fifth LC connector connecting to the third fiber, the sixth LC connector connecting to the tenth fiber, the seventh LC connector connecting to the fourth fiber, the eighth LC connector connecting to the ninth fiber, the ninth LC connector connecting to the fifth fiber, the tenth LC connector connecting to the eighth fiber, the eleventh LC connector connecting to the sixth fiber, and the twelfth LC connector connecting to the sixth fiber.

13. The fiber optic distribution module of claim 12, wherein the second MPO connector sequentially connects to first, second, third, fourth, fifth, sixth, seventh, eighth ninth, tenth, eleventh, and twelfth fibers of the second portion, and wherein the second row of LC connectors includes thirteenth, fourteenth, fifteenth, sixteenth, seventeenth, eighteenth, nineteenth, twentieth, twenty-first, twenty-second, twenty-third, and twenty-fourth LC connectors, the thirteenth LC connector connecting to the twelfth fiber, the fourteenth LC connector connecting to the first fiber, the fifteenth LC connector connecting to the eleventh fiber, the sixteenth LC connector connecting to the second fiber, the seventeenth LC connector connecting to the tenth fiber, the eighteenth LC connector connecting to the third fiber, the nineteenth LC connector connecting to the ninth fiber, the twentieth LC connector connecting to the fourth fiber, the twenty-first LC connector connecting to the eighth fiber, the twenty-second LC connector connecting to the fifth fiber, the twenty-third LC connector connecting to the seventh fiber, and the twenty-fourth LC connector connecting to the sixth fiber.

14. The fiber optic distribution module of claim 1, wherein the first MPO connector sequentially connects to first, second, third, fourth, fifth, sixth, seventh, eighth ninth, tenth, eleventh, and twelfth fibers of the first portion and the second MPO connector sequentially connects to first, second, third, fourth, fifth, sixth, seventh, eighth ninth, tenth, eleventh, and twelfth fibers of the second portion.

15. The fiber optic distribution module of claim 14, wherein the first row of LC connectors includes first, second, third, fourth, fifth, sixth, seventh, eighth ninth, tenth, eleventh, and twelfth LC connectors and the second row of LC connectors includes thirteenth, fourteenth, fifteenth, sixteenth, seventeenth, eighteenth, nineteenth, twentieth, twenty-first, twenty-second, twenty-third, and twenty-fourth LC connectors.

16. The fiber optic distribution module of claim 15, wherein the first LC connector connects to the seventh fiber of the first portion, the second LC connector connects to the tenth fiber of the first portion, the third LC connector connects to the eighth fiber of the first portion, the fourth LC connector connects to the ninth fiber of the first portion, the fifth LC connector connects to the eleventh fiber of the second portion, the sixth LC connector connects to the second fiber of the first portion, the seventh LC connector connects to the twelfth fiber of the second portion, the eighth LC connector connects to the first fiber of the first portion, the ninth LC connector connects to the third fiber of the second portion, the tenth LC connector connects to the sixth fiber of the second portion, the eleventh LC connector connects to the fourth fiber of the second portion, and the twelfth LC connector connects to the fifth fiber of the second portion.

17. The fiber optic distribution module of claim 16, wherein the thirteenth LC connector connects to the twelfth fiber of the first portion, the fourteenth LC connector connects to the fifth fiber of the first portion, the fifteenth LC connector connects to the eleventh fiber of the first portion, the sixteenth LC connector connects to the sixth fiber of the first portion, the seventeenth LC connector connects to the fourth fiber of the first portion, the eighteenth LC connector connects to the ninth fiber of the second portion, the nineteenth LC connector connects to the third fiber of the first portion, the twentieth LC connector connects to the tenth fiber of the second, the twenty-first LC connector connects to the eighth fiber of the second portion, the twenty-second LC connector connects to the first fiber of the second portion, the twenty-third LC connector connects to the seventh fiber of the second portion, and the twenty-fourth LC connector connects to the second fiber of the second portion.

18. An optical cable useable to connect between a first multi-fiber push-on (MPO) connector of a first optical module and a second multi-fiber push-on (MPO) connector of a second optical module oriented in an inverted orientation, wherein first and second MPO connectors each include twelve sequentially arranged optical fibers, the optical cable comprising:

a first twelve-fiber MPO connector on a first end of the optical cable including first, second, third, fourth, fifth, sixth, seventh, eighth, ninth, tenth, eleventh, and twelfth sequential optical connections;

a second twelve-fiber MPO connector on a second end of the optical cable opposite the first end and including first, second, third, fourth, fifth, sixth, seventh, eighth, ninth, tenth, eleventh, and twelfth sequential optical connections; and first, second, third, fourth, fifth, sixth, seventh, eighth, ninth, tenth, eleventh, and twelfth optical fibers extending along the length of the cable between the first twelve-fiber MPO connector and the second twelve-fiber MPO connector, wherein:
the first optical fiber connects between the first optical connection of the first twelve-fiber MPO connector and the fourth optical connection of the second twelve-fiber MPO connector;
the second optical fiber connects between the second optical connection of the first twelve-fiber MPO connector and the third optical connection of the second twelve-fiber MPO connector;
the third optical fiber connects between the third optical connection of the first twelve-fiber MPO connector and the second optical connection of the second twelve-fiber MPO connector;
the fourth optical fiber connects between the fourth optical connection of the first twelve-fiber MPO connector and the first optical connection of the second twelve-fiber MPO connector;
the ninth optical fiber connects between the ninth optical connection of the first twelve-fiber MPO connector and the twelfth optical connection of the second twelve-fiber MPO connector;
the tenth optical fiber connects between the tenth optical connection of the first twelve-fiber MPO connector and the eleventh optical connection of the second twelve-fiber MPO connector;
the eleventh optical fiber connects between the eleventh optical connection of the first twelve-fiber MPO connector and the tenth optical connection of the second twelve-fiber MPO connector; and
the twelfth optical fiber connects between the twelfth optical connection of the first twelve-fiber MPO connector and the ninth optical connection of the second twelve-fiber MPO connector.

19. A fiber optic distribution module comprising:
a housing;
a plurality of multi-fiber push-on (MPO) connectors including a first MPO connector and a second MPO connector exposed at a first side of the housing;
a plurality of LC connectors disposed on a second side of the housing opposite the first side, the plurality of LC connectors arranged into a first row and a second row;
a plurality of fibers, each of the plurality of fibers routed between one of the first and second MPO connectors and a different one of the plurality of LC connectors;
wherein the plurality of LC connectors in the first row and the second row are grouped into N groups of LC connectors with M connectors in each group, the M connectors corresponding to M/2 channels included in each group and including a fiber pair occupying a pair of adjacent LC connectors of the plurality of LC connectors within a same row of the first row and the second row, the M connectors of each group and being disposed across the first and second rows and each of M, N, and M/2 being an integer, wherein the N groups comprise first, second, and third groups, and wherein the plurality of LC connectors includes 24 LC connectors; and wherein the 24 LC connectors are arranged with 12 LC connectors in the first row and 12 LC connectors in the second row, the first group including four adjacent LC connectors in the first row and four LC connectors in the second row that are aligned with the four LC connectors in the first row belonging to the first group; the second group including four adjacent LC connectors in the first row and four LC connectors in the second row that are aligned with the four LC connectors in the first row belonging to the second group, and the third group including four adjacent LC connectors in the first row and four LC connectors in the second row that are aligned with the four LC connectors in the first row belonging to the third group wherein each of the fibers routed to the LC connectors of the first group are routed to the first MPO connector and each of the fibers routed to the LC connectors of the second group are routed to the second MPO connector.

20. A fiber optic distribution module comprising:
a housing;
a plurality of multi-fiber push-on (MPO) connectors including a first MPO connector, a second MPO connector, and a third MPO connector exposed at a first side of the housing;
a plurality of LC connectors disposed on a second side of the housing opposite the first side, the plurality of LC connectors arranged into a first row and a second row;
a plurality of fibers, each of the plurality of fibers routed between one of the first and second MPO connectors and a different one of the plurality of LC connectors;
wherein the plurality of LC connectors in the first row and the second row are grouped into N groups of LC connectors with M connectors in each group, the M connectors corresponding to M/2 channels included in each group and including a fiber pair, the M connectors of each group and being disposed across the first and second rows and each of M, N, and M/2 being an integer, wherein the N groups comprise first, second, and third groups, and wherein the plurality of LC connectors includes 24 LC connectors; and wherein the first, second, and third MPO connectors comprise twelve-fiber MPO connectors each having twelve sequential fiber connections, wherein the 12 LC connectors of the first row connect to the four outermost fiber connections of each of the first, second, and third MPO connectors, the 12 LC connectors of the second row connect to four inner fiber connections adjacent to the outermost fiber connections connected to the first row, and wherein a central four fiber connection of each of the first, second, and third MPO connector remains unpopulated.

* * * * *

UNITED STATES PATENT AND TRADEMARK OFFICE
CERTIFICATE OF CORRECTION

PATENT NO. : 10,928,604 B2
APPLICATION NO. : 16/329912
DATED : February 23, 2021
INVENTOR(S) : Billman Page 1 of 1

It is certified that error appears in the above-identified patent and that said Letters Patent is hereby corrected as shown below:

In the Claims

Column 20, Claim 17, Line 54: "second, the twenty-first" should read --second portion, the twenty-first--

Column 22, Claim 19, Lines 4-5: "the M connectors of each group and being disposed" should read --the M connectors of each group being disposed--

Column 22, Claim 20, Lines 44-45: "the M connectors of each group and being disposed" should read --the M connectors of each group being disposed--

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*